US012522330B2

(12) United States Patent
Seeley et al.

(10) Patent No.: US 12,522,330 B2
(45) Date of Patent: Jan. 13, 2026

(54) SYSTEMS AND METHODS FOR THE MODULAR ATTACHMENT OF ADDITIVELY MANUFACTURED COMPONENTS ON VEHICLES

(71) Applicant: The United States of America as represented by the Secretary of the Navy, Keyport, WA (US)

(72) Inventors: Eric Seeley, Seabeck, WA (US); Nathan Schulyer, Silverdale, WA (US); Jacob Yates, Poulsbo, WA (US); Destany Burke, Bremerton, WA (US); Colin Gillespie, Orem, UT (US); Shawn Stainsby, Keyport, WA (US); Stephen J Leahu, Bremerton, WA (US)

(73) Assignee: The United States of America as represented by the Secretary of the Navy, Keyport, WA (US)

( * ) Notice: Subject to any disclaimer, the term of this patent is extended or adjusted under 35 U.S.C. 154(b) by 835 days.

(21) Appl. No.: 17/877,622

(22) Filed: Jul. 29, 2022

(65) Prior Publication Data

US 2022/0390960 A1    Dec. 8, 2022

Related U.S. Application Data

(63) Continuation-in-part of application No. 16/974,039, filed on Sep. 12, 2020, which is a continuation-in-part
(Continued)

(51) Int. Cl.
*B63G 8/00*      (2006.01)
*B33Y 80/00*     (2015.01)
(Continued)

(52) U.S. Cl.
CPC .............. *B63G 8/001* (2013.01); *B33Y 80/00* (2014.12); *B63G 8/00* (2013.01); *B64U 20/40* (2023.01);
(Continued)

(58) Field of Classification Search
CPC .... B63G 8/00; B63G 8/001; B63G 2008/002; B63G 2008/004; B63G 2008/005; B64U 20/40; B64U 20/70; B64U 20/75
See application file for complete search history.

(56) References Cited

U.S. PATENT DOCUMENTS

| 834,161 A   | 10/1906 | Nilsen |
| 1,382,073 A | 6/1921  | Fort   |

(Continued)

FOREIGN PATENT DOCUMENTS

| CN | 110065607 A | 7/2019 |
| CN | 111319734 A | 6/2020 |

OTHER PUBLICATIONS

Wasiu O. Popoola, Callum Geldard, Egecan Guler and Alexander Hamilton, Underwater optical wireless communication with subcarrier intensity modulation: an experimental demonstration, Proceedings of Meetings on Acoustics, vol. 44, 032001, Jun. 20, 2021, Acoustical Society of America, Melville, NY.
(Continued)

*Primary Examiner* — Ajay Vasudeva
(74) *Attorney, Agent, or Firm* — Stephen J. Leahu; Naval Undersea Warfare Center, Keyport

(57) ABSTRACT

Systems and methods are provided for using an additively manufactured vehicle, such as an UUV, with additively manufactured modules. The vehicle may be configurable such that additively manufactured modules or components may be detachably connected to the vehicle by hand, without the use of tools. Such modules may include connectors
(Continued)

adapted to securely attach additional modules that may be detached by hand, without the use of tools. The additively manufactured modules may include ball bearings for rotating modules such as propellers and thrusters, and clips or tabs for detachable connection. The modules may include optical components for communications between a swarm of unmanned vehicles. Such optical modules for underwater vehicles may utilize nephelometry and/or turbidimetry to improve communications parameters based on scattered light measurements.

26 Claims, 53 Drawing Sheets

Related U.S. Application Data of application No. 16/974,049, filed on Sep. 12, 2020, now Pat. No. 11,511,836, application No. 17/877,622, filed on Jul. 29, 2022 is a continuation-in-part of application No. 16/974,054, filed on Sep. 12, 2020, now Pat. No. 12,244,352, and a continuation-in-part of application No. 29/742,134, filed on Jan. 30, 2020, now Pat. No. Des. 927,398, and a continuation-in-part of application No. 29/742,130, filed on Jan. 30, 2020, now Pat. No. Des. 933,577, and a continuation-in-part of application No. 29/742,137, filed on Jan. 30, 2020, now Pat. No. Des. 928,070, which is a continuation-in-part of application No. 29/742,129, filed on Jan. 30, 2020, now Pat. No. Des. 928,690, said application No. 16/974,054 is a continuation-in-part of application No. 29/742,138, filed on Jan. 30, 2020, now Pat. No. Des. 937,179, and a continuation-in-part of application No. 29/742,132, filed on Jan. 30, 2020, now Pat. No. Des. 926,662, and a continuation-in-part of application No. 29/742,133, filed on Jan. 30, 2020, now Pat. No. Des. 928,691, and a continuation-in-part of application No. 29/742,131, filed on Jan. 30, 2020, now Pat. No. Des. 928,068, and a continuation-in-part of application No. 29/742,135, filed on Jan. 30, 2020, now Pat. No. Des. 928,069, and a continuation-in-part of application No. 29/742,034, filed on Oct. 3, 2019, now Pat. No. Des. 928,689, application No. 17/877,622, filed on Jul. 29, 2022 is a continuation-in-part of application No. 16/974,043, filed on Sep. 12, 2020, now Pat. No. 11,745,840, application No. 17/877,622, filed on Jul. 29, 2022 is a continuation-in-part of application No. 16/974,045, filed on Sep. 12, 2020, now Pat. No. 11,505,283.

(60) Provisional application No. 63/259,616, filed on Jul. 29, 2021, provisional application No. 62/973,045, filed on Sep. 12, 2019, provisional application No. 62/974,118, filed on Nov. 13, 2019.

(51) Int. Cl.
*B64U 20/40* (2023.01)
*F16B 1/00* (2006.01)

(52) U.S. Cl.
CPC .......... *F16B 1/00* (2013.01); *B63G 2008/002* (2013.01); *B63G 2008/004* (2013.01); *F16B 2200/83* (2023.08)

(56) References Cited

U.S. PATENT DOCUMENTS

| | | |
|---|---|---|
| 3,508,509 A | 4/1970 | Le Bleu |
| 3,947,907 A | 4/1976 | Synodis |
| 4,187,796 A | 2/1980 | Ess |
| 4,202,036 A | 5/1980 | Bowditch |
| 5,361,029 A | 11/1994 | Rider et al. |
| 5,995,882 A | 11/1999 | Patterson et al. |
| 6,453,741 B1 | 9/2002 | Beck, II |
| 6,711,095 B1 | 3/2004 | Daniels |
| 6,854,410 B1 | 2/2005 | King et al. |
| 6,929,291 B2 | 8/2005 | Chen |
| 7,753,754 B2 | 7/2010 | Curtis |
| 7,854,569 B1 | 12/2010 | Stenson |
| 7,921,795 B2 | 4/2011 | Imlach |
| 8,009,002 B2 | 8/2011 | Fiedler |
| 8,069,808 B1 | 12/2011 | Imlach |
| 8,512,084 B1 | 8/2013 | Chang |
| 9,315,248 B2 * | 4/2016 | Williams ................ B63B 73/20 |
| 10,104,289 B2 * | 10/2018 | Enriquez ................ G03B 31/00 |
| 10,392,085 B2 * | 8/2019 | Wang ..................... B63G 8/001 |
| 10,456,924 B2 | 10/2019 | Outa et al. |
| 11,319,041 B2 | 5/2022 | Wang et al. |
| 11,767,109 B2 * | 9/2023 | Richardson ............... B64C 9/02 244/49 |
| 2006/0137587 A1 | 6/2006 | Aisenbrey |
| 2009/0038532 A1 | 2/2009 | Keck et al. |
| 2010/0196174 A1 | 8/2010 | Lee |
| 2012/0167814 A1 | 7/2012 | Kalwa |
| 2016/0318591 A1 | 11/2016 | Jamieson |
| 2019/0016431 A1 | 1/2019 | Vihtanen |
| 2019/0115132 A1 | 4/2019 | Gunawan |
| 2020/0108893 A1 | 4/2020 | Noah |
| 2020/0220446 A1 | 7/2020 | Clymer |
| 2020/0231264 A1 | 7/2020 | Imai |

OTHER PUBLICATIONS

James W. O'dell, Method 180.1 Determination Of Turbidity By Nephelometry, Environmental Monitoring Systems Laboratory, Office Of Research And Development, Aug. 1993, U.S. Environmental Protection Agency, Cincinnati, Ohio.
Farshad Miramirkhani, Mehdi Karbalayghareh and Murat Uysal, Effect of scattering phase function on underwater visible light communication channel models, Physical Communication 48 101410, Jun. 26, 2021, ScienceDirect Elsevier B.V., Amsterdam, Netherlands.
Ramesh, Nephelometry and Turbidimetry, Pharmacy Study Material, Dec. 2, 2016, https://rxpharmaworld.blogspot.com/2016/12/nephelometry-and-turbidimetry.html, US.

* cited by examiner

| Sensors | |
|---|---|
| Compass 1: | Setup required |
| Inclinometer: | Not installed |
| Magnetometer: | Not installed |
| Accelerometer(s): | Setup required |
| GPS: | Setup required |
| INU: | Installed |
| Sonar: | Set up required |
| Fathometer: | Installed |
| Water Temp.: | Installed |
| LORAN: | Not installed |

| Camera | |
|---|---|
| Gimbal type: | None |
| Tilt input channel: | Disabled |
| Pan input channel: | Disabled |
| Roll input channel: | Disabled |

| Power | |
|---|---|
| Battery monitor: | Disabled |
| Battery capacity: | 3300 mAh |

| Lights | |
|---|---|
| Light Output 1: | Disabled |
| Light Output 2: | Disabled |

| Safety | |
|---|---|
| Arming Checks: | Some disabled |
| GCS failsafe: | Disabled |
| Leak failsafe: | Warn only |
| Battery failsafe: | Enter surface mode |
| EKF failsafe: | Disarm |
| Pilot Input failsafe: | Disarm |
| Int. Temperature failsafe: | Warn only |
| Int. Pressure failsafe: | Warn only |

| Frame | |
|---|---|
| Frame Type: | Vectored 6DOF |
| Firmware Version: | 3.5.0 |
| Git Revision: | 7f63c31a |

Vehicle Setup
- Summary
- firmware
- Joystick
- Sensors
- Power
- Safety
- Mixers
- Camera
- Lights
- Frame
- Parameters

FIG. 18

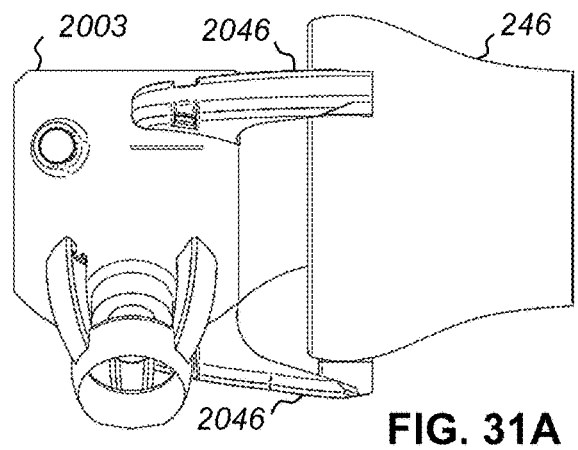
FIG. 31A
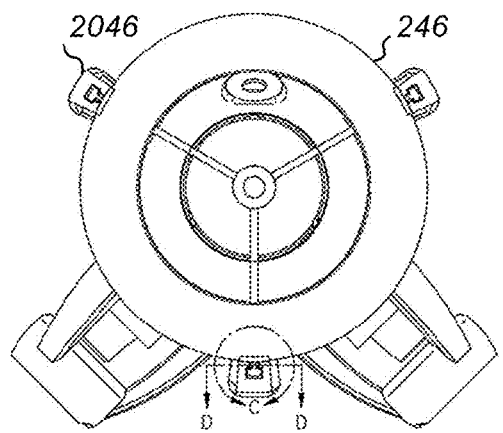
FIG. 31B
FIG. 31D
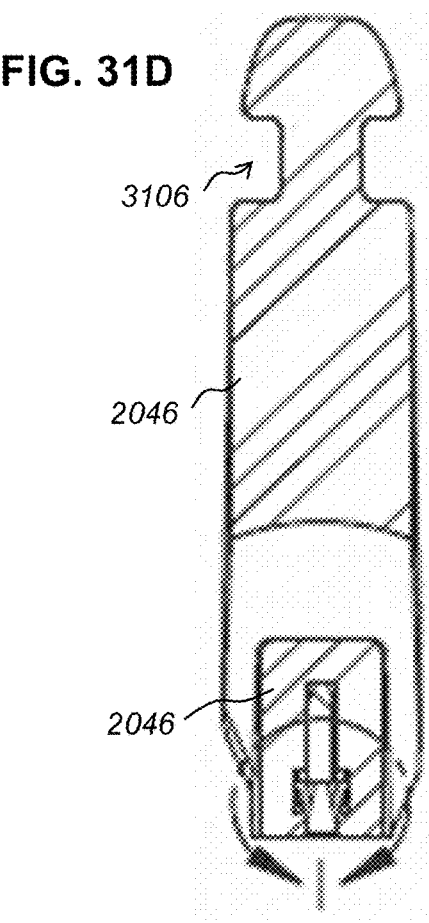
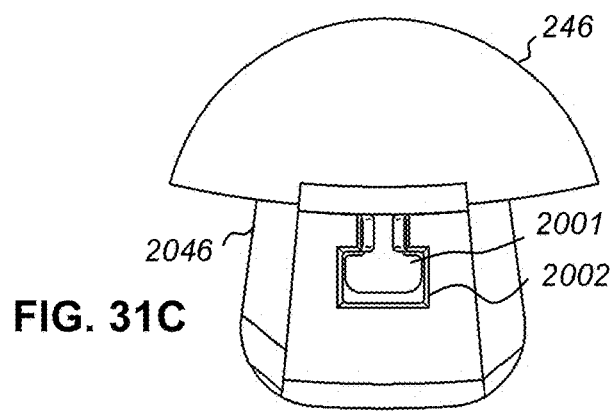
FIG. 31C
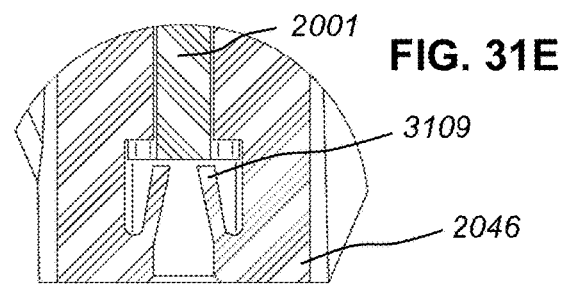
FIG. 31E

SYSTEMS AND METHODS FOR THE MODULAR ATTACHMENT OF ADDITIVELY MANUFACTURED COMPONENTS ON VEHICLES

CROSS REFERENCE TO RELATED APPLICATION

This non-provisional patent application claims the benefit, and incorporates herein by reference the disclosures in their entirety, of the following provisional patent applications: U.S. Provisional Patent Application No. 63/259,616 that was filed Jul. 29, 2021; U.S. Provisional Patent Application No. 62/973,045 that was filed Sep. 12, 2019; and, U.S. Provisional Patent Application No. 62/974,118 that was filed Nov. 13, 2019.

The present application is a continuation-in-part of the following utility patent applications: U.S. patent application Ser. No. 16/974,039 that was filed on Sep. 12, 2020; U.S. patent application Ser. No. 16/974,043 that was filed on Sep. 12, 2020; U.S. patent application Ser. No. 16/974,045 that was filed on Sep. 12, 2020; U.S. patent application Ser. No. 16/974,049 that was filed on Sep. 12, 2020; and, U.S. patent application Ser. No. 16/974,054 that was filed on Sep. 12, 2020. The present application claims the benefit, and incorporates herein by reference the disclosures in their entirety, of each of these utility patent applications.

STATEMENT OF GOVERNMENT INTEREST

The embodiments of the present disclosure may be manufactured and used by or for the Government of the United States of America for governmental purposes without the payment of any royalties thereon or therefor.

FIELD OF THE DISCLOSURE

The present disclosure relates in general to the fields of additive manufacturing and modular components, and in particular to systems and methods for modularly connecting components with additively manufactured connectors and ball bearings upon underwater vehicles that may be additively manufactured and include optical communication modules.

BACKGROUND

Unmanned Undersea/Underwater Vehicles (UUVs) and other unmanned and autonomous vehicles are highly specialized vehicles. Their configuration, payload and propulsion, as well as other attributes, are designed specifically for a single or very narrow range of missions. This fact results in the expenditure of significant nonrecurring engineering and development costs to make and manufacture each special purpose vehicle. These factors contribute to the cost of existing unmanned vehicles and UUVs making them especially expensive to produce and acquire.

Such specially designed vehicles also have very narrowly defined types of use and utility. This narrow range of uses, correspondingly limits the addressable market or numbers of potential purchasers, foreclosing opportunities to produce at numbers large enough to take advantage of economies of scale. The narrow range of uses for each vehicle is thus an additional factor in driving up the cost of production.

The weight, mass, drag, center of gravity, center of buoyancy, size and location of the control surfaces, as well as propulsion and electrical requirements for existing vehicles are fixed at time of vehicle design and manufacture. The vehicle cannot be modified in the field after manufacture. Expanding, altering, or changing the vehicle design to meet a wider or new range of customer needs requires redesigning, reconfiguring and re-manufacturing a completely new vehicle. Thus, UUV and unmanned vehicle designs and their missions remain fairly fixed once produced, devoid of new innovations and new capabilities.

The mission specific nature of the designs also drives operator costs and limits operator mission flexibility. To perform a different mission other than the one originally intended requires the purchase of another vehicle designed for that purpose. Operators often purchase a quiver of expensive UUVs to ensure that there is at least one UUV on hand capable of meeting the current mission requirements. For operations without such accommodating budgets, vehicle design often limits scope or curtails the ability to adapt the mission to changing conditions.

Specialized UUVs and autonomous vehicles often also include proprietary data busses, communications systems, and interfaces. These proprietary systems mean that components cannot be shared between vehicles and that a part from one vehicle cannot be used to repair another. These proprietary systems also mean that operators must expend time and resources to master the different communications protocols and systems architectures of each vehicle in their inventory; and to adopt specialized operating procedures and protocols.

The fixed nature of the vehicle design, especially but not limited to, factory sealed and enclosed UUV designs, means breakdowns in the field can often end an entire mission. Once a vehicle component or subsystem fails, the likelihood that it can be repaired or replaced in the field is very small. Malfunctions in the field can therefore end a mission. This situation can be very costly for the operator and introduce new hazards into a mission. By way of example, if a UUV were employed to survey an offshore oil and gas rig and that UUV failed: personnel and equipment must be retrieved, a replacement UUV procured, and the personnel and equipment redeployed. Not only does such a duplicate mission incur additional time and labor, but in a hazardous environment, the duplicative effort exposes additional unnecessary risks to personnel and equipment.

BRIEF SUMMARY OF THE DISCLOSURE

The following presents a simplified summary of the disclosure in order to provide a basic understanding of some aspects of the disclosure. This summary is not an extensive overview of the disclosure. It is intended neither to identify key or critical elements of the disclosure, nor to delineate the scope of the disclosure. Its sole purpose is to present some concepts, in accordance with the disclosure, in a simplified form as a prelude to the more detailed description presented herein.

According to one technical advantage, the disclosed systems and methods for modularly connecting a vehicle to components that may be additively manufactured. In certain embodiments, the vehicle may be additively manufactured. In some embodiments, the vehicle may be an underwater vehicle.

In certain embodiments, the disclosed systems and methods may include utilization of an additively manufactured underwater vehicle with an additively manufactured vehicle connector element. An additively manufactured first attachment may be adapted and provided for the underwater vehicle. The first attachment may include an additively manufactured first connector element. An additively manufactured second attachment may be adapted and provided for the underwater vehicle, and the second attachment may include an additively manufactured second connector element. The first attachment may be attached to the underwater vehicle by connecting the first connector element to the vehicle connector element. In an embodiment, this connection step may be accomplished by hand, without the use of tools. Alternatively, the connection may be performed by a machine adapted to attach and/or detach the first attachment. The underwater vehicle may be operated with the first attachment. The first attachment may be detached from the underwater vehicle by disconnecting the first connector element from the vehicle connector element. This disconnection step may be accomplished by hand, without the use of tools, or by the machine. The second attachment may be attached to the underwater vehicle by connecting the second connector element to the vehicle connector element. The underwater vehicle may be operated with the second attachment, which may be detached from the underwater vehicle by disconnecting the second connector element from the vehicle connector element. The connection and/or connection of the second connector element may be accomplished by hand, without the use of tools, or by a machine which may be the same machine adapted to attach and/or detach the first attachment.

In accordance with some embodiments, a benefit of the additively manufactured connectors may include a quick and reliable attachment for a modular-style attachment/component, such as a shroud, that may be mounted upon a vehicle. The connectors may operate as a mating system, which may include a female connector that receives a male connector. In accordance with certain embodiments, an exterior side of an additively manufactured vehicle may comprise the male connector while an end of an additively manufactured shroud may comprise an opening for the female connector that is adapted to receive the male connector. The opening of the female connector may include an internal clip that locks the make connector in place, such that the component is securely mounted upon the vehicle. The component may include multiple ends adapted to attach to corresponding connectors on the exterior surface of the vehicle. In certain methods for connecting a modular component to a vehicle, the openings on the component ends may be configured to receive nubbins on the external body of a vehicle. Upon insertion of the nubbins within the openings, the component may be rotated along an axis perpendicular to a surface of the vehicle. The rotation may continue until a clip within the opening is engaged. In some embodiments, the nubbin of a male connector may traverse a longitudinal opening of a corresponding female connector. The nubbin may bias the clip against a slot within the opening, as it traverses the opening, holding the clip in an unlocked position. Upon passing the length of the clip, the nubbin reach the distal end of the opening and the clip may be released into a locked position. A benefit of the disclosed system includes the clip preventing undesired detachment of the modular component from the vehicle when the vehicle and its components experience vibration while traveling across a turbulent path, e.g. undersea. In some embodiments, the clips may prevent undesired rotation of a shroud. Additionally, because the clip may be adapted to withstand external forces, the mounting points of a component on the vehicle may be strengthened and the points of failure may be decreased.

In certain embodiments, the connection mechanism between the vehicle and its modular components do not require bolts, screws, or epoxy. The components may be mounted, and the connection may be sealed to prevent water intrusion, without any bolts, screws, or epoxy. In some embodiments, neodymium magnets may be used to secure the components or modules to the exterior of the vehicle, e.g. the hull. In an embodiment, ball bearings may be utilized to reduce the amount of friction between modules. In contrast to inferior mechanisms of tradition implementations where a spinning module would rest directly against a hull such that the spinning action would create a high degree of friction leading to wear and damage, the presently disclosed ball bearings may be set in a ring to reduce the amount of friction and increase the longevity of the modular components.

In some embodiments, an underwater vehicle may utilize an optical module to communicate underwater. The vehicle may communicate with one or more underwater vehicles having optical modules. The optical module may be include a quick and reliable attachment/detachment mechanism for connecting and disconnection to the configurable vehicle that may be additively manufactured. The optical module may be adapted to include a nephelometry capability, as well as a turbidimetry capability, utilizing a transmitter and detector circuits. The nephelometry capability may measure the intensity of the scattered light in the surrounding seawater, while the turbidimetry capability may measure the intensity of light transmitted through the surrounding seawater.

Further advantages and features of the present disclosure are illustrated in the drawings and described in detail below.

BRIEF DESCRIPTION OF THE DRAWINGS

The foregoing and other objects, features, and advantages for embodiments of the present disclosure will be apparent from the following more particular description of the embodiments as illustrated in the accompanying drawings, in which reference characters refer to the same components throughout the various views. The drawings are not necessarily to scale, emphasis instead being placed upon illustrating principles of the present disclosure.

FIG. 18 is a graphical user interface for configuring an autonomous vehicle, in accordance with certain embodiments of the present disclosure.

FIGS. 31A-E illustrate examples of an additively manufactured connector adapted for attaching to a shroud, in accordance with certain embodiments of the present disclosure.

DETAILED DESCRIPTION OF THE DISCLOSURE

Figure 1A:
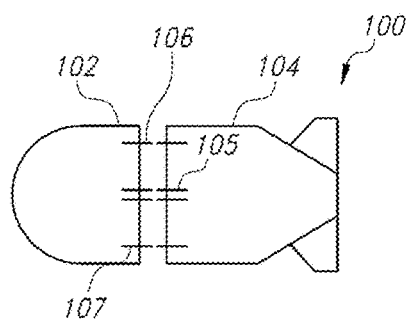
FIGS. 1A-1D illustrate several embodiments of a field configurable autonomous vehicle, in accordance with certain embodiments of the present disclosure.

Reference will now be made in detail to the embodiments of the present disclosure, examples of which are illustrated in the accompanying drawings. The present disclosure may be embodied in various forms, including systems and methods for modularly connecting attachments/components, which may include additively manufactured connectors and ball bearings, upon underwater vehicles that may be additively manufactured and that may utilize optical modules to communicate underwater utilizing nephelometry and/or turbidimetry. In certain embodiments, a benefit of generating additively manufactured modules for vehicles may be appreciated due to the large size of vehicles and their components.

Given the size restrictions for generating products via additive manufacturing techniques, such as 3D printing, the present disclosure of generating additively manufactured modules solves several technical problems. As discussed below, the modularity of the presently disclosed vehicles enable the vehicles to be configurable by attaching and detaching attachments, components or elements in order to equip or reconfigure the vehicles to handle specialized sets of tasks.

The ability to generated, via additive manufacturing techniques, and attach specialized components on demand in various fields of use further enables the deployment specialized vehicles capable handling mission-specific orders that are subject to change based on unpredictable events. During warfare, deployed components for vehicle may also be limited in quantity and may prematurely depleted. The fabrication of additively manufactured modules may address such shortages of inventory, and enable the repair of vehicles in the field via additive manufacturing techniques. While larger 3D printers might be constructed to accommodate the fabrication of larger products, the usage of additive manufacturing techniques in remote fields may depend on 3D printing devices of limited size that are necessarily portable. The benefits also include the cost-efficient fabrication of a vehicle and its components entirely from composite or plastic materials. In certain embodiments, such materials may include non-porous materials or other materials designed not to rust and to prevent the penetration of water past the exterior surface to the interior of a vehicle. These technical benefits may be appreciated for underwater vehicles, as well as other vehicles exposed to high amounts of precipitation, moisture or humidity.

1.0 Vehicle Overview and Configurable Components

FIGS. 1A-1D show several embodiments of a field configurable vehicle 100 according to the present disclosure. In accordance with certain embodiments of the present disclosure, a vehicle 100 may be configurable when a module, attachment, component or element 104, 108, 109, 110 may be attached and detected from the body of the vehicle or hull 100, so as to change the configuration of (i.e. reconfigure) the vehicle 100 by the addition or removal of such module/attachment/component/element 104, 108, 109, 110 in relation to the body of the vehicle 100. In certain embodiments, a vehicle 100 may be field configurable when such items may be attached and detected from the body of the vehicle 100 at a location where the vehicle 100 is intended to be operated. Such a location may be an ocean or sea for an underwater vehicle. Accordingly, a field configurable underwater vehicle 100 may be reconfigured by the addition or removal of a module/attachment/component/element 104, 108, 109, 110 from the body of the vehicle 100 while at ocean or sea. Accordingly, such a vehicle 100 may be modified in the intended field/location of operation such as an ocean or sea. In an embodiment, the operational field may be different from the location where the vehicle 100 was manufactured.

In the embodiment of FIG. 1, vehicles 100 are shown as a UUV, but vehicle 100 may comprise other uses and vehicle types, such as, for example, drones, helicopter drones, unmanned autonomous aircraft (UAS), toys, or other autonomous vehicles and devices. In the embodiment of FIG. 1A, vehicle 100 comprises a first modular section 102, paired with a second modular section 104. Front section 102 mates with rear section 104 using any of a variety of field joints. According to an embodiment of the present disclosure, section 102 mates mechanically and electrically using the mating system described further below.

Bus 105 electronically couples module section 102 with module 104. Bus 105 can be used for a variety of functions. In a simple embodiment, bus 105 routes electrical power throughout the vehicle. In more elaborate embodiments, bus 105 may further comprise multiple buses including data buses 106 and 107 in addition to power distribution bus 105. Data buses can be used to route command and control signals throughout the vehicle to operate the propulsion system, sensors, store and operate on data, or operate other subcomponents as desired. Power and data buses and their physical and logical architectures are well known to those of skill in the art. Additional details of one possible bus configuration is described in subsequent sections below.

Figure 1B:
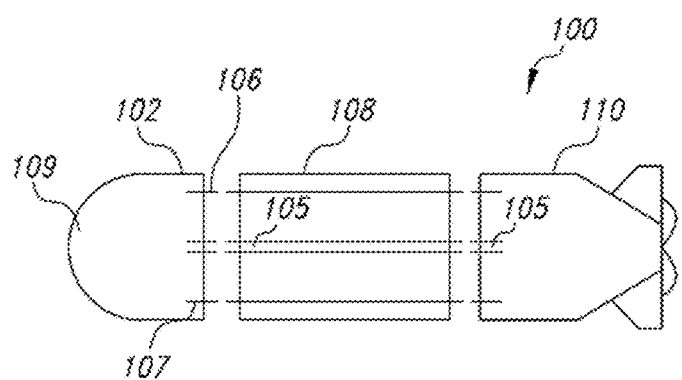
Figure 1C:
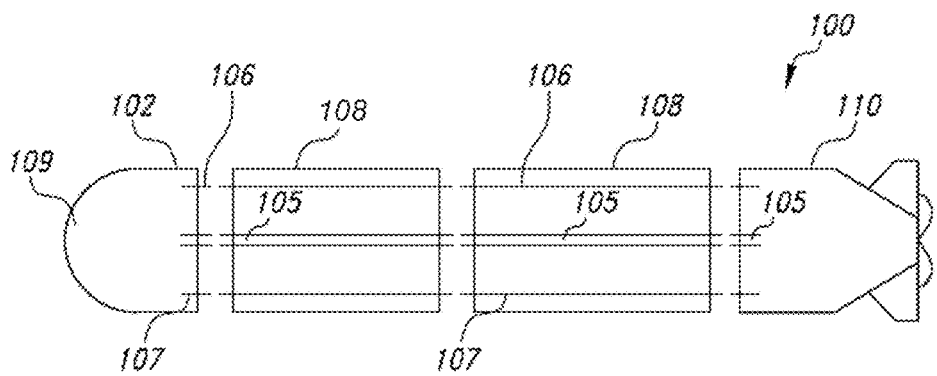
Figure 1D:
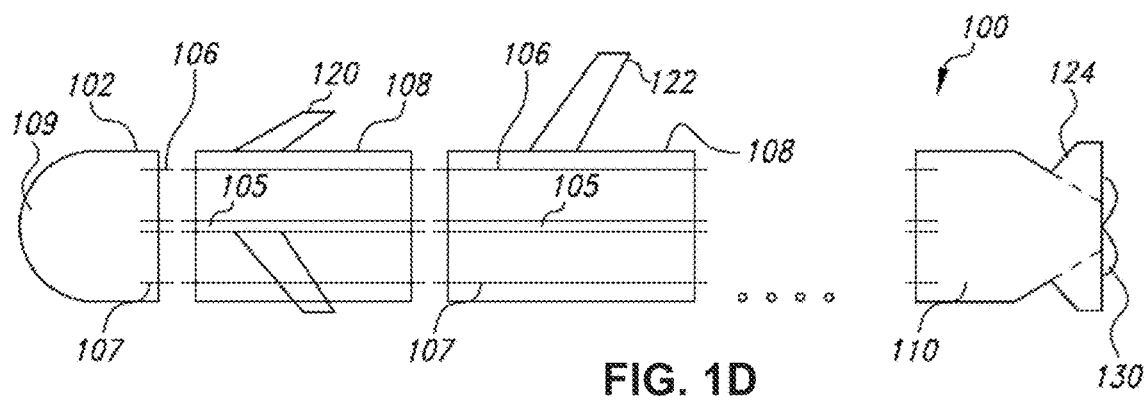

FIGS. 1B-1D illustrate the additionally modularity and configurability of the present disclosure. In FIG. 1B, vehicle 100 comprises three modular sections 108, 109, 110. In the embodiment of FIG. 1B, modular section 108 may comprise any one of a number of types of modules have multiple purposes or attributes. For example, module 108 may comprise a payload module useful for transporting and delivering a cargo from one location to another. Module 108 may also include other additional hardware and attributes having multiple features and capabilities. For example, module 108 can include a temperature or imaging sensor system in addition to a cargo delivery capability. Module 108 pairs mechanically and electrically with modules 109 and 110 in the same manner as described in connection with FIG. 1A.

FIG. 1C further illustrates the modularity and field configurable nature of the present disclosure. In the embodiment of FIG. 1C, vehicle 100 can comprise a plurality of modules 108, each with unique and separate capabilities, or alternatively with duplicate functions and purposes. Such plurality of modules 108 may comprise one or more of the following modules, as described below: payload/ballast modules 396, payload/ballast/propel module 1704, parasitic module 2044, magnet module 2049, propulsion module 2199, scuttle module 2360, scuttle module 2390, power module 2420, logic module 2500, logic module 2520, software module 2540, mass redistribution and configuration module 2750, optical communications module 2800, ballast module 3010, command module 3015, battery module 3020, and/or sensor module 3005.

FIG. 1D shows that in addition to discrete modules 108, various control surfaces 120, 122, and 124, propulsion mechanisms 130 and other external attachments may be attached to configure vehicle 100. In FIG. 1D, control surface 122 comprises a sail plane and control surface 120 comprises a stabilizer. Control surfaces 120 and 122, as is known to those of skill in the art, orient the vehicle in pitch, roll and yaw. Different types of control surfaces beyond those shown in FIG. 1D, including but not limited to, rudders, elevators, bow planes, and canards may also be attached or detached to reconfigure vehicle 100 as desired.

FIGS. 2A-2D illustrate alternative embodiments of field configurable autonomous vehicles 200 and 250 according to the present disclosure. In the embodiments of FIGS. 2A-2D, the field configurable vehicle 100 is a UUV 100 comprising a sphere 201. The UUV 100 of FIGS. 2A-2D may be configured using the apparatus and methods of the present disclosure by adding or removing modular devices such as different propellers 210, or different thrusters 220, different control surfaces 230, or different sensors and communications packages 240.

Figure 2A:
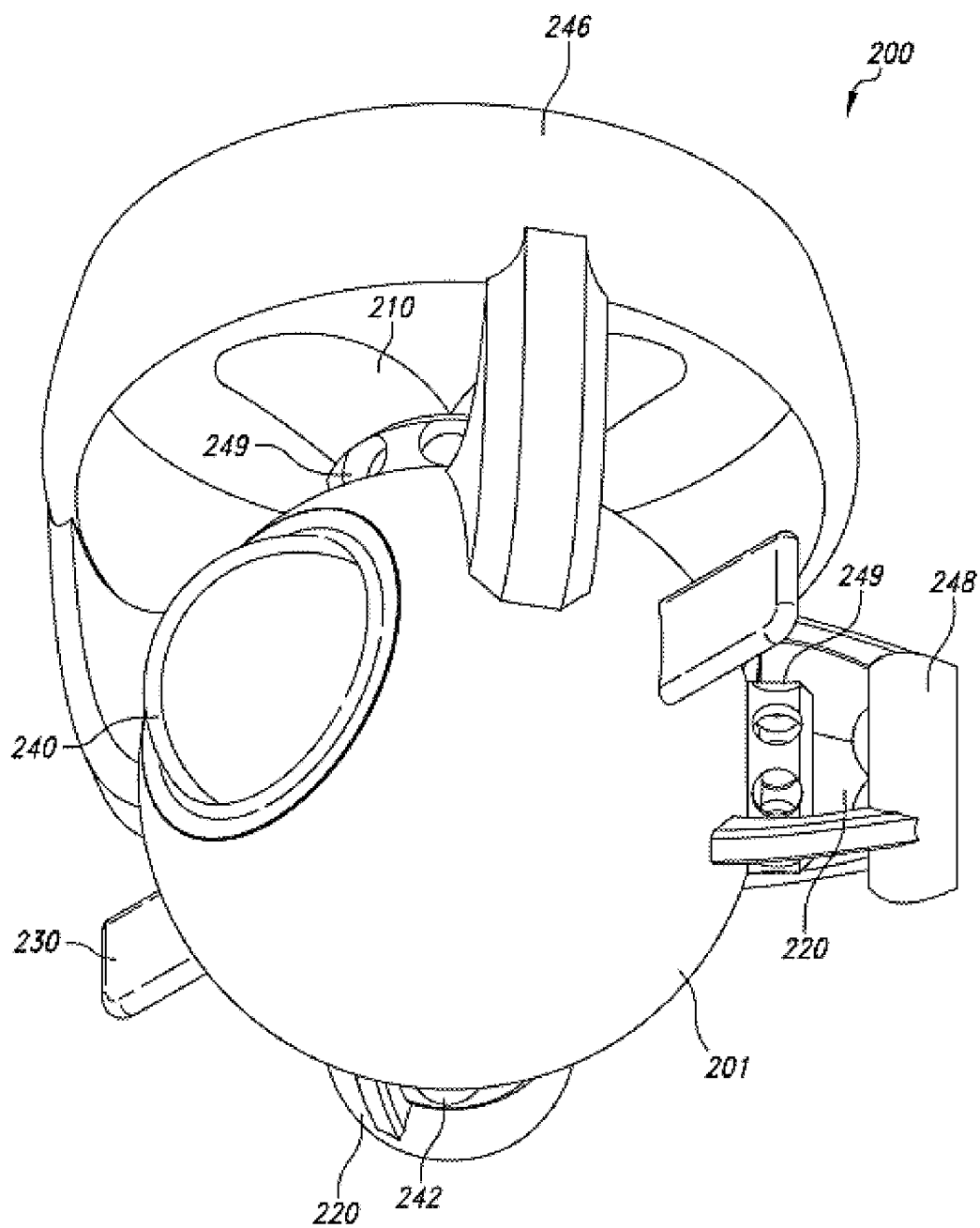
FIGS. 2A-2D illustrate alternative embodiments of a field configurable autonomous vehicle, in accordance with certain embodiments of the present disclosure.
Figure 2B:
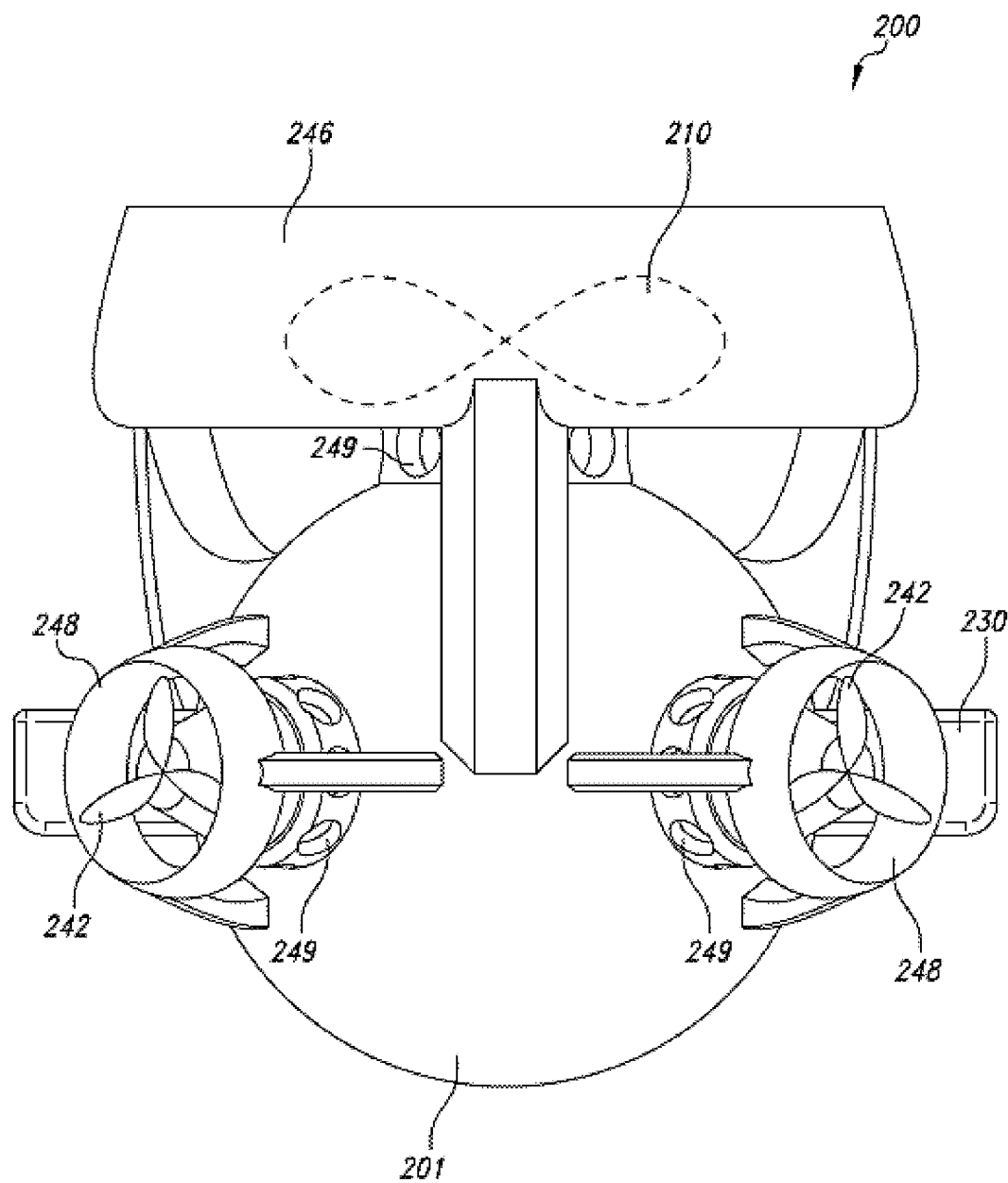
Figure 2C:
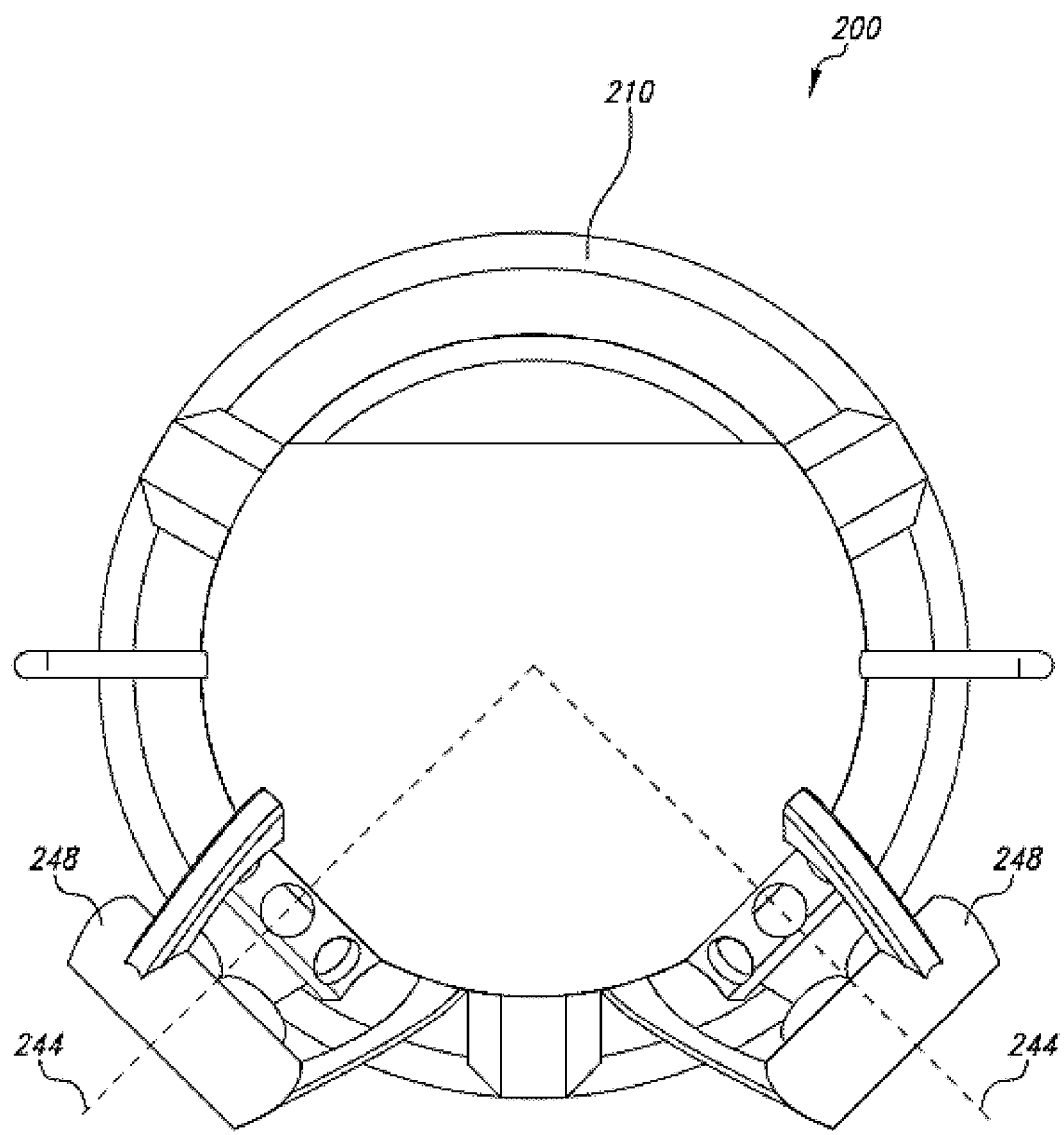

In the field configurable UUVs 100 of FIGS. 2A-2D, thrusters 220 which may include propellers 242 are oriented as shown in FIG. 2C. The vector line of action 244 of each thruster 220 may be orthogonal to each other and pass through the center of gravity of UUV 200. In an embodiment of the present disclosure, the mass distribution of UUV 200 is designed such that the center of gravity, and center of buoyancy, is collocated with the center of sphere 201. UUV 200 may also, according to embodiments of the present disclosure, designed to be slightly positively buoyant.

The vector line of action of propeller 210 may also pass through the center of gravity of UUV 200. Changing the speed of any of individual propeller 242 or 210 results in a thrust vector that can reposition or assist in station keeping UUV 200 without the introduction of significant unwanted moments about the axes of the vehicle 200 that must be then counteracted by the control systems/surfaces of the vehicle 200 to maintain vehicle attitude and orientation. This fact results in significant translational motion flexibility and minimizes off axis torques which, if present, would need to be counteracted by the control systems of the vehicle 200, with corresponding adverse impact on vehicle performance, handling, and endurance.

The UUV 200 of FIGS. 2A, 2B, additionally includes shrouds 246 and 248 surrounding propellers 210 and 242 respectively. Shrouds 246 and 248 serve as a safety mechanism to prevent hands or clothing from being caught in a moving propeller. Shrouds 246 and 248 also protect the propellers from collision damage and deflect debris or plant life that may be in the water column. Shrouds 246 and 248 additionally help direct flow axially. A series of openings 249 surrounding each propeller assembly allow fluid moved by each of propellers 210 and 242 to escape past the vehicle.

Figure 2D:
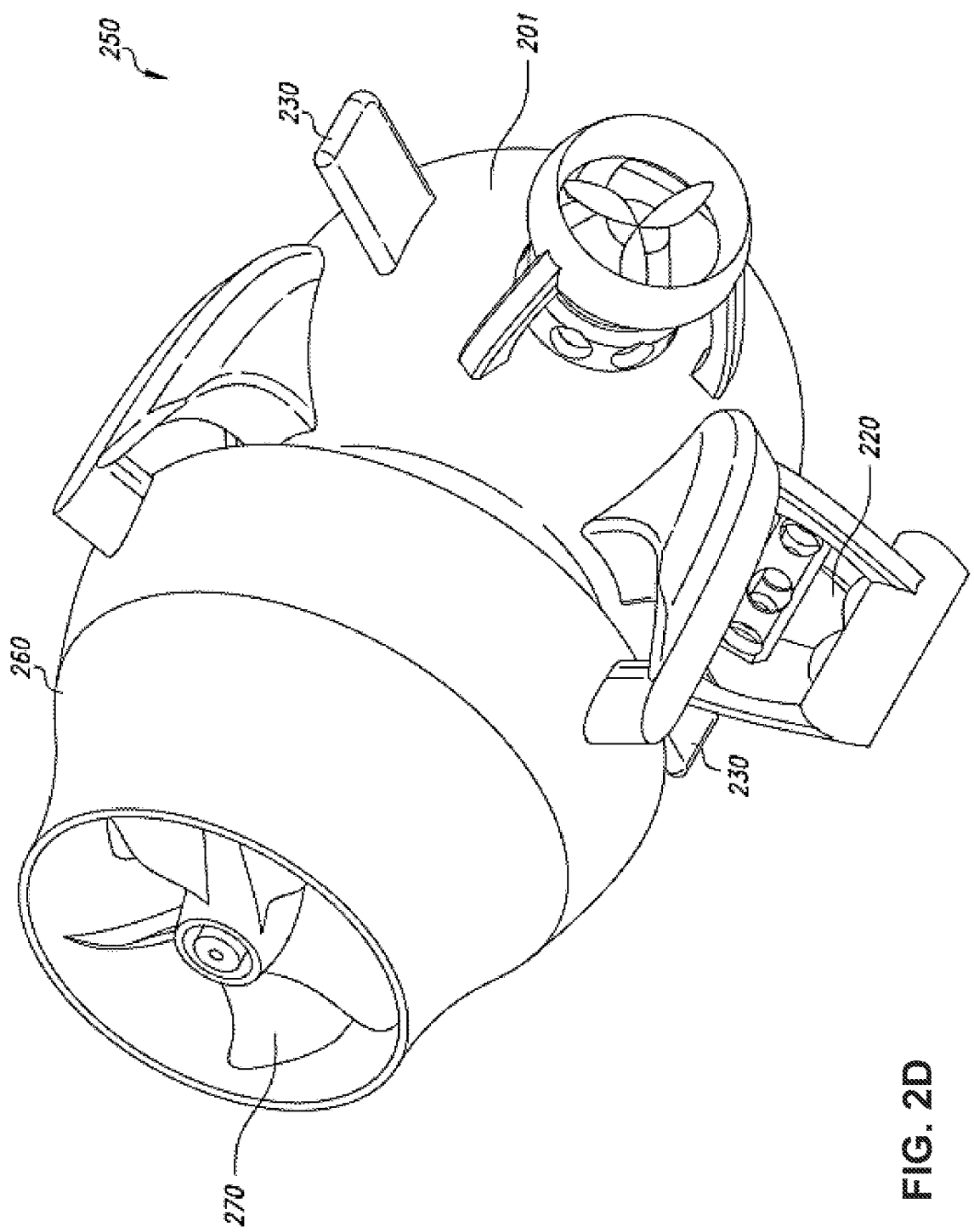

FIG. 2D illustrates an alternative spherical UUV 250 wherein UUV 250 additionally includes an extended shroud 260 and counter-rotating propeller assembly 270. Counter rotating propeller assembly 270 may also be constructed, according to the teachings of the present disclosure, as described more fully below. Counter rotating propeller assembly 270 minimizes roll torque imposed on the vehicle by the rotating motion of the propellers. Extended shroud 260 may additionally include internal vanes that separate out and direct the wash from the multiple propellers to prevent the propellers from interfering with each other.

Figure 3A:
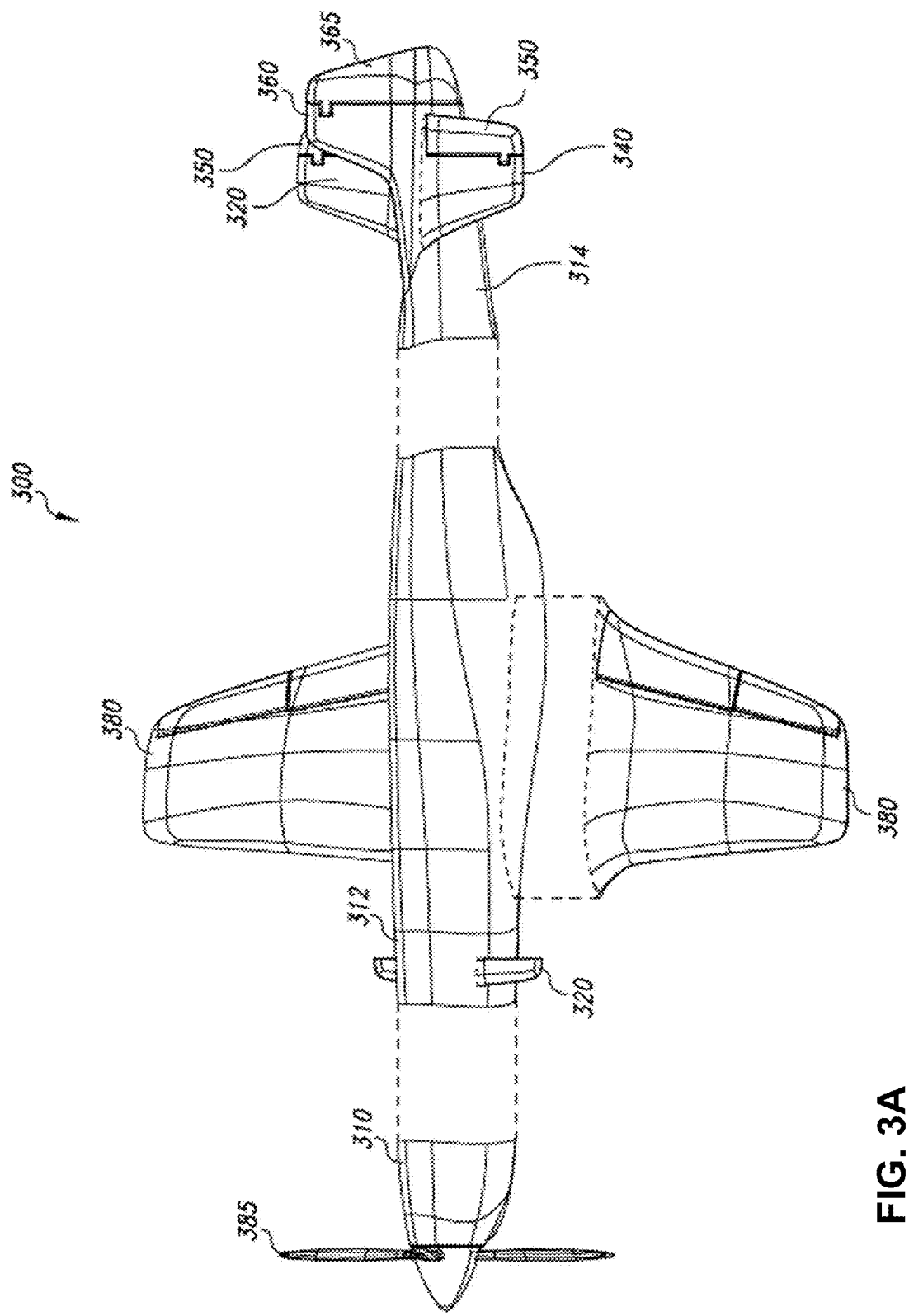
FIGS. 3A-3B illustrate other alternative embodiments of a field configurable autonomous vehicle wherein the vehicle is an airborne vehicle, in accordance with certain embodiments of the present disclosure.
Figure 3B:
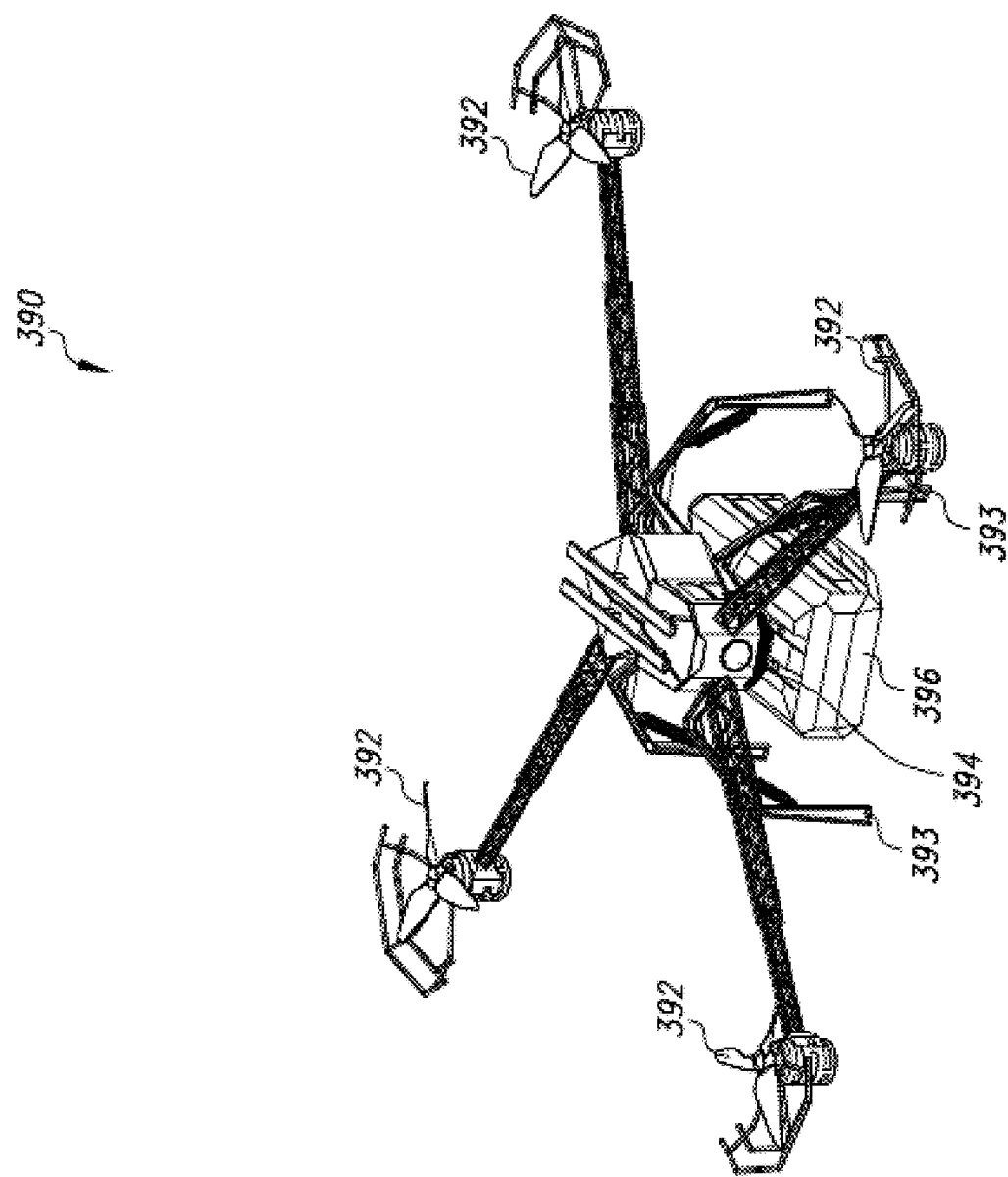

FIGS. 3A-3B illustrate other alternative embodiments of a field configurable autonomous vehicle according to the present disclosure wherein the vehicle is an airborne vehicle. In FIG. 3A, a field configurable autonomous aircraft 300 may be assembled from two or more modular units 310, 312 and 314 in the same manner previously described in connection with FIGS. 1A-1D. The aircraft of FIG. 3A may also be configured, in accordance with certain embodiments of the present disclosure, by attaching modular control surfaces such as, for example: a canard 320; a horizontal stabilizer 340 with elevators 350; a vertical tail 360 with rudder 365; one of a selection of wings 380, and a propulsion module or system propeller 385.

FIG. 3B shows an airborne modular vehicle 390 constructed according to the present disclosure wherein the airborne modular vehicle 390 comprises a helicopter-type drone. Drone 390 may be modularly configured by, for example, attaching different shapes of rotating propellers 392, adding or removing different footings or landing gear 393, adding or adding or removing different sensor packages 394, or adding or removing payload or ballast modules 396. As will be clear to those of ordinary skill in the art, the modular concepts of the present disclosure can apply equally to other types of airborne vehicles such as model aircraft, lighter than air (LTA) airborne vehicles such as blimps, dirigibles, and controllable balloons, as well to radio controlled UAS vehicles, and toys.

Figure 4A:
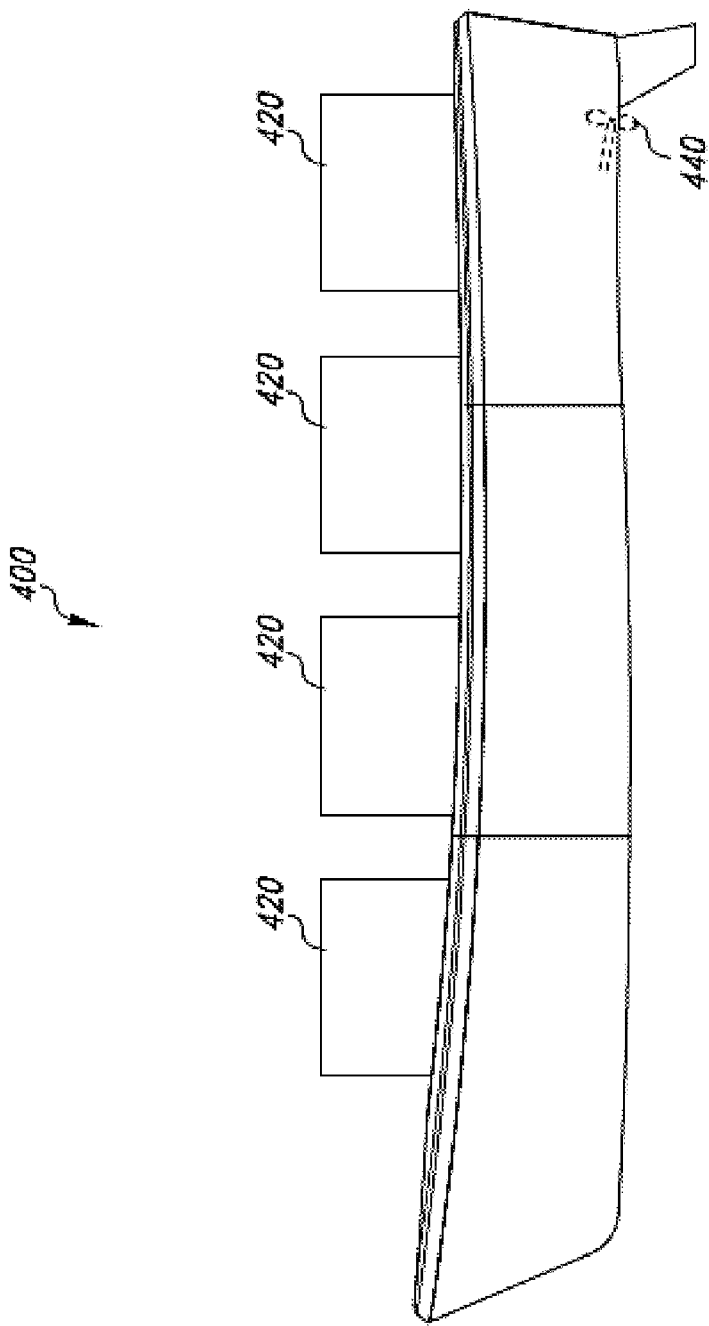
FIGS. 4A-4B illustrate yet another alternative embodiment of a field configurable autonomous vehicle wherein the vehicle comprises a surface vehicle such as an autonomous toy truck or a boat, in accordance with certain embodiments of the present disclosure.
Figure 4B:
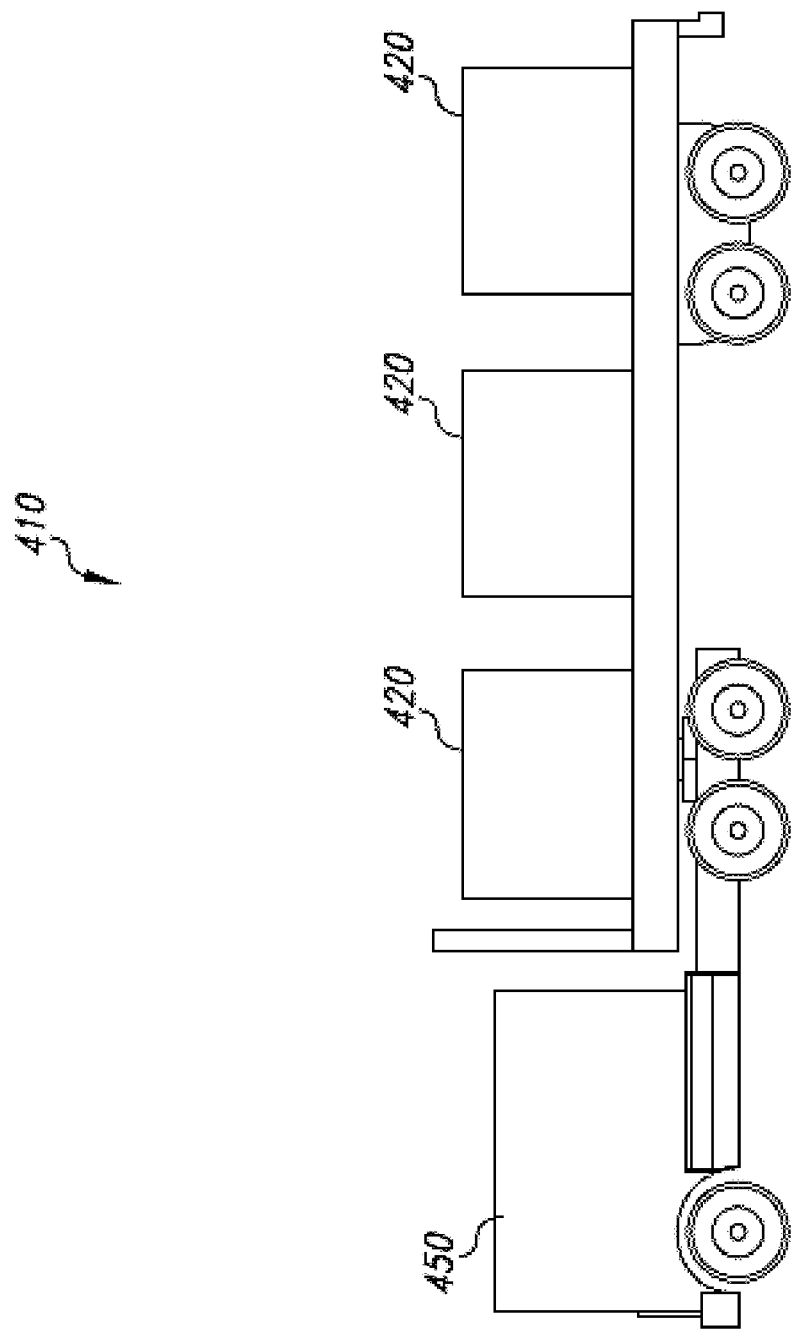

FIGS. 4A-4B illustrate yet another alternative embodiment of a field configurable autonomous vehicle, according to embodiments of the present disclosure, wherein the vehicle comprises a surface vehicle such as an autonomous boat 400 or a toy truck 410. Surface vehicles 400 and 410 may be configured as desired by attaching and removing payloads 420, propellers 440, power pack 450 or other modular items in a manner as described previously in connection with FIGS. 1-3 above.

Solely for ease of discussion, the various modular components and vehicle subsystems shall now be further described with reference to vehicle 100 of FIGS. 1A-1D. The principles, methods, and apparatus described below also apply to any field configurable autonomous vehicle including, but not limited to, those described in FIGS. 2-4.

1.1 Module Fabrication and Field Joints for Connecting Modules and Elements

Module hulls, components and connectors may be fabricated from a variety of materials, such as, for example, metals, composites, or plastics; using a variety of techniques known to those of skill in the art, such as machining, molding, casting. In an embodiment of the present disclosure, modules can be fabricated using additive manufacturing techniques, such as, for example, 3D printing. When modules are formed of composite materials, modules can be spun on a drum or spindle in a manner used in the textile industry or similar to that used in the aerospace industry to make the composite hull of the B787 aircraft. When modules are intended for use as a UUV or in other applications that may include exposure to water, modules are formed from non-porous materials or other materials designed to prevent the penetration of water past the hull to the interior of vehicle 100.

In one embodiment of the present disclosure, module hulls are manufactured using additive manufacturing techniques known to those of skill in the art. The modules may be made of materials that are well known in the art, including PA-12 nylon; and are formed in two longitudinal halves with closed ends having a mechanism for joining with other modules. Prior to assembling the halves together, the internal components of each module can be placed or secured in the interior; and then the halves joined together to make the model. The halves may be joined mechanically or via heat soldering or adhesives using techniques known to those of skill in the art.

Modules initially manufactured with open ends can be sealed at each end to protect interior components from damage and from ingress of dirt, grime and water. In one embodiment of the present disclosure, the module is additionally filled with an engineered fluid for heat transfer such as NOVAC manufactured by 3M. The engineered fluid manages heat from electronics contained within the module and maintains the interior temperature of the module within a desired range to guard against damage to the electronics. The fluid may be injected into the module after its manufacture via an injection port which is then sealed closed. According to an embodiment of the present disclosure, modules and elements manufactured using additive manufacturing techniques can be formed with capillaries in the hull wall structure. The capillaries are in fluid communication with the engineered fluid or may themselves contain the engineered fluid. The system of capillaries transfers heat from the interior of vehicle 100 to the exterior of vehicle 100. Optionally thermal management of each component module may be accomplished by including heat sinks, such as metal strips, in lieu of or in addition to use of engineered fluids.

When a vehicle 100 comprises a UUV 100 manufactured from HP-12 nylon, the wall thickness of the hull must be sufficient to withstand pressure at the maximum operating depth of the vehicle 100. According to one embodiment of the present disclosure, a wall thickness of 5.5 mm enables operation of UUV 200 at depths of 200 m with adequate safety factors. Exact specifications are dependent upon the water density and the safety factors chosen, as well as the forces exerted upon the vehicle during vehicle manoeuvres. Sizing of the hull wall thickness depending upon the material properties, operating environment, and mission parameters of vehicle 100 is well known to those of skill in the art.

Figures 5A, 5B:
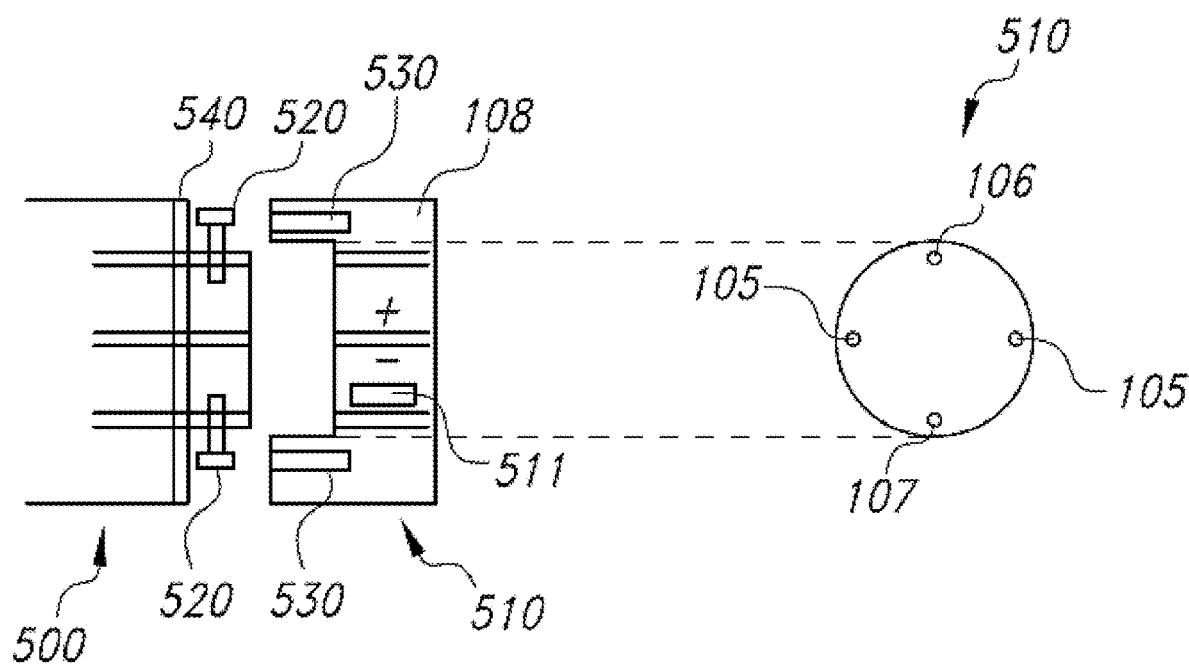
FIGS. 5A-5F are views of module and element joining systems, in accordance with certain embodiments of the present disclosure.

FIGS. 5A-5F show enlargements of a module joining system, according to an embodiment of the present disclosure. As shown in FIG. 5A, each module includes a male connection 500 on a first end and a female connection 510 on a second end. Male connection 500 further includes pins 520 that slide into corresponding slots 530 in female connection 510. To secure module 108 to another module, male connection 500 slides into the female connection of the adjacent module and module 108 is rotated until approximately ninety degrees until pins 520 lock in place. Sealing gasket 540 prevents water from entering between the joint. Pressing the modules slightly together as they are joined helps to seal sealing gasket 540. As shown in FIG. 5A, the female end 510 of module 108 would similarly mate to the male end of an additional module in the manner described above.

FIG. 5B illustrates an end view of the female portion 510 of the joining system of FIG. 5A. In FIG. 5B, module electrical connection points are located at 0° (top dead center); 90°; 180°; and 270° in relation to the center point for the end view of the female portion 510. The positive lead of power bus 105 is located at the 90° point. The negative lead of power bus 105 is located at the 270° connection point. According to an embodiment of the present disclosure, a connection point of solid material assists with maintaining the strength and rigidity of the hull, and can include pogo-type connectors as shown in FIG. 5A.

Figure 5C:
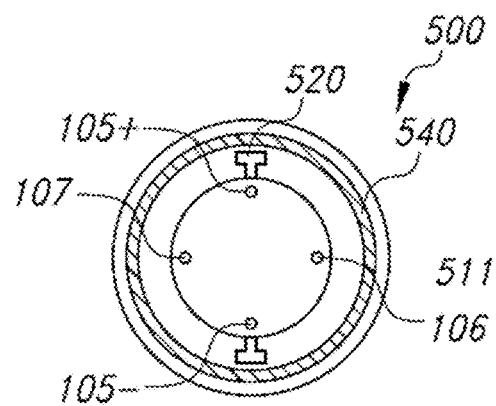

FIG. 5C shows an end view of male connector 500. On male connector 500 the CAN bus lead is located at an orientation 90° to the corresponding CAN bus lead on female connector 510. As the modules join and are twisted and locked into place, the CAN bus leads on male connector 500 and female connector 510 align, making the data bus and power bus connections between modules. An optional light emitting diode (LED) 511 can be coupled to power bus 105 and included with each configurable module or element. LED 511 can be included on a single end or on both male and female ends 500 and 510 as shown. When power is present on power bus 105 and one module is joined with another, LED 511 will illuminate to confirm to the operator that the modules are joined correctly and that electrical contacts have been made. LED 511 may optionally include a timer or be coupled to data bus 106, 107 to limit the length of time LED 511 flashes.

In an embodiment of the present disclosure, LED 511 may also be coupled to a module microprocessor. When power is supplied to the module, the module microprocessor can initiate a series of module systems self-checks that query and verify the operational status of the module subcomponents and optionally any attached elements. If the self-checks are concluded satisfactorily, LED 511 may blink or flash a first sequence; and if any of the self-checks fail, LED 511 may blink or flash a second sequence. For example, if when a navigation module is joined to a power module and all navigation systems are functioning properly, LED 511 may simply remain lit without flashing for a period of 5 seconds. If, however, a navigation component failed the self-check sequence, the module microprocessor could command LED 511 to steadily blink, for example, at the rate of one flash every half second.

Figure 5D:
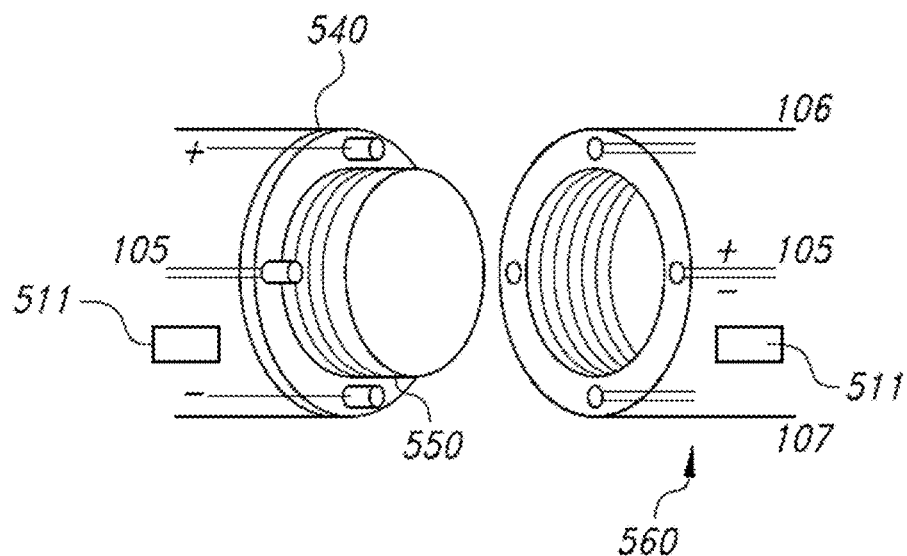
Figures 5E, 5F:
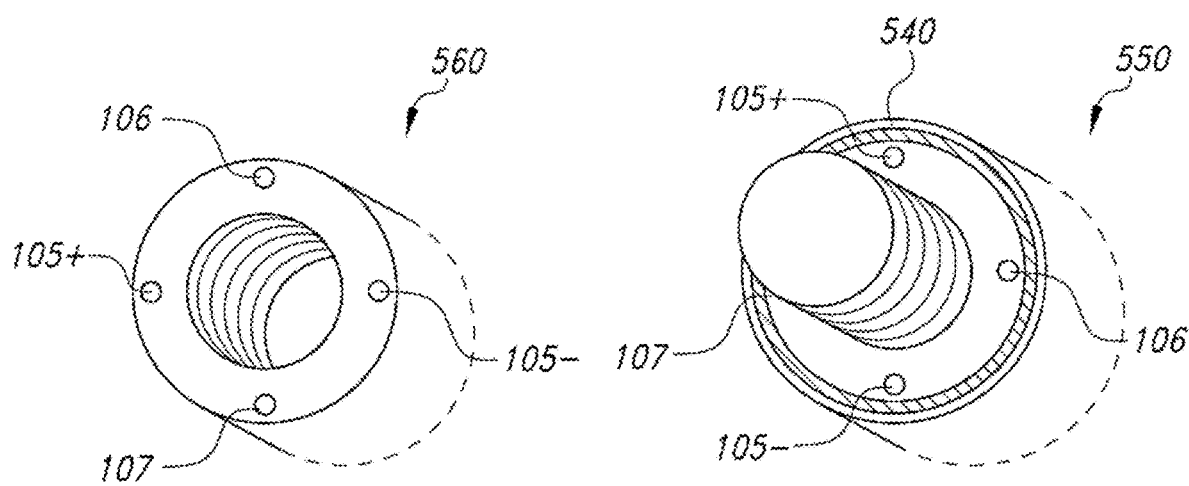

An embodiment of the present disclosure, shown in FIGS. 5D-F, uses a threaded connection to join the modules together. In the embodiment of FIG. 5D, a male threaded connector 550 threads into a female connector 560. In the embodiment of FIG. 5D, CAN bus 106, 107 is located about the center of the module as illustrated in FIGS. 5E-F. The thread count of male connector 550 is such that when paired with female connector 560 and screwed into place, CAN bus 106 and 107 align properly with their counterpart in the opposing module and the proper connections are made. As in the previously described embodiment, an LED 511 may be included to visually confirm proper connections and a sealing gasket 540 included to create a water tight seal, protecting the electrical connections and preventing corrosion.

Should there exist certain modules that should not be connected to each other, or modules that should be connected in a certain sequence, then the male and female ends of such modules can be specially sized or configured. In this manner, modules cannot be mated with an incompatible module or mated in an unacceptable sequence. For example, if one module contains hazardous cargo, there may exist an objective to avoid placing that module next to an ignition source such as the power module, or next to a communications module.

Modules can also be color or visually coded to visually indicate the type of module to the operator. For example, propulsion modules could be colored yellow; power modules colored green, and hazardous modules colored bright orange. In this manner, an operator can readily identify the type of module or element without having to read a placard or look for other identifying indicia. This feature also assists with avoiding the pairing of incompatible modules. According to an embodiment of the present disclosure, the pattern or color may be included as part of the module manufacturing process by simply selecting the fabrication material to be of a certain color. The exterior of vehicle 100 modules may optional include reflective tape or material to assist with locating and retrieving vehicle 100.

At the conclusion of a mission, the modules can be separated from each other and returned to storage for later use and configuration of a new vehicle. To separate the attached modules, the modules are simply rotated in an opposite direction from the direction of attachment. In the embodiment of FIGS. 5A-5C, this act causes pins 520 to unseat from and clear pin slots 530. In the embodiment of FIGS. 5D-5E, male connector 550 is simply unscrewed from female end 560. The construction of the male and female connectors as shown does not damage or introduce wear on any of power buses 105 or data buses 106, 107.

1.2 Module Data Bus and Electrical Distribution System

Vehicle 100 may optionally include an electrical distribution system in the form of a power bus 105; and a data bus 106, and 107 for routing electrical power and data between modules. In an embodiment of the present disclosure, power and data buses 105, 106 and 107 may comprise a Controller Area Network (CAN) bus commonly used in modern automobiles that are well known in the art.

One advantage of the CAN bus architecture is that it permits microcontrollers to communicate with each other and share data between applications without the need for an additional host computer. The CAN message based system ranks vehicle commands according to the CAN bus defined logic and gives priority on the CAN bus to urgent commands followed by lower priority message traffic.

FIG. 5B shows an end view of the female connector portion 510 of FIG. 5A in which a CAN bus architecture can be seen. The CAN bus includes two wires CAN-High (CAN-H) 107 and CAN-low (CAN-L) 106 for carrying data signals. FIG. 5B also shows power bus 105. Other bus systems known to those of skill in the art may be employed, such as for example, an ARINC 429 bus or IEEE 802.11 architectures.

According to an embodiment of the present disclosure, the electrical distribution system of vehicle 100 includes two wires (+/−) 105 that form the power bus. The power bus nominally carries 30 volts DC at 20 amps. Power can be supplied by batteries within each module or a single battery module that routes power via the power bus 105 to connected modules. A solar cell may also be included on the power module to recharge the batteries or to supply power directly.

1.3 Magnets for Modular External Elements, Transit, and Drive Systems

In tradition implementations, vehicles external devices and attachments must mate with the main body of the vehicle via a shaft or other mechanical attachment that penetrates the hull. The hull penetrations of those implementations allow dirt and particulate to enter the interior of the vehicle. These contaminants can in turn compromise the electrical contacts between connectors and circuitry on the interior of the vehicle. Buildup of these contaminants in the form of grime, can also foul the operation of moving parts within the vehicle. When the vehicle comprises a UUV, the interior of the vehicle must be sealed off to prevent the ingress of seawater and prevent capsize or loss of the vehicle.

Hull penetrations, especially those for transmission of motion, must therefore be carefully designed and maintained. Hull penetrations thus add significant cost to vehicle design, fabrication, and maintenance. Traditional methods for sealing hull penetrations rely on a combination of epoxy "potting", requiring semi-permanent assemblies; elastomer seals, which can degrade with time; or novel mechanical sealing methods, requiring stringent design and fabrication considerations. When the vehicle is a UUV, even partial failure of these seals provides an avenue for water ingress that endangers sensitive electronics or corrodes internal components.

The magnetically coupled drive systems and control surfaces may eliminate the costs and failure points related to shaft seals and hull penetrations in traditional unmanned vehicles. A configurable vehicle, according to the present disclosure, minimizes or eliminates the need for hull penetrations by employing magnetics to attach certain configurable components to the exterior of the vehicle. Magnets may also be employed in the drive and propulsion system of the vehicle to provide similar advantages in minimizing hull penetrations while additionally providing an efficient and pollution free means of vehicle propulsion.

1.3.1 Overview of Magnets and Diametric Magnet Principles

Figure 6A:
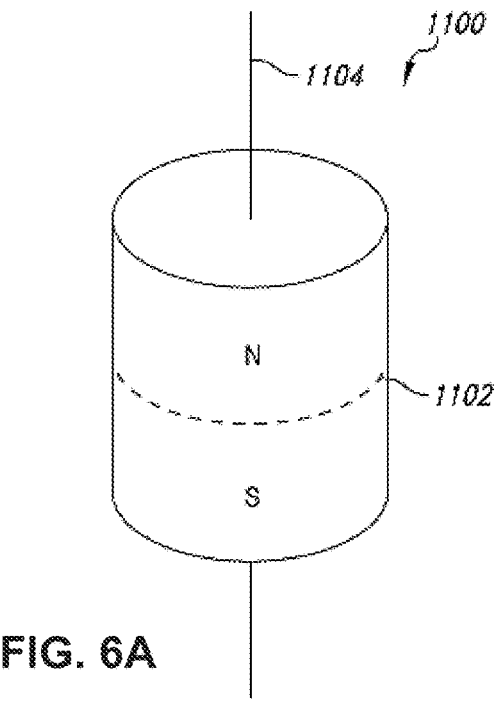
FIGS. 6A-6D is an illustration of axially and diametrically magnetized magnets and their operation, in accordance with certain embodiments of the present disclosure.
Figure 6C:
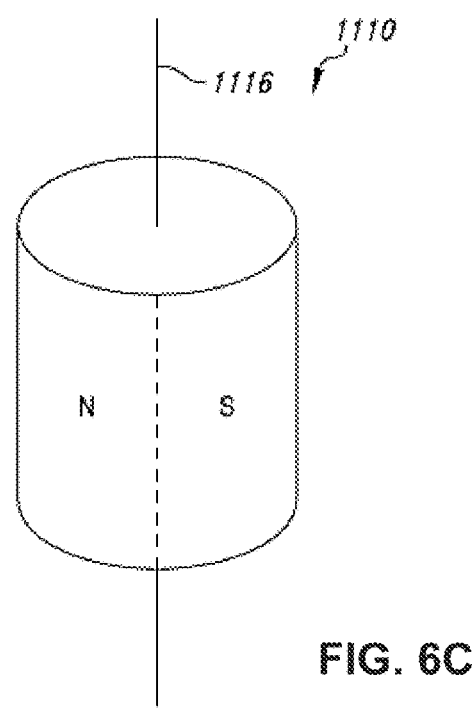
Figure 6B:
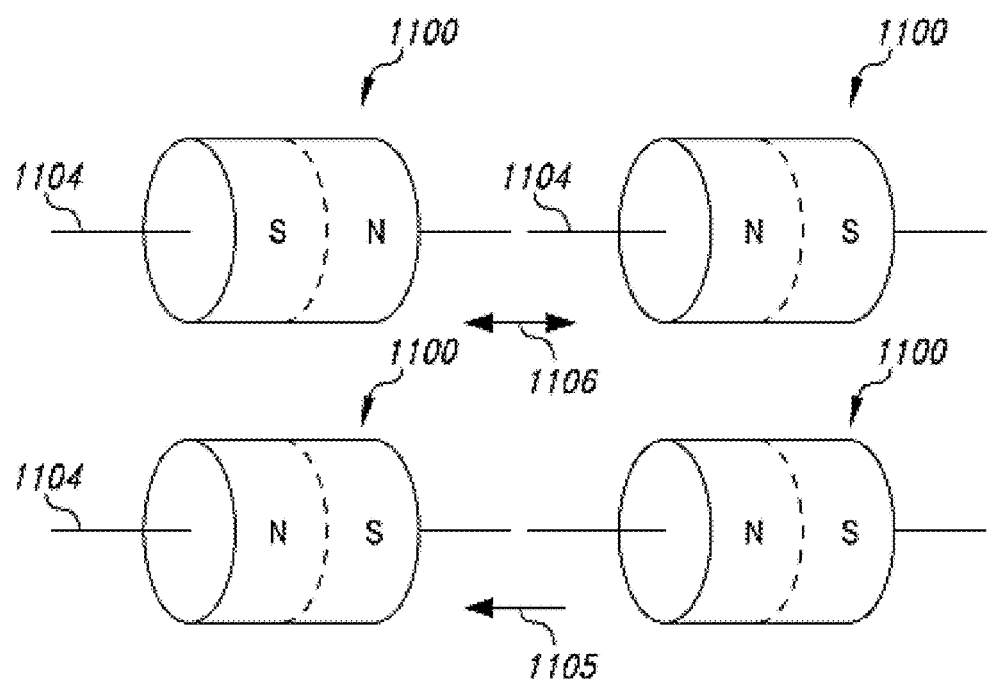

FIGS. 6A-D show a brief explanation of ways in which a magnet may be magnetized. According to a first method in FIG. 6A, an axially magnetized magnet 1100 is magnetized along a horizontal axis 1102, where N and S poles are on either the top or bottom. When two axially magnetized magnets 1100 are aligned about axis 1104 with opposite poles facing each other, as shown in FIG. 6B, the magnets attract and a magnetic force 1105 pulls the two magnets toward each other. When two magnets 1100 are aligned about axis 1104 with similar poles facing each other, a magnetic force 1106 repels the magnets away in opposite directions, as also illustrated in FIG. 6B.

Figure 6D:
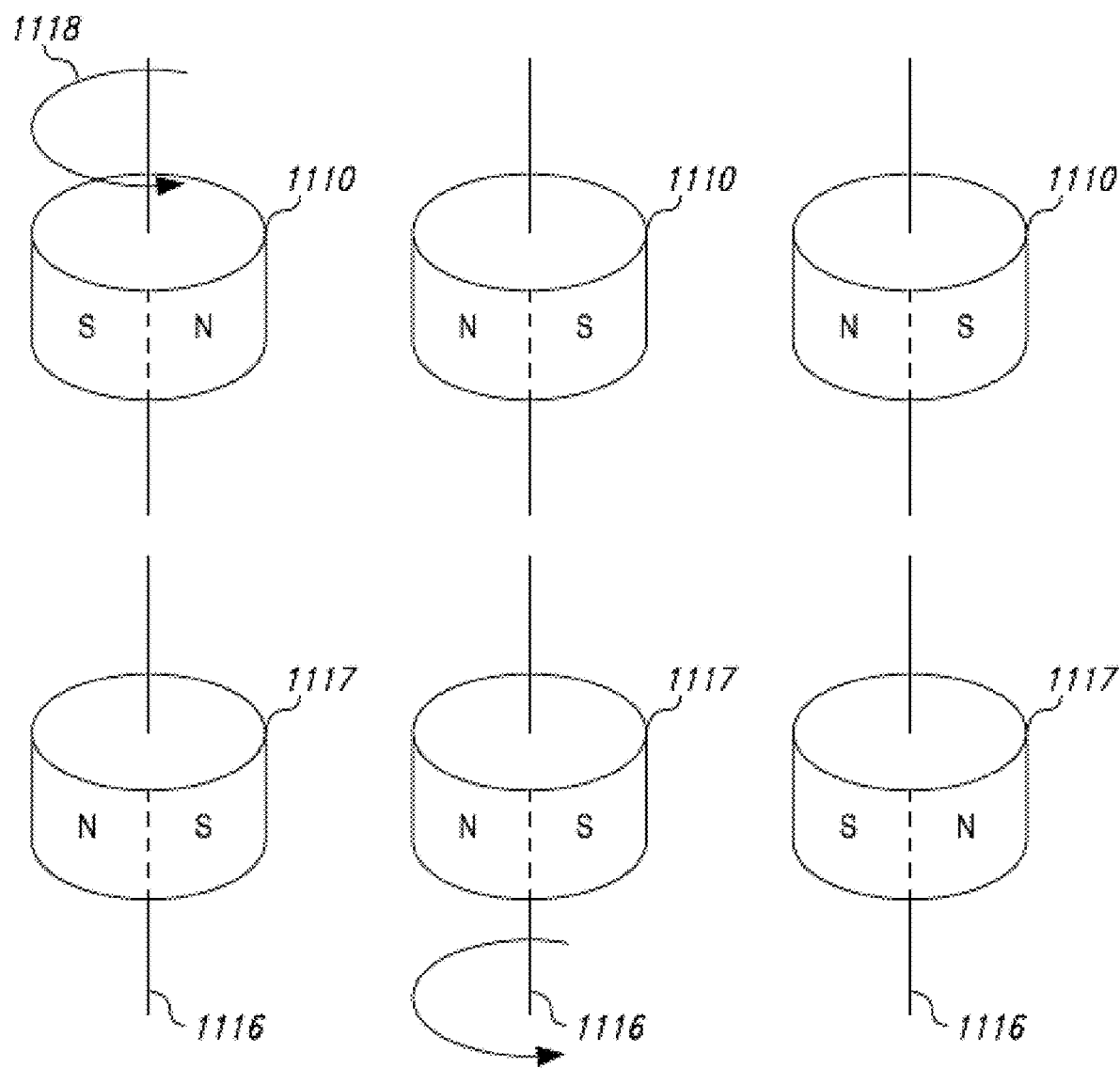

According to a second method for polarizing magnets, illustrated in FIG. 6C, diametrically magnetized magnets 1110 are magnetized to create N and S poles along the left and right sides of a vertical axis 1116. As illustrated in FIG. 6D, the principles of magnetic attraction and repulsion previously illustrated in FIG. 6B, can be used by magnets 1100 and 1110 to position, drive, or release apparatus by setting magnets in motion relative to each other.

In FIG. 6D, when a first diametrically magnetized magnet 1110 spins about axis 1116, and a second diametrically magnetized magnet 1117 spins in the same direction 1118 at the same rate, the opposite N-S poles try to remain aligned. When one magnet, e.g. 1110 accelerates or stops, a repulsive force caused leg similar (N-N) poles temporarily being in alignment causes the remaining magnet 1117 to spin to re-achieve an alignment of opposite N-S poles. Spinning diametrically magnetized magnets in this manner may be leveraged by the present disclosure to eliminate the need for hull penetrations that would otherwise be needed in traditional implementations in order to attach or actuate moving parts such as for example, for propulsion, payloads, ballasting systems, or control surfaces. The forces created by attraction of opposite magnetic poles; and the repulsion of similar magnetic poles may also be used by embodiments of the present disclosure to secure fixed or non-moveable modular elements to the exterior of the vehicle.

According to an embodiment of the present disclosure, diametrically magnetized neodymium magnets 1100, 1110 comprise of neodymium iron boron (NdFeB) magnets due to the strength of their magnetic field compared to their size. Although magnets 1100, 1110 are shown in FIG. 6 as cylindrical, any shape magnet may be diametrically magnetized.

1.3.2 Mounting Fixed External Configurable Elements to Modules

Figure 7:
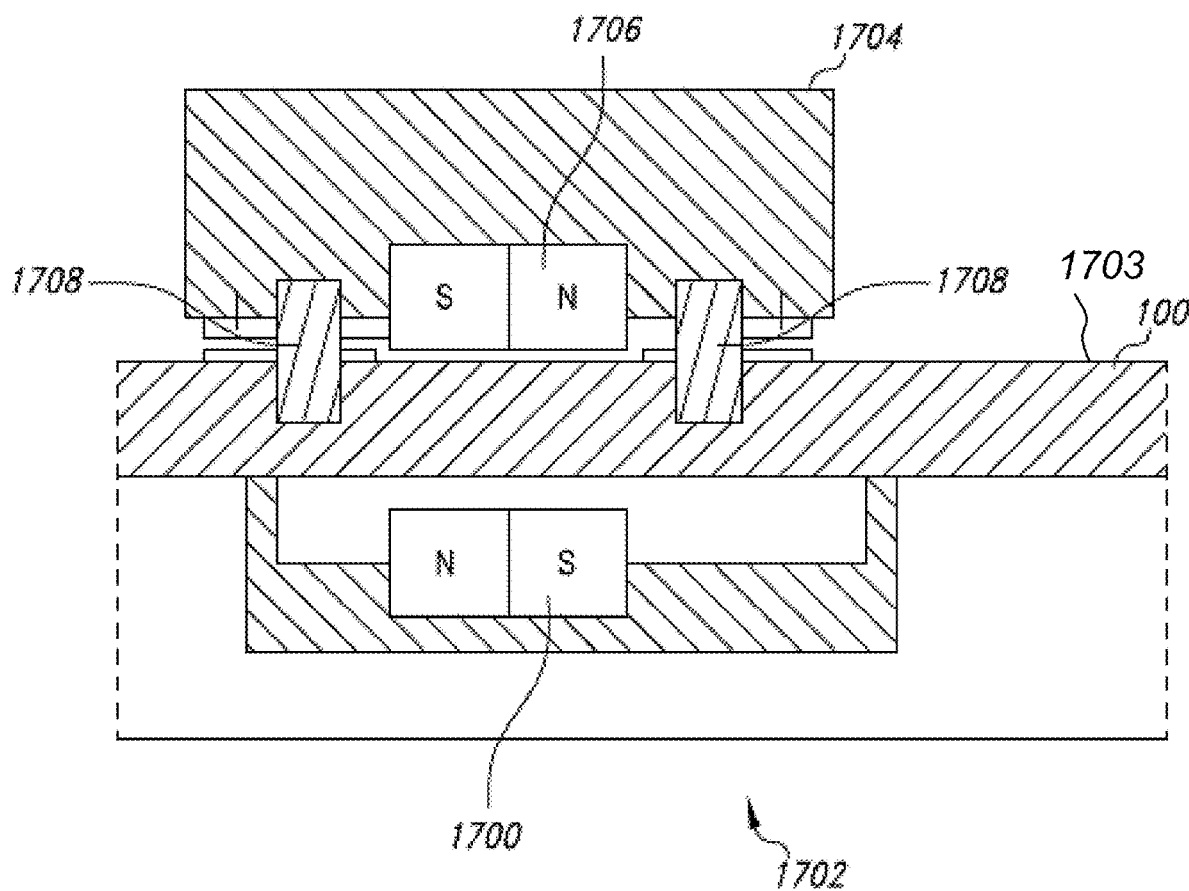
FIG. 7 is a cross-sectional view of a mechanism for attaching fixed external configurable elements to a configurable autonomous vehicle, in accordance with certain embodiments of the present disclosure.

The alignment of opposite magnetic force and the creation of an attracting magnetic force can be used to secure a fixed configurable element to the exterior surface 1703 of vehicle 100 as shown in FIG. 7. In FIG. 7 a magnet 1700 having a first pole orientation is located on the interior of vehicle 100 proximate to the location 1702 where a modular part 1704 is to be fixedly mounted. A plurality of attachment locations 1702 may be included along the periphery of vehicle 100 and its component modules. Modular part 1704 is shown as a payload or ballast in FIG. 7, but can be any type of modular attachment desired such as for example cargo, sensor package, or a communications package, or a camera.

On the interior of modular part/element 1704, is a magnet 1706. Magnet 1706 comprises a diametrically polarized magnet with opposite polarity to magnet 1700. When element 1704 is mated with vehicle 100, magnet 1706 sits proximate to magnet 1700 such that the two magnets 1700, 1706 may attract each other. As modular part 1704 is brought into proximity to the mating surface on vehicle 100, magnets 1700, 1706 attract and the resulting magnetic force secures and holds external configurable element 1704 into place at a rest position in relation to the vehicle 100. An optional pair of guide and locking pins 1708 can be used to align element 1704 and magnets 1706, 1700. Pins 1708 also provide additional mechanical attachment of element 1704 to the hull of vehicle 100.

Fixed external elements attached externally to vehicle 100 may include a variety of objects and types of devices. These external elements may include, but are not limited to, landing feet of various types and sizes, externally carried payloads or ballast, fixed position antennas, cameras, sensors, or fixed control surfaces. As will be apparent to those of ordinary skill in the art, other types of external fixed elements may also be attached to vehicle 100 using the method and apparatus described above.

1.3.3 Mounting Detachable Elements to Modules

The attachment mechanism of FIG. 7 can be further modified such that elements may be detachably secured to vehicle 100 as shown in FIGS. 8-9, 10A-10K and 12. Although the discussion of certain embodiments shown in these figures describes a ballast or cargo as the detachable element, the principles apply to any element that can be commanded to detach or release from the vehicle. The mechanisms illustrated in these figures may also be used to carry and release cargo or other payloads in lieu of or in addition to a ballast, as well as other modular components or attachments.

Figure 8:
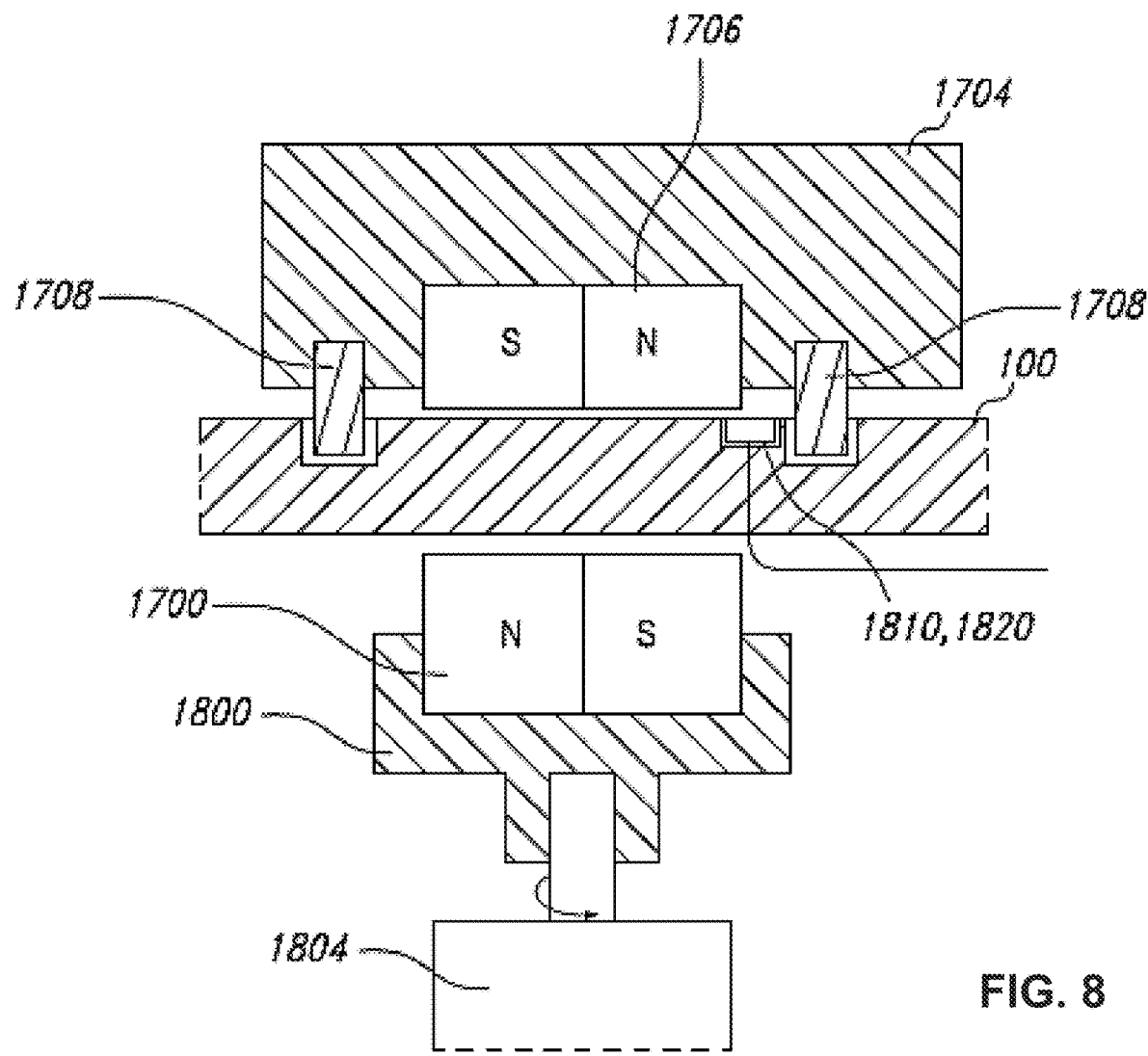
FIG. 8 is a cross-sectional view of a mechanism for attaching and detaching releasable external configurable elements to/from a configurable autonomous vehicle, in accordance with certain embodiments of the present disclosure.

In the mechanism of FIG. 8, magnets 1700 located on the interior of vehicle 100 are no longer secured to the hull in a fixed manner as was shown in FIG. 7. Magnets 1700 now reside in an actuator coupling 1800 which couples to a servo/actuator 1804. In operation, a release command signal causes servo/actuator 1804 to turn clockwise or counter-clockwise. As magnets 1700 rotate, the attractive force of the original N/S and S/N opposite pole pairing as drawn reverses and becomes a repelling force. The repelling force jettisons payload 1704 from vehicle 100.

Also shown in FIG. 8 is an optional Hall Effect sensor 1810. Hall Effect sensor 1810 is embedded in the exterior of hull 100, secured by epoxy, and covered by μ metal shield. Hall Effect sensor 1810 detects when payload/ballast 1704 has been released by detecting the presence or absence of the magnetic field between diametrically magnetized neodymium magnets 1700, 1706. As known to those of ordinary skill in the art, μ metal shields electronics from low-frequency or static magnetic fields. A shield 1820, which may be formed of μ metal or other magnetically shielding material, may cover Hall Effect sensor 1810 to eliminate interference from the magnetic field created by magnets 1700, 1706.

Figure 9:
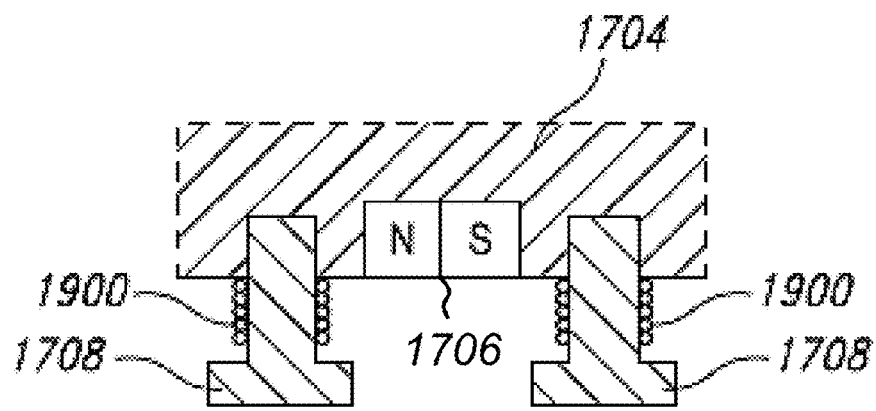
FIG. 9 is cross section of coil spring releasing mechanism, in accordance with certain embodiments of the present disclosure.

In an alternative embodiment of the present disclosure, as shown in FIG. 9 an optional coiled spring 1900 may be integrated into the payload/ballast/propel 1704 or into hull 100 to facilitate movement away from hull 100. When servo/actuator 1804 of FIG. 8 rotates magnets 1700, magnets 1706 of module 1704 may also try to rotate to maintain the initial opposite pole alignment. This motion, however, may be constrained by locking pins 1708. This torque causes springs 1900 of FIG. 9 to coil. As the like poles align, repel one another, and release the payload, coiled spring 1900 uncoils and helps to propel module 1704 away from hull 100.

Figure 10A:
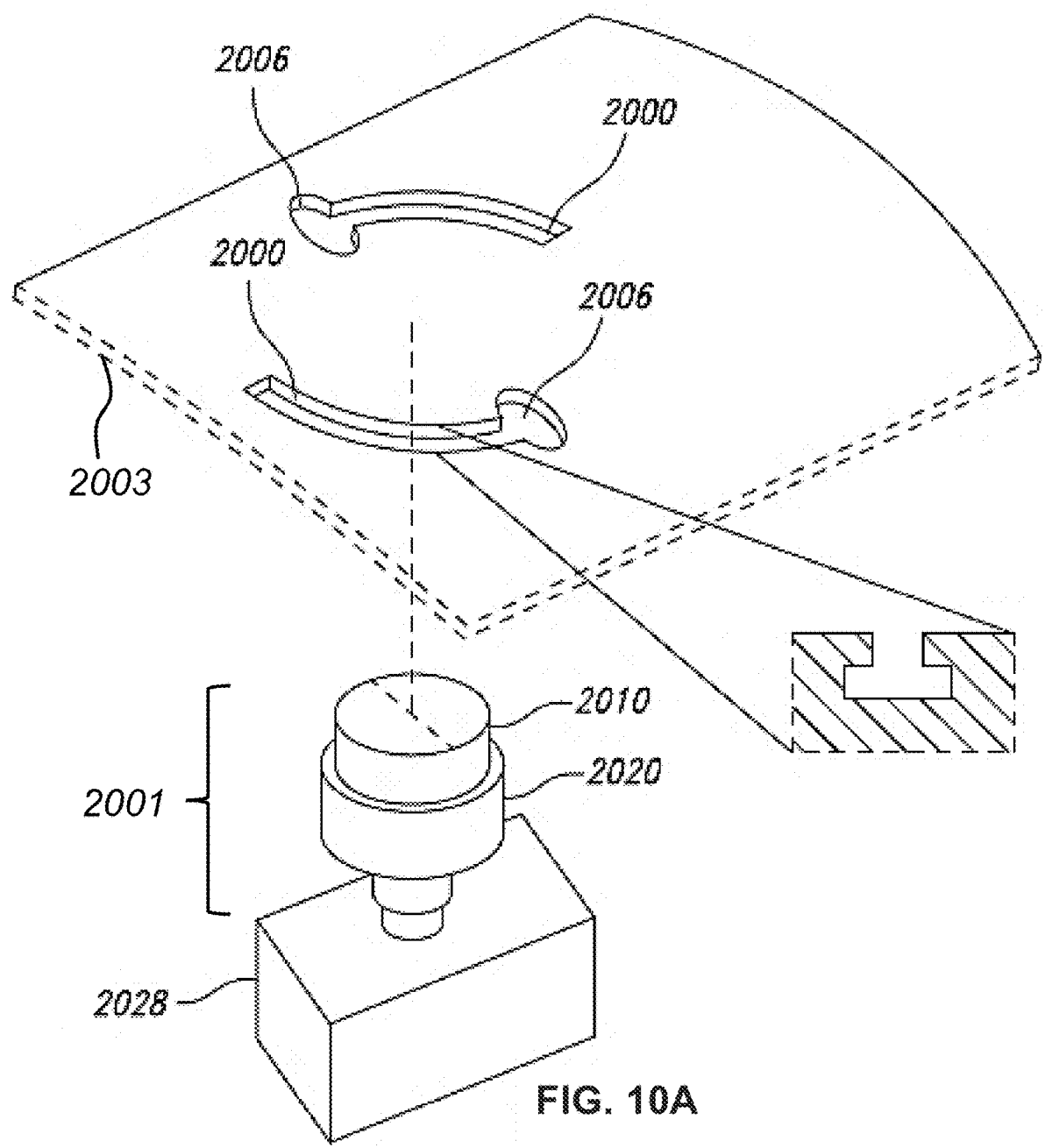
FIG. 10A is a perspective and cross-sectional views of a mechanism for attaching and releasing a configurable element from a configurable autonomous vehicle, in accordance with certain embodiments of the present disclosure.

FIG. 10A illustrates yet another alternative embodiment that may also be used to carry and release detachable modules, according to certain embodiments of the present disclosure. In the embodiments shown in FIGS. 9-10A, detachable element 1704, 2028 comprises magnets 1706, 2010 as previously shown, plus a plurality of locking pins 1708, 2020. The heads of locking pins 1708, 2020 may be slightly larger than a locking track guide 2000 cut into the exterior surface 1703, 2003 of the hull of vehicle 100. The heads of locking pins 1708, 2020 may be also smaller than opening 2006 at the terminus of locking track guide 2000.

Figure 12:
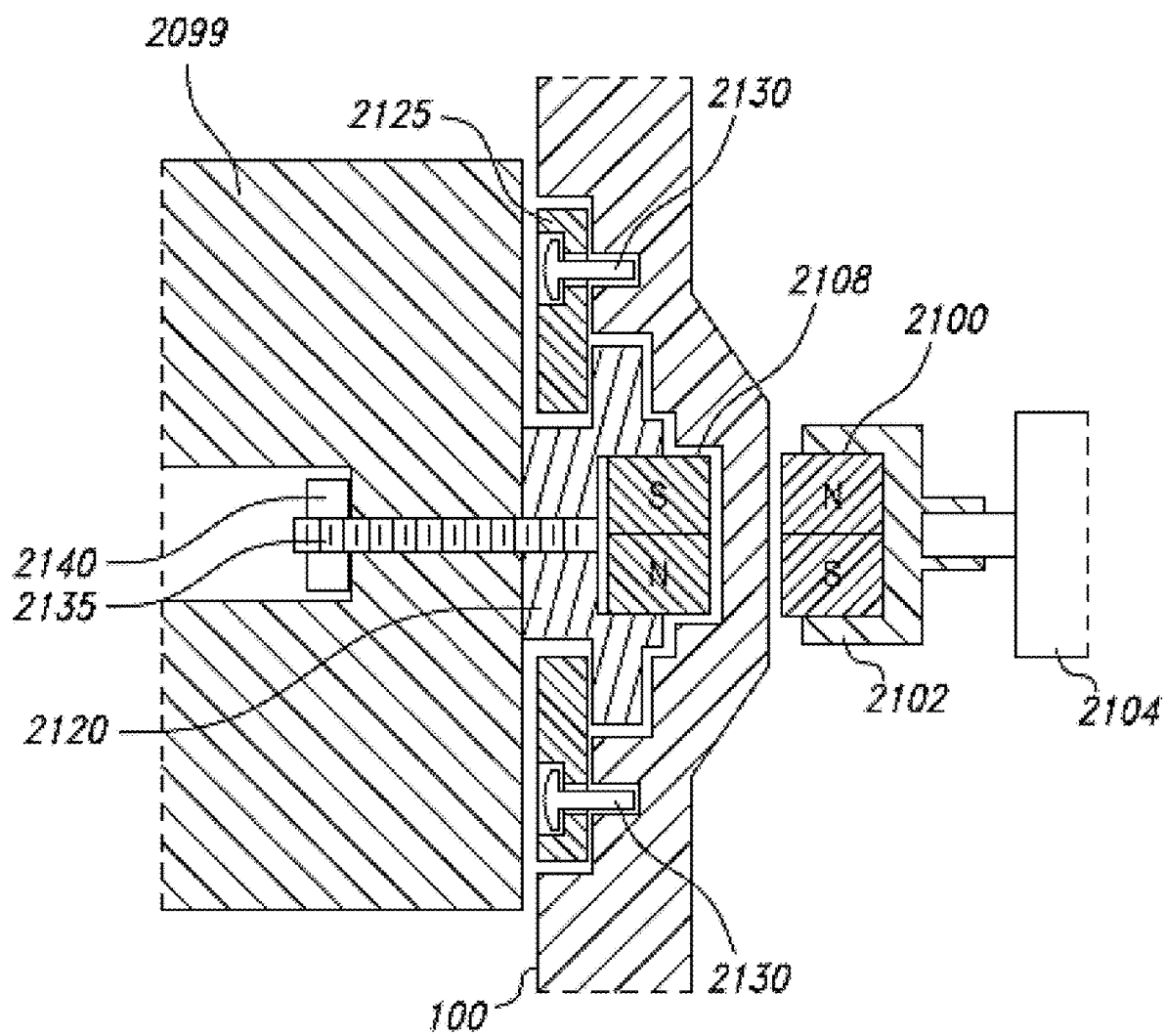
FIG. 12 is a cross-sectional view of a mechanism for coupling a moveable element or control surface to a configurable autonomous vehicle, in accordance with certain embodiments of the present disclosure.

Detachable element 1704, 2028 may secure to a vehicle/hull 100 by inserting pins 1708, 2020 in the track guides 2000. The detachable element assembly may be slid in track guide 2000 until element magnet 1706 is of substantial opposite polarity to a magnet 1700, 2010 located on the interior of vehicle 100 and proximate element 1704. The attractive force holds element 1704 in place. The locking pins 1708, 2020 of the detachable element 1704, 2028 may slide along the track guide 2000 of the vehicle 100 by rotating the detachable element 1704, 2028 in relation to the vehicle 100. Accordingly, the pins 1708, 2020 reflect a male-type connector 2001 while the track guide 2000 reflect a corresponding female-type connector 2002. In some embodiments, the exterior surface 1703, 2003 of the vehicle 100 may include pins 1708 that may be received by one or more track guides 2000 located along the exterior surface of the detachable element 1704. As shown in FIG. 12, control surface coupling retainer fastening bolts 2130 may project from the hull 100 to secure an element 2099.

Figure 10B:
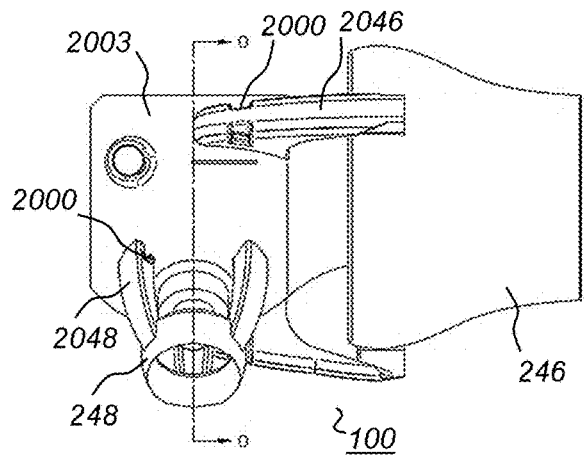
FIGS. 10B-10K illustrate examples of an attachment/releasement mechanism, where for the modular components include shrouds that may be attached to a vehicle by rotating the modular components to lock onto the exterior surface of the vehicle, in accordance with certain embodiments of the present disclosure.
Figure 10C:
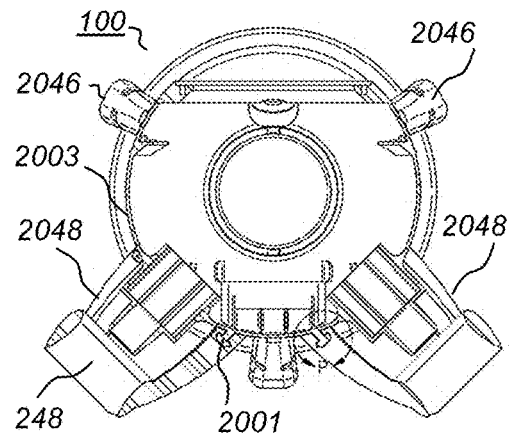

The detachable elements 1704, 2028 may be shrouds 246, 248 for a primary propulsion module 2199 or a secondary thruster 220. In certain embodiment, the primary propulsion module 2199 may have a longitudinal axis that is parallel to the longitudinal axis of the vehicle 100, may include a primary propeller 210 which may propel the vehicle 100 forward and backwards. A thruster 220 may have a longitudinal axis that is not parallel to the longitudinal axis of primary propeller 210, and may further control the navigation and positioning of the vehicle 100 by forcing vehicle 100 in a direction parallel to the longitudinal axis of thruster 220. As shown in FIGS. 10B-10C, the shroud 246 for a primary propulsion module 2199 may include a connector/member 2046 adapted for detachably securing the shroud 246 to the exterior surface 2003 of the vehicle 100. Similarly, the shroud 248 for a secondary thruster 220 may include a connector/member 2048 adapted for detachably securing the shroud 248 to the exterior surface 2003 of the vehicle 100. The connectors/members 2046, 2048 may include track guides 2000 located on the connectors/members 2046, 2048 of the shrouds 246, 248. The shrouds 246, 248 may be detachably secured on an additively manufactured vehicle 100 via the disclosed example of the attachment/connection mechanism.

Figure 10D:
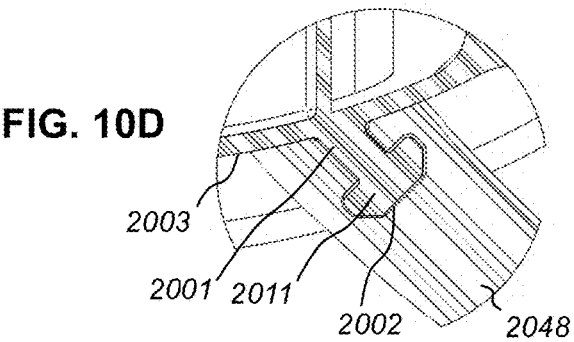
Figure 10F:
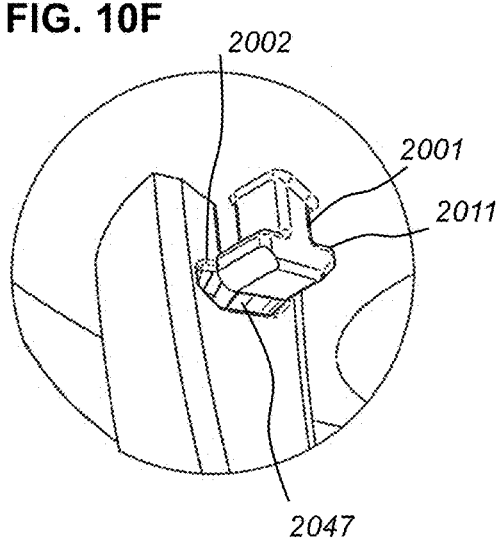
Figure 10E:
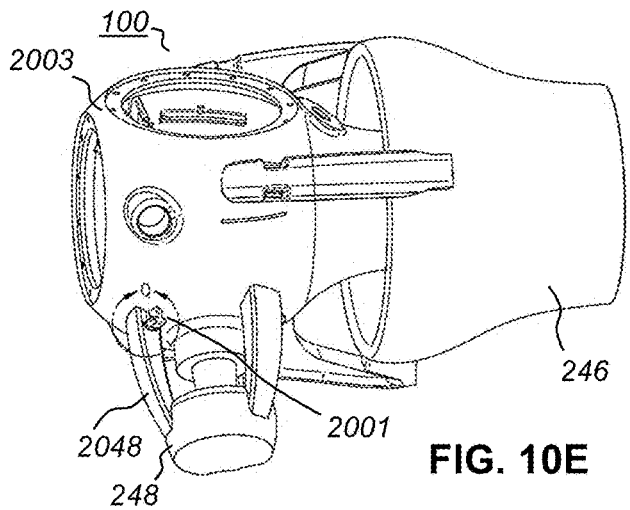

FIG. 10C is a cross-sectional, read-facing view of the vehicle 100 shown in the side-view depicted in FIG. 10B. FIG. 10C represents the cross-sectional view along the axis labeled by the O-O line shown in FIG. 10B. As illustrated in FIG. 10D, the attachment/connection mechanism may include male-type connectors 2001 on an additively manufactured vehicle 100 that may be detachably secured to corresponding track guides 2000 located at, or near, the ends of the connectors/members 2046, 2048. FIG. 10D illustrates a detailed view of the circular section referenced as "P" in FIG. 10C. FIG. 10E shows a perspective-view of the additively manufactured vehicle 100, illustrating the attachment mechanism for detachably securing connectors/members 2046, 2048 of the shrouds 246, 248 to the exterior surface 2003 of the vehicle 100. FIG. 10F illustrates a detailed view of the circular section referenced as "Q" in FIG. 10E. As shown in FIG. 10F, locking pins 1708, 2020 on the exterior surface 1703, 2003 of the vehicle 100 may be adapted to be inserted within openings 2047 for corresponding female-type connectors 2002 (e.g. track guides 2000) located on the connectors/members 2046, 2048. Such attached/release mechanisms may be implemented in embodiments for configuring a vehicle 100 with shrouds 246, 248 as well as for other additively manufactured detachable components, elements, attachments, and modules. The connectors/members 2046, 2048 may include female-type connectors 2002 that are adapted to receive the male-type connectors 2001 of the vehicle 100, as shown in FIG. 10F. The female-type connectors 2002 may be located at the proximate ends of the connectors/members 2046, 2048 such that the shrouds 246, 248 are attached to the opposite, distal ends of the connectors/members 2046, 2048.

Figure 10G:
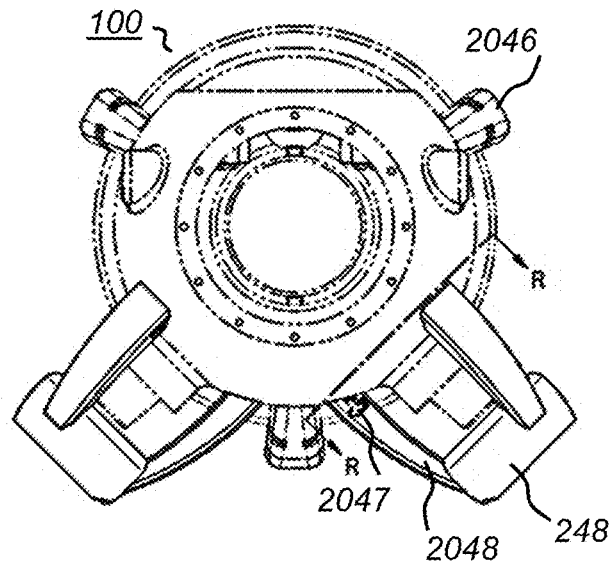
Figure 10H:
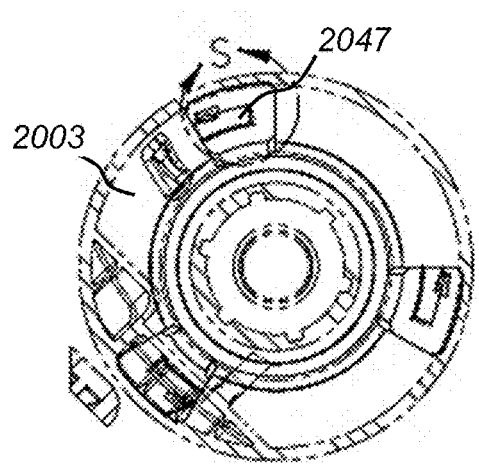
Figure 10I:
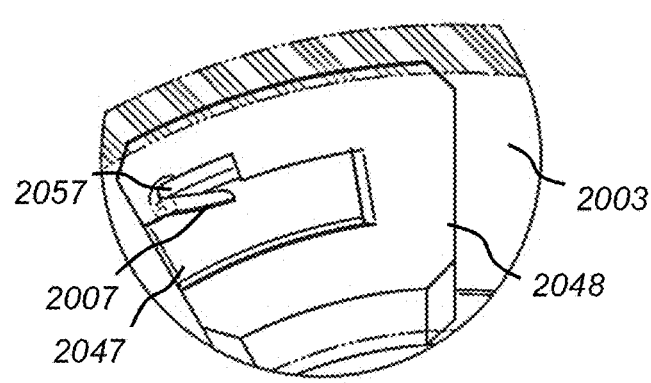

A rear view of the vehicle 100 is shown in FIG. 10G, and FIG. 10H illustrates a detailed view of the section referenced by the R-R line in FIG. 10G. FIG. 10I illustrates a detailed view of the circular section referenced as "S" in FIG. 10H. As shown in FIG. 10I, the opening 2047 of the female-type connector 2002 may include an internal clip 2007 adapted to be pushed into a slot 2057 within the opening 2047. Referring back to FIGS. 10B-E, the male-type connector 2001 may be locked within the female-type connector 2002 to be kept in place, such that the detachable module (e.g. shroud 246, 248) is securely mounted upon the vehicle 100. The module 246, 248 may include multiple ends adapted to attach to corresponding male-type connectors 2001 on the exterior surface 2003 of the vehicle 100. In certain methods for connecting a modular component/attachment 246, 248 to a vehicle 100, the openings 2047 on the ends of the connectors/members 2046, 2048 may be configured to receive nubbins 2011 of the male-type connectors 2001 on the exterior surface 2003 of a vehicle 100. Upon insertion of the nubbins 2011 within the openings 2047, the modular component 246, 248 may be rotated along an axis perpendicular to the plane of the exterior surface 2003 of the vehicle 100. The rotation may continue until the clip 2007 within the opening 2047 is engaged. In some embodiments, the nubbin 2011 of a male-type connector 2001 may traverse a longitudinal opening of a corresponding female-type connector 2002. The nubbin 2011 may bias the clip 2007 against a slot 2057 within the opening 2047, as it traverses the opening 2047, holding the clip 2007 in an unlocked position. Upon passing the length of the clip 2007, the nubbin 2011 may reach the distal end of the opening 2047 and the clip 2007 may be released into a rest position that locks the shroud 246, 248 in place.

Figure 10J:
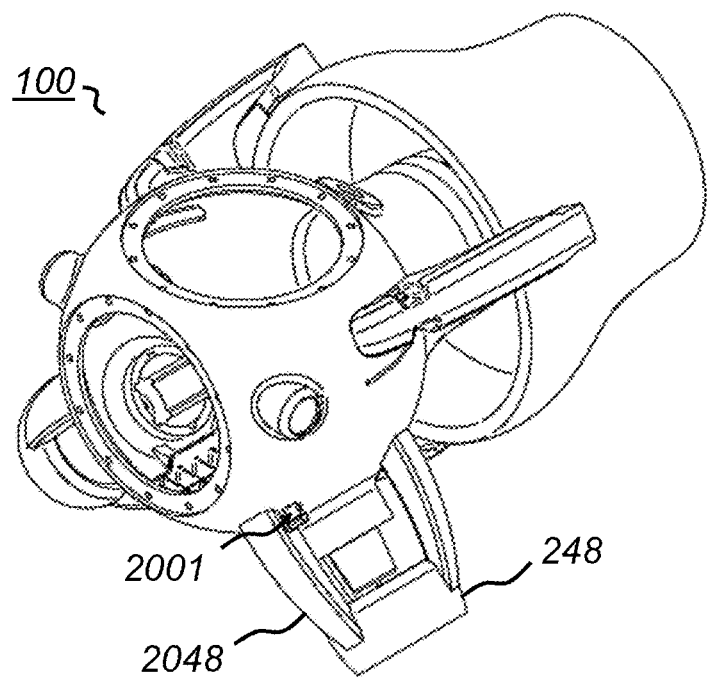
Figure 10K:
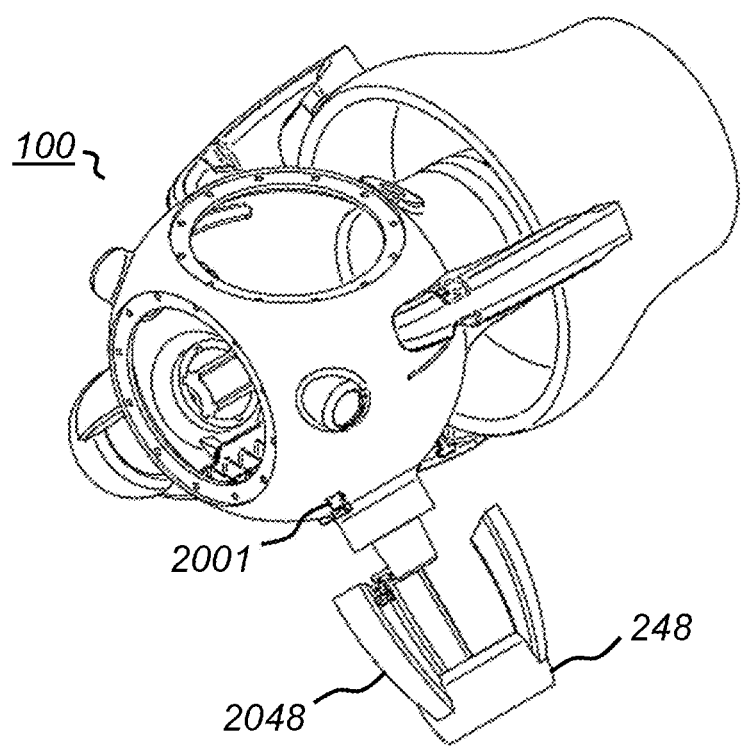

A benefit of the disclosed system may include the clip 2007 preventing undesired detachment of the modular component 246, 248 from the vehicle 100 when the vehicle 100 and its components 246, 248 experience vibration while traveling across a turbulent path, e.g. undersea. In some embodiments, the clips 2007 may prevent undesired rotation of a shroud 246, 248. Additionally, because the clip 2007 may be adapted to withstand external forces, the mounting points of a component 246, 248 on the vehicle 100 may be strengthened and the points of failure may be decreased. In order to detach the connectors/members 2046, 2048 of the shrouds 246, 248 from the exterior surface 2003 of the vehicle 100, the clips 2007 may be pushed inwardly so that the female-type connectors 2002 slide away from the male-type connectors 2001 of the vehicle 100. FIGS. 10J-K show that the shrouds 246, 248 may be rotated counterclockwise in relation to the exterior surface 2003 of the vehicle 100, and pulled away from the vehicle 100.

Referring back to FIG. 10A, the magnet 2010 may be coupled to a servo/actuator coupling 2020. In some embodiments, the servo/actuator coupling 2020 may be locking pins 1708, 2020 shown in FIGS. 10D-F. The servo/actuator coupling 2020 may in turn be coupled to a servo/actuator 2028. To automatically release or detach element 1704, servo/actuator 2028 receives a command from vehicle 100 and turns thereby rotating magnet 2010. Inside payload 1704, magnets 1706 start to rotate in an effort to maintain the original N/S and S/N opposite pole alignment. This action causes the detachable element assembly and its locking pins 1708, 2020 to slide along track 2000 until pins 1708 reach opening 2006. When the like poles of element magnet 1706 and magnet 2010 align, the repelling force ejects element 1704 and pins 1708 clear through opening 2006.

In an embodiment of the present disclosure, locking track pins 1708 are slightly longer than the depth of locking track 2000. Ejection assist springs 1900 of FIG. 9 may optionally be included in the release mechanism of FIG. 10A. Ejection assist springs 1708 compress up toward element 1704 when element 1704 is attached to hull 100. Once locking track pins 1708 reach opening 2006 of locking track 2000, ejection assist springs 1708 uncoil rapidly, propelling element 1704 away. The release mechanism of FIG. 10A may also operationally include a Hall Effect sensor to detect the release of detachable element 1704.

1.3.4 Payload and Ballast Modules

One specialized type pf releasable element is ballast. When vehicle 100 comprises an UUV 100, one method for controlling the depth of the UUV 100 is via use of releasable ballast. Buoyancy is the upward force on an object when that object is placed in water. When vehicle 100 is neutrally buoyant, the density of vehicle 100 equals the density of the water and there is no net upward buoyancy force. Vehicle 100 is at equilibrium and remains at the depth it is placed. When vehicle 100 is negatively buoyant, vehicle 100 sinks. When vehicle 100 is positively buoyant, vehicle 100 rises upward in the water and may surface.

Large, manned submarines utilize these same buoyancy principles. A submarine maintaining a specific depth has equalized the mixture of water and air in its ballast tanks to match the density of the surrounding water. When the submarine is commanded to surface, the submarine uses a blast of high pressure air to purge water from the ballast tanks. The air replaces any water in the ballast tanks. The ballast tank air is less dense than the ocean water and the sub rises to the surface.

Pressurized air ballast systems like those used in submarines are possible but such systems are inherently complex, require extensive maintenance and thus also add to the cost of owning and acquiring a UUV. Thrusters, or control surfaces such as bow planes in combination with propulsion systems can be used to overcome forces of buoyancy to force UUV 100 to maintain the desired depth. The UUVs 200 and 250 of FIG. 2 include thrusters 220 which can be employed for this purpose. Use of thrusters or the vehicle propulsion system consumes fuel or other supplies of onboard energy and limits vehicle mission endurance.

According to an embodiment of the present disclosure, UUV 100 includes a simple ballast module with releasable ballast weights. When the operator wants the UUV 100 to seek and maintain a specific depth, the operator can assemble UUV 100 to include one or more ballast modules of sufficient weight. When UUV 100 is subsequently placed in the water, UUV 100 will then sink to the depth at which the total combined weight of UUV 100 and the ballast equals the density of the water. When UUV 100 is commanded to rise up to a higher level or to surface, the onboard vehicle command and control system can command UUV 100 to release ballast from one or more ballast modules to attain the new desired depth or to surface. The use of ballast modules to manage the depth of UUV 100 decreases the energy consumption budget of the vehicle 100 and increases mission endurance. When a ballast module is used, UUV 100 need only use its propulsion and control surface systems to maneuver and such systems are not needed to maintain or attain a specific depth or to surface from depth.

In an embodiment of the present disclosure, vehicle 100 includes a ballast module having a magnetically coupled ballasting system. The magnetically coupled ballasting system allows ballasts of different weights to be attached to and released from the ballast module using a release mechanism such as, for example, those described in FIG. 8-9, 10A-10K or 12. In operation, the operator of UUV 100 may select a detachable ballast module having a desired weight; or including a releasable sled loaded with weights sufficient to attain the desired depth of operation. A UUV 100 comprising the releasable ballast module or releasable sled of weights taught by the present disclosure glides down to a predetermined depth where it is neutrally buoyant. UUV 100 then maneuvers and conducts its operations at depth. When UUV 100 completes operations at that depth, UUV 100 commands release of the ballast to attain a second depth or to surface.

Multiple ballast modules or multiple sleds having weights in releasable lots of known amounts can be included in the composition of vehicle 100. The use of multiple ballast modules or groups of weights on sleds allows vehicle 100 to execute a mission profile inclusive of multiple depths of operation. Vehicle 100 simply commands the release of ballast to attain the next operating depth in the mission profile.

1.3.5 Parasitic Ferry Transfer and Parasitic Station Keeping

The release mechanisms of FIGS. 8-9, 10A-10K and 12 can also be employed in reverse such that vehicle 100 becomes the detachable item secured and then released from a ferry vehicle; or attached to a fixed structure. This mode of operation is advantageous when vehicle 100 cannot self-navigate from the point of assembly to the point of use. Such circumstances can arise when there are in route hazards e.g. wave heights that exceed the operating parameters of vehicle 100. Use of a parasitic ferry transfer may also be advantageous when the distance between the point of assembly and the point of use exceeds the capability of vehicle 100 to both transit that distance and execute the mission.

Use of a parasitic ferry transfer can also be employed to retrieve and return vehicle 100 from its point of use. After completion of a mission, vehicle 100 can navigate to a ferry vehicle and attach itself. The ferry vehicle inclusive of vehicle 100 can then return the vehicle to its intended destination. These types of operations also permit vehicle 100 to stay on station longer and execute mission profiles of longer duration than would be possible if vehicle 100 used its own energy stores to transit. Use of a parasitic ferry also can be used for emergency recovery of vehicle 100.

Figure 11A:
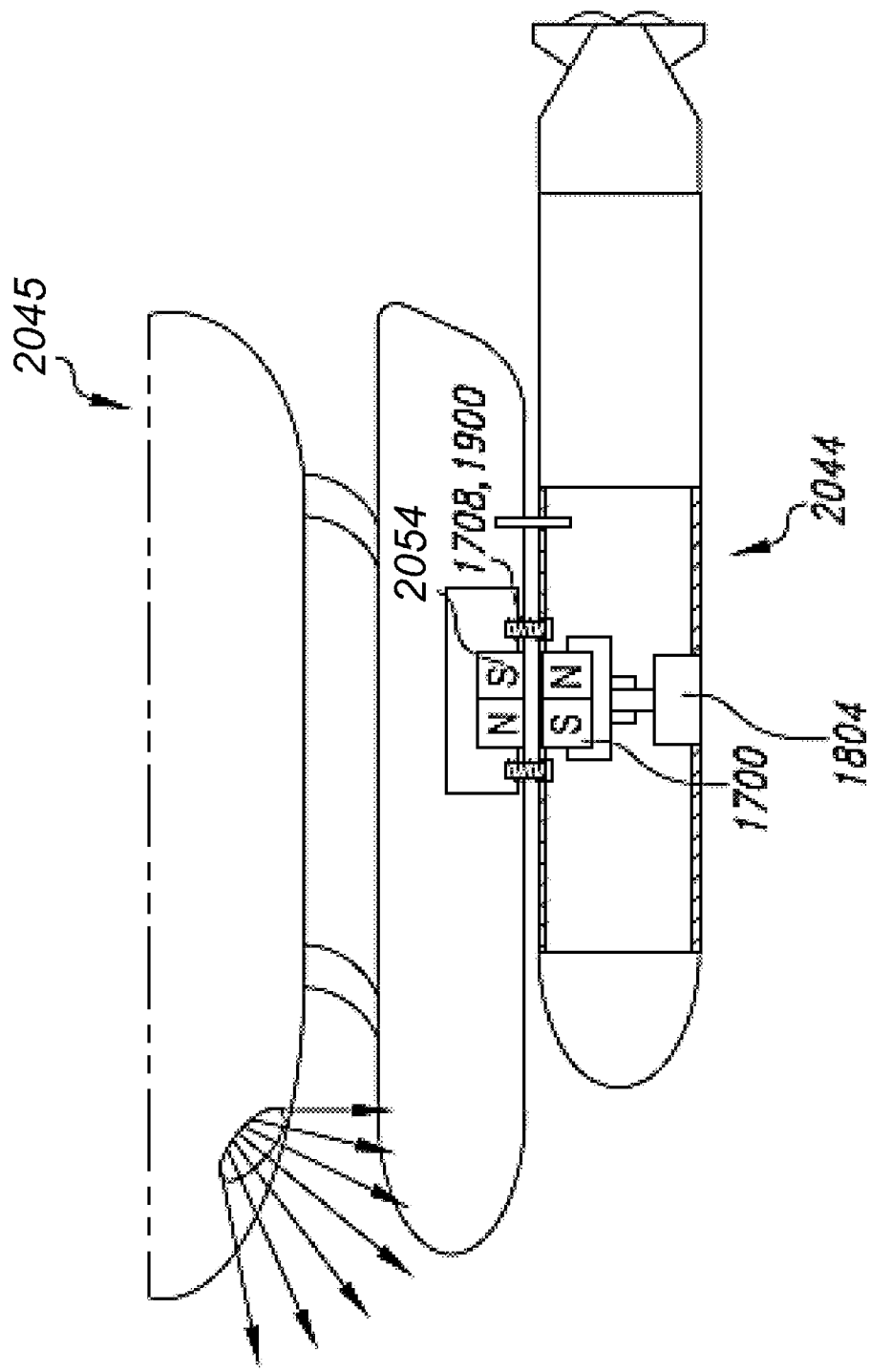
FIGS. 11A-11F illustrate parasitic transport and station keeping of a field configurable vehicle, in accordance with certain embodiments of the present disclosure.

For parasitic ferry operation, vehicle 100 can include a module including the release mechanism of the embodiments shown and described in connection with FIGS. 8-9; and may also include Hall Effect sensors to detect and communicate the presence or absence of the parasitic ferry vehicle. FIG. 11A illustrates possible embodiment and use of a detachable/release mechanism for ferry operation. FIG. 11A shows vehicle 100 including module 2044 parasitically attached to a ferry vehicle 2045. In the embodiment of FIG. 11A, ferry 2045 includes a diametrically magnetized magnet 2054 and locking pins 1708, 2020, which also may include optional springs 1900. Vehicle 100 can be attached and secured by the operator by attaching vehicle 100 to ferry 2045 at the location of magnet 1700. When vehicle 100 reaches the point of release, vehicle 100 commands actuator 1804 to rotate, and the resulting motion of magnets 1700 creates a repelling force that separates vehicle 100 from ferry 2045. Ferry 2045 can optionally include a vertical guide post that prevents the attached vehicle 100 from rotating during release.

To autonomously reattach or attach vehicle 100 to ferry 2045, vehicle 100 navigates alongside ferry 2045. Guide pins 1708 engage with the hull of vehicle 100 at the corresponding location along the hull exterior. When entering the docking mode, servo 1804 has already commanded magnets 1700 to an orientation with poles opposite the fixed location of the poles of magnets 2054. This attractive magnetic force assists with guiding vehicle 100 to proper location on ferry 2045 and alignment with the locking pins 1708, 2020.

Figure 11B:
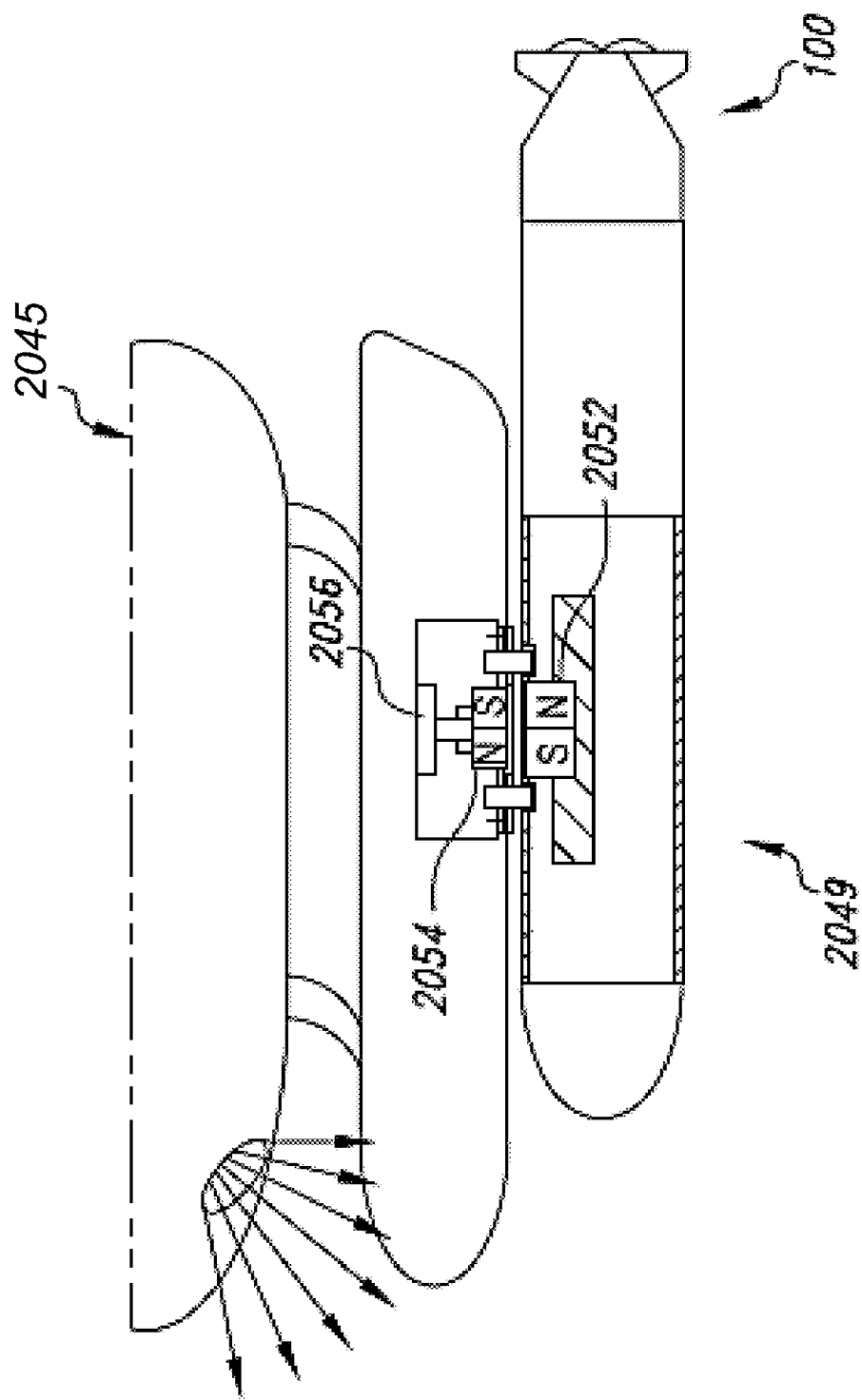

The opposite construction is also possible as shown in FIG. 11B. In FIG. 11B, vehicle 100 contains a module 2049 having fixed magnets 2052. Rotating magnets 2054 and a servo 2056 are located aboard ferry 2045. Any of the unoccupied magnetized locations and attach points on vehicle 100 will serve as a suitable mating spot for pairing with magnets 2054. When vehicle 100 is to be released, ferry 2045 rather than vehicle 100 initiates the command for separation. Once released, vehicle 100 executes its mission.

Figure 11D:
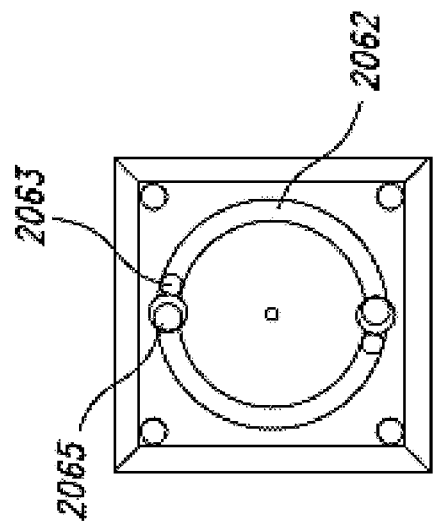
Figure 11E:
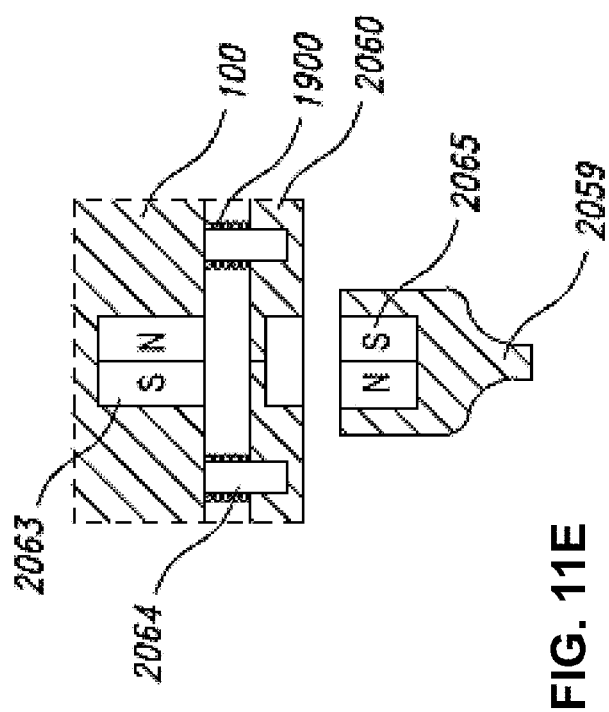
Figure 11C:
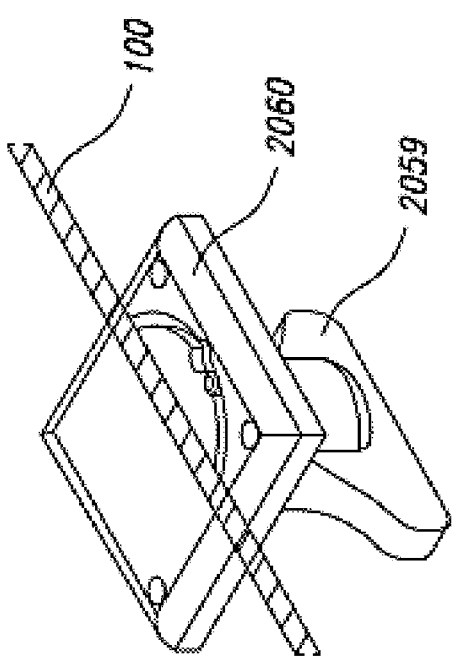

FIGS. 11C-E shows a cross section of yet another ferry or structured attachment mechanism that can include a manual release key 2059 located inside ferry 2045. In the embodiment of FIG. 11C, key 2059 couples to a pivotable adapter 2060 having guide tracks 2062. Mating pins 2064 having springs 1900, can be located on vehicle 100 and fit into guide tracks 2062. In FIGS. 11C-E, adaptor 2060 is shown located on ferry vehicle 2045. Reattaching or attaching vehicle 100 to ferry 2045 works as described above.

Use of the adaptor prevents the entire ferry vehicle 2045 or vehicle 100 from rotating in the guide tracks 2062. As drawn in FIG. 11D, when vehicle 100 is to be released, the operator turns key 2059 to rotate magnets 2063 which causes adaptor 2060 to rotate and pins 2064 to move inside the vehicle guide tracks 2062 until reaching stop 2063. The rotational stop prevents vehicle 100 from rotating while adapter 2060 rotates in slots 2062. Magnets 2063 and 2054 are then in a N/N and S/S alignment and pins 2064 align with ejection cavity 2065. Vehicle 100 is then pushed away from ferry 2060 by repelling force of the repositioned magnets. Reattaching or attaching vehicle 100 to the ferry via the release mechanism just described simply works in reverse. Manually turned key 2059, can also be replaced by a servo mechanism to turn adapter 2060 as illustrated in previous embodiments.

Figure 11F:
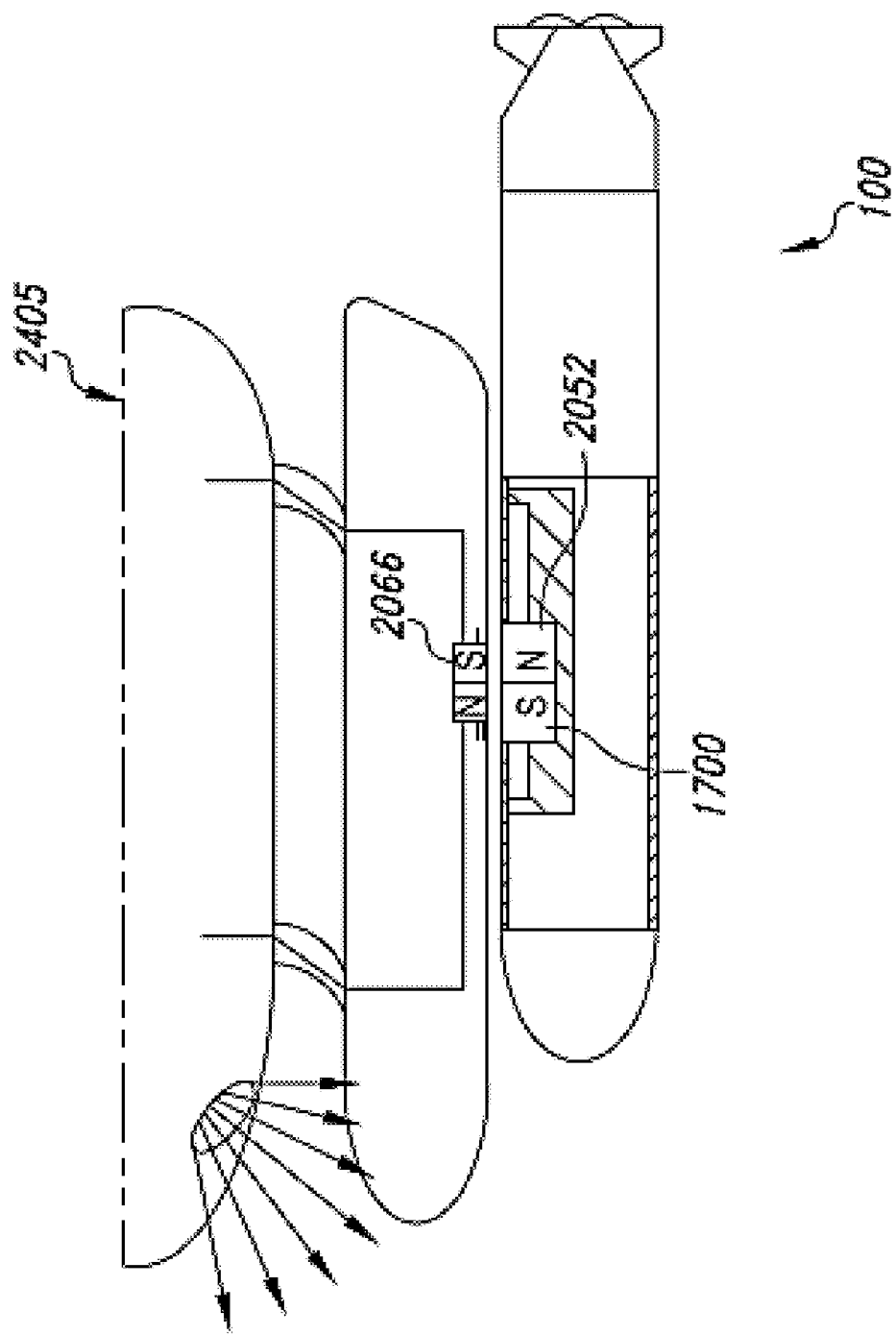

A third option for using magnets for parasitic ferry transport is the mechanism shown in FIG. 11F. In this embodiment, one or more energized magnets 2066 is included in the nonferrous body of ferry 2045. When magnet 2066 is energized, any of the fixed magnet structures 1700 of FIG. 7 included in vehicle 100 and not otherwise occupied; or optionally, any of the unoccupied magnet structures 2010 or 1700 of FIGS. 10A and 8; will be attracted to energized magnets 2066. Once vehicle 100 navigates near enough to ferry 2045 it may be "captured" by the energized magnet 2066 without worrying about alignment of pins 1708. Optionally, an operator may place vehicle 100 proximate to energized magnets 2066 to secure vehicle 100 to ferry 2045 for transport. To release vehicle 100, ferry 2045 or the operator simply commands magnets 2066 be deenergized. Upon that event, the magnetic attraction ceases and vehicle 100 drifts away from ferry 2045, free to execute its mission.

Any of the parasitic ferrying methods described in connection with FIGS. 11A-11F may also be used to affix vehicle 100 to a stationary object. The sole difference being that instead of a moveable ferry 2045; a fixed object such as a buoy, oil rig, wharf, or other structure is substituted therefor. Navigating to and then attaching itself to a fixed structure allows vehicle 100 to be easily retrieved from a known location. Navigating to and then attaching itself to a fixed structure also allows vehicle 100 to proceed to a test or observation location, remain there without expending energy to station-keep, detach itself and return. When vehicle 100 is used for collection of scientific data from remote locations, attaching at a fixed and determinate location often aids in the precision measurement of results.

1.3.6 Mounting Moveable External Configurable Elements to Modules

Various control surfaces on vehicle 100 can be used to adjust the pitch, roll, or yaw of the vehicle. As previously illustrated in FIGS. 1-2, when vehicle 100 comprises an UUV, the control surfaces may include a sail plane or a dorsal fin 120, flippers 122, rudders and stabilizers 124. Moveable external configurable elements such as control surfaces help to steer vehicle 100 and to control motion about the pitch, roll, and yaw axis. Any number or different types of control surfaces or moveable external elements may be mounted to modules of the vehicle 100. Other types of moveable external configurable elements may include, for example, a camera, or antennas. The modularity of the present disclosure permits different types, sizes, shapes and characteristics of moveable external control surfaces and elements to be attached as desired to configure vehicle 100 as determined.

In traditional implementations, these moveable control surfaces are controlled through drivetrains and shafts penetrating through the hull of vehicle 100, requiring the use of epoxies and other sealants to prevent water from entering the interior of the hull at the point of penetration. Epoxies and other sealants degrade over time, causing avenues for water and other contaminants to enter the interior of vehicle 100 and damage sensitive electronics. Magnetically coupled control surfaces eliminate these avenues by removing the need to penetrate the hull.

FIG. 12 illustrates a magnetically coupled control surface or moveable/positionable element 2099. Inside of vehicle 100, an internal diametrically magnetized neodymium magnet 2100, adhered with epoxy to a coupler 2102, couples to servo/actuator 2104 the motion of which moves magnet 2100 to control the positon of element 2099. A second diametrically magnetized neodymium magnet 2108 is adhered with epoxy to a control surface coupling 2120. A coupling retainer 2125 holds control surface coupling 2120 against hull 100. Control surface coupling retainer 2125 reduces the chances of losing control surface 2120 to over-oscillation or impact. According to an embodiment of the present disclosure, coupling retainer 2125 secures to hull 100 by several control surface coupling retainer fastening bolts 2130 which do not penetrate the hull. In some embodiments, such bolts 2130 may comprise nubbins that retain a shroud 246, 248 of a thruster 220 as shown in FIGS. 10C-10E.

Referring back to FIG. 12, a drive train shaft 2135 changes the position of control surface or moveable element 2099. Control surface drivetrain shaft 2135 couples to external diametrically magnetized neodymium magnet 2108 through control surface coupling 2120. A nut 2140 located at the end of control surface drivetrain shaft 2135 secures control surface/moveable element 2099 to drive shaft 2135.

In the embodiment as drawn in FIG. 12, parts 2099 and 2120 are shown as separate parts. Parts 2099 and 2120 may, however, be fabricated as a single piece. When parts 2099 and 2120 are fabricated as a single piece, drive shaft 2135 and nut 2140 are no longer necessary. As magnet 2108 rotates, the combined assembly of parts 2120 and control surface/moveable element 2099 also rotates. Such a construction reduces the total number of parts comprising the moveable element or control surface and may reduce overall cost and complexity.

In operation, a signal is sent from vehicle 100 command and control system to servo/actuator 2104. Servo/actuator 2104 is capable of turning coupling 2102 in either a clockwise or counter-clockwise direction. As internal diametrically magnetized neodymium magnet 2100 rotates, external diametrically magnetized neodymium magnet 2108 starts to rotate, as both magnets try to keep a N/S and S/N pairing. The motion of magnet 2108 moves control surface 2099 via the motion of drive shaft 2135.

While the above description explain the construction and operation of moveable external attachments in the context of moveable control surfaces, the principles described above apply equally to the construction and operation of additional types of moveable/position-able external elements. For example, moveable external elements may additionally include thrusters, antennas and sensors that rotate and are moveably affixed to the exterior hull portion of vehicle 100.

1.3.7 Propulsion Module and Propulsion Systems

Attachment and drive systems similar to these shown in FIG. 12 may also be included in vehicle 100 to comprise propulsion systems and modules. As previously described in connection with both fixed and moveable external attachments, traditional propulsion assemblies require hull penetration for mechanically connecting the propeller assembly to the internal motors and drive systems. The configurable propulsion systems may avoid the need for such potentially problematic hull penetrations.

Traditional propulsion systems also typically include a shear pin. The shear pin breaks, or shears, whenever the propeller load exceeds a certain limit as might happen when the propeller stops turning because it has been fouled by seaweed or debris. If the motor kept commanding the propeller to rotate when it could not, the resulting torque would be transferred to the motor, and perhaps to the entire vehicle, causing significant and perhaps irreparable damage up to an including potential loss of the vehicle. The shear pin is designed to break and detach the propeller under these conditions to prevent such damage. When the shear pin breaks, however, the propeller is lost and the vehicle rendered without propulsion and unable to complete its mission. The configurable propulsion system may not require a shear pin, and may recognize and avoid the problems of traditional implementations.

Figures 13A, 13B:
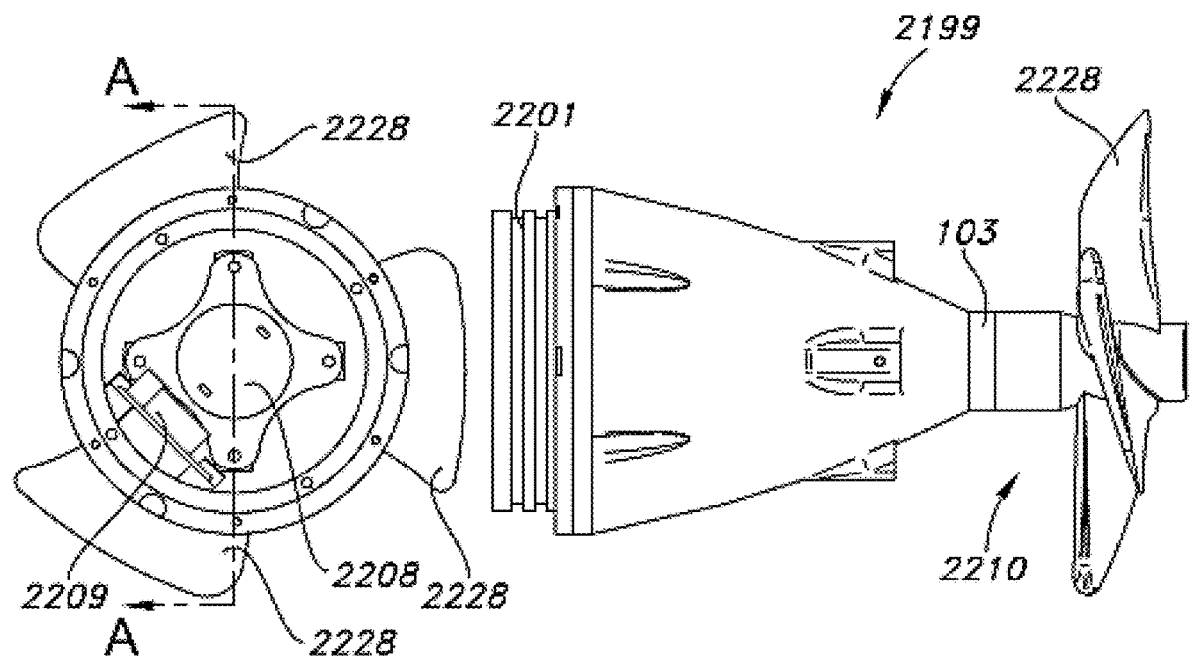
FIGS. 13A-13C are side-end and cross-sectional views respectively of a propulsion module, in accordance with certain embodiments of the present disclosure.
Figure 13C:
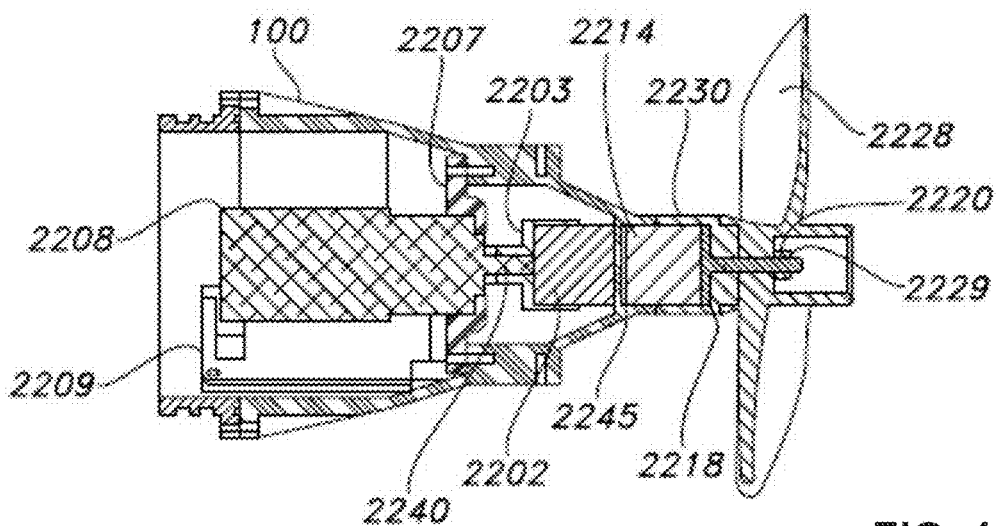

FIG. 13A shows a side view of a propulsion module 2199, FIG. 13B shows an end view, and FIG. 13C shows a cross-sectional view. Propulsion module 2199 may include threads 2201 for attaching module 2199 to the remainder of vehicle 100. Although a threaded system such as that shown in FIGS. 5D-5F is shown in FIG. 13A, any mating system may be used including the systems of FIGS. 5A-5C.

Figure 13D:
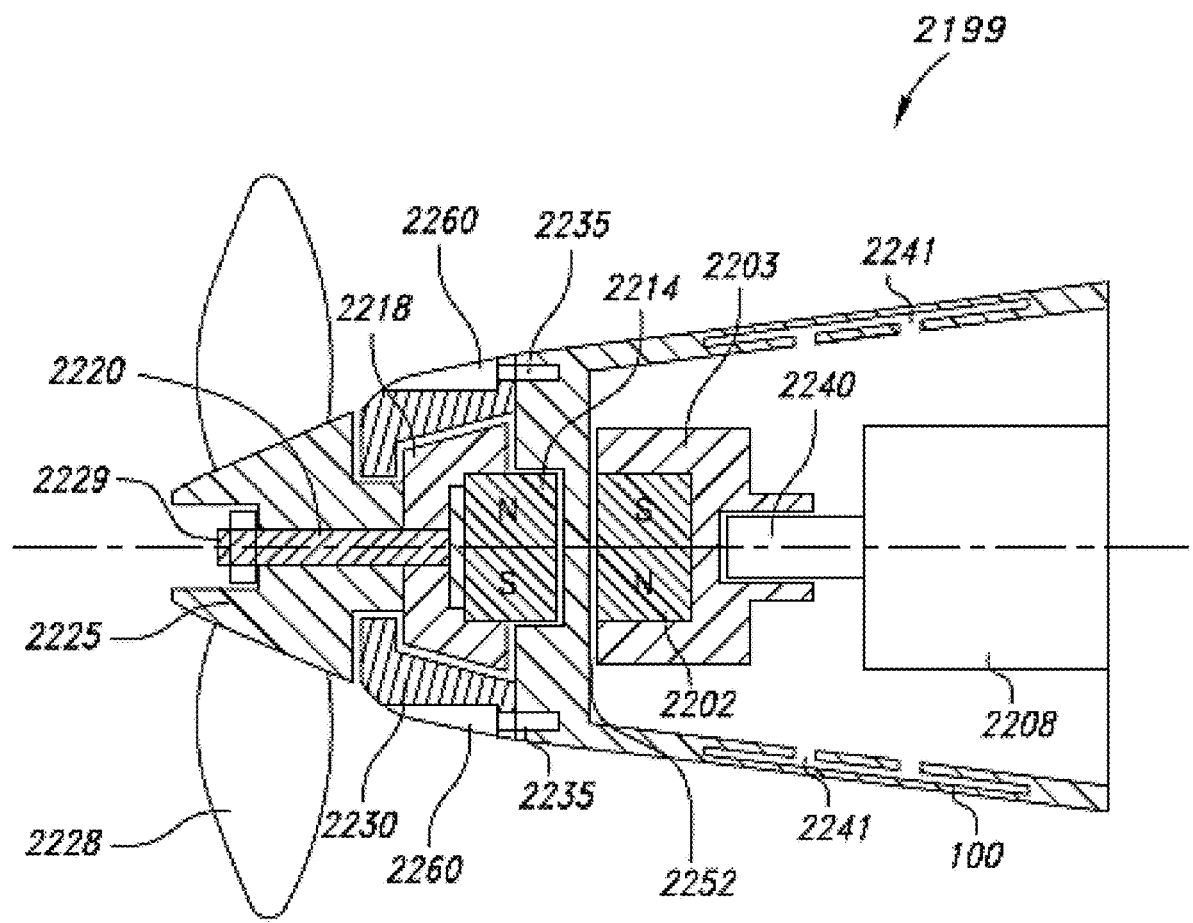
FIG. 13D is a cross-sectional view of an alternative propulsion module, in accordance with certain embodiments of the present disclosure.

As seen in the end view of FIG. 13B and the cross-sectional view of FIG. 13C, propulsion module 2199 may include components internal to hull 100: magnet 2202, servo coupler 2203, motor mount 2207, DC motor 2208, and motor controller 2209. FIG. 13D shows a cross-sectional view of an alternative embodiment of propulsion module 2199 having these components arranged in an alternative construction. As shown in FIGS. 13B-13D, propulsion module 2199 additionally includes a propeller assembly 2210 that couples magnetically to the remaining portion of propulsion module 2199. The propeller assembly 2210 may include: a magnet 2214 that may rest in a coupler 2218 and which may be coupled via a drive shaft 2220, which can be located internal to a propeller housing 2225, to a propeller 2228. A nut 2229 secures propeller 2228 to drive shaft 2220. A mechanical coupling 2230 may include fasteners 2235 (see e.g., FIG. 13D) to secure assembly 2210 to the remainder of the propulsion module 2199. Mechanical coupling 2230 stabilizes the turning motion of propeller assembly 2210 and prevents it from vibrating off hull 100. In some embodiments, the propulsion module 2199 may also include Hall Effect sensors as shown and described previously to detect the presence or absence of propeller assembly 2210 or of propeller 2228.

In operation, motor 2209 receives instructions from the command systems of the vehicle 100 to introduce, increase, or decrease power to DC motor 2208. Rotating shaft 2240 may cause internal diametrically magnetized neodymium magnet 2202 to rotate. Motor mount 2207 isolates DC Motor 2208 from the vibrations caused by spinning shaft 2240 and the magnet assembly.

Motor 2208 can generate a significant amount of heat during operation. As previously discussed, the interior volume of propulsion module 2199 can include engineered fluid for thermal management. As seen in the cross section of FIG. 13D, the walls of module 2199 can additionally include capillaries 2241 fluidly coupled to the interior volume of module 2199. Capillaries 2241 help transfer heat to the exterior of vehicle 100. The wall structure including capillaries 2241 can be designed for the needed structural strength according to techniques known to those of skill in the art. Incorporating capillaries 2241 into the wall of propulsion module 2199 or any other vehicle 100 module is achievable using any manufacturing technique, but is especially easy to build when employing additive manufacturing.

As DC motor 2208 rotates internal diametrically magnetized neodymium magnet 2202, magnet 2214 also rotates as both diametrically magnetized neodymium magnets strive to keep a N/S and S/N pole attraction. As magnet 2214 rotates, drive shaft 2220 turns causing propeller 2228 to spin. A Teflon or other wear surface 2245 (see e.g., FIG. 13C) may optionally be included to minimize friction and wear between propeller assembly 2210 and the remainder of propulsion assembly 2199.

An airgap 2252 exists between the rotating magnets and the hull or part exterior. In the absence of airgap 2252, internal diametrically magnetized neodymium magnet 2202 and external diametrically magnetized neodymium magnets 2214, would bear against the exterior wall and rotate against it, wearing and eventually compromising the wall material. Inclusion of airgap 2252 reduces the wear on propulsion module 2199.

Figure 13E:
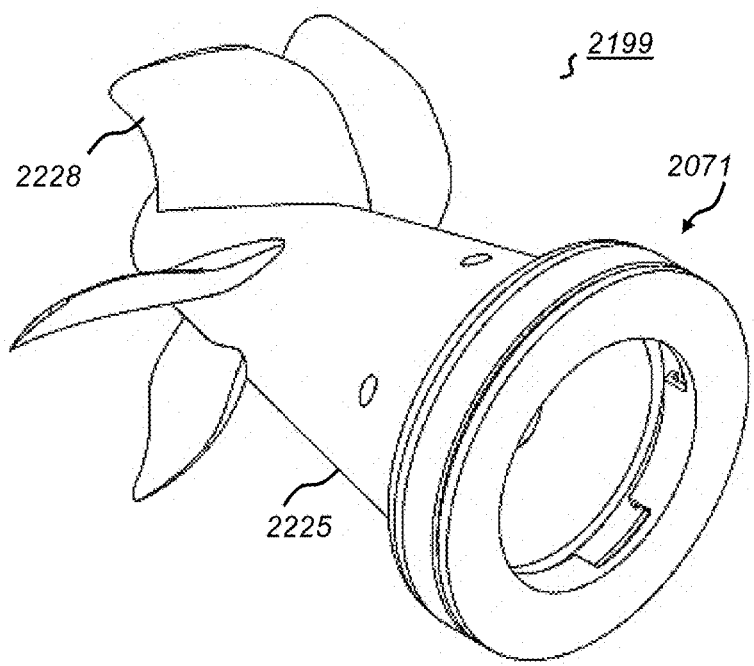
FIG. 13E illustrates an example of a propulsion module having a ball bearing track, in accordance with certain embodiments of the present disclosure.
Figure 13F:
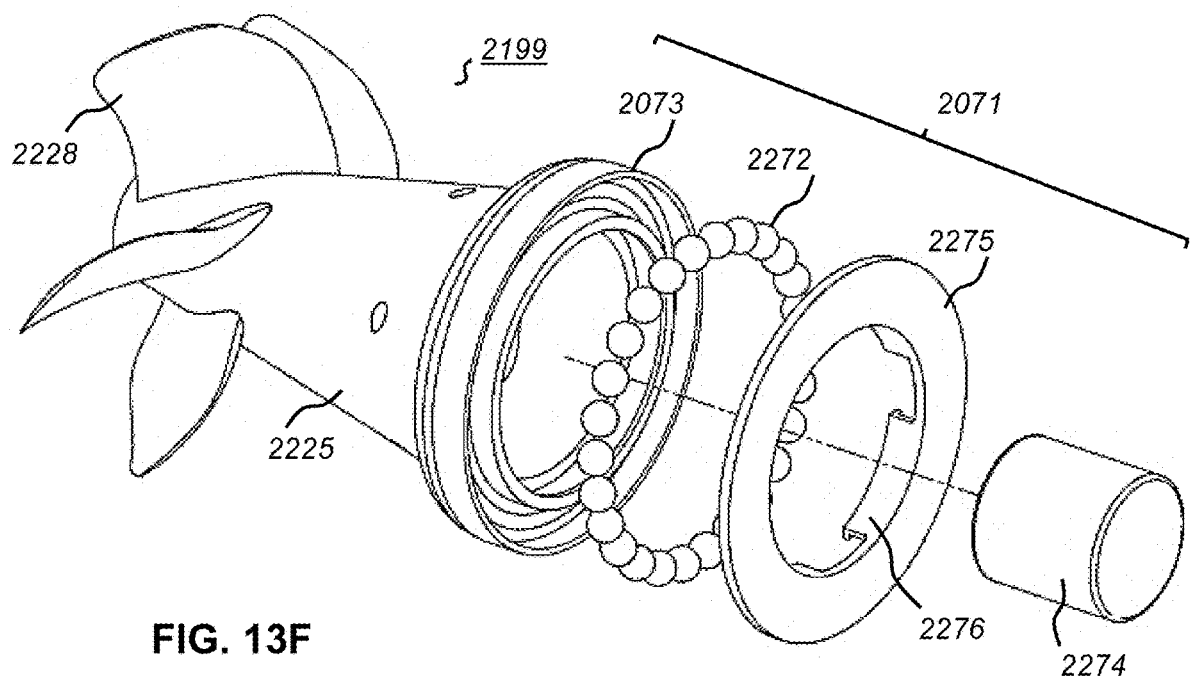
FIG. 13F is an exploded view of the exemplary propulsion module depicted in FIG. 13E that illustrates the interior of the ball bearing track, in accordance with certain embodiments of the present disclosure.

As shown in FIGS. 13E-F, in some embodiments, a ball bearing assembly 2271 may be used to reduce the amount of friction bore by the propulsion module 2199 in order to increase the longevity of the modular parts. The ball bearings 2272 within the ball bearing assembly 2271 may be made of various materials, such as plastic or certain metals like stainless steel that do not rust. Selection of the material and dimensions may be based on the environment of use, the level or type of sound produced during use of the bearings 2272, the inertia of the bearings 2272, and the wear and tear from iterative duty cycles. For example, steel bearings 2272 may be used in non-saline waters for a soft sound due to low-level abrasion characteristic when the predetermine spin-level is slow due to the heavier weight characteristic of the bearings 2272. Ceramic bearings 2272 may be used based on its longevity and rust-resistance characteristics. The surrounding water may be used as the lubricant for the bearings 2272. In certain embodiments, the contract plate/race 2275 may also be additively manufactured using the same materials selected for ball bearings 2272.

In contrast, as used in traditional implementation, the use of bolts or screws often points of egress for water or other contaminants to enter the present disclosure, causing damage to internal components. Such traditional implementations would require the use of epoxy to seal any bolt or screw holes. However, epoxy requires undesired time to cure and will degrade greatly in certain environments such as saline water.

As shown in the exploded view of FIG. 13F, the ball bearing assembly 2271 for a propulsion module 2199 may include a contact plate 2275 having contact-plate clips 2276, ball bearings 2272, a ball bearing track 2273, a propeller 2228, and a neodymium magnet 2274. The contact plate 2275, ball bearings 2272, and propeller 2228 may all be additively manufactured. While ball bearings 2272 may be purchased for some embodiments, the ball bearings 2272 may also be additively manufactured. The ball bearings 2272 may be based on 6 mm airsoft balls. The neodymium magnet 2274 may be epoxied or glued to the propeller 2228. The propeller 2228 may be printed or molded with a ball bearing track 2273. The ball bearing track 2273 may be printed or molded to a specific width according to ball bearings 2272. The ball bearings 2272 may be placed or inserted into the ball bearing track 2273. The contact plate 2275 may snap over the ball bearings 2272 and the ball bearing track 2273, which may be secured by the contact plate 2275 with the contact-plate retention clips 2276. The retention clips 2276 may insure that the ball bearings 2272 do not escape the contact plate/race 2275.

In operation, a secondary thruster 220 may also utilize a propulsion module 2199 with ball bearings 2272 that is placed against a vehicle 100 or another module. The neodymium magnet 2274 may secure the secondary thruster 220 with ball bearings 2272 to the hull 100 or other module. Within the hull 100 or other module, a neodymium magnet 2202 may positioned to engage the neodymium magnet 2214, 2274 located within the propulsion module 2199, in accordance with the exemplary engagements shown in the embodiments illustrated in FIGS. 13C-D. A motor inside a hull 100 or other module may spin the other neodymium magnet 2202, aligning the poles of both magnets so that one positive (i.e. north) pole is aligned with the other positive pole, and one negative (i.e. south) pole is aligned with the other negative pole. Aligning like poles may cause one neodymium magnet to turn, as like poles on a magnet repel one another. Referring back to FIG. 13F, the neodymium magnet 2274 within the ball bearing assembly 2271 along with ball bearings 2272 may spin to align the poles to its opposite alignments. The ball bearings 2272 may roll within the ball bearing track 2273, causing the propeller 2228 and the secondary thruster 220 with ball bearings 2272 to spin. While the secondary thruster 220 with the ball bearings 2272 spins, the contact plate 2275 may remain stationary.

Accordingly, the contact plate 2275 may remain stationary against a hull or another module while the secondary thruster 220 spins on the ball bearings 2272. By using ball bearings 2272 to enable such a low-friction rotation, the secondary thrusters 220 with ball bearings 2272 over the contact plate 2275, certain embodiments of the present disclosure may make use of rolling friction over dynamic friction. Dynamic friction, or kinetic friction, is a force of resistance as two surfaces slide or rub over one another. In contrast, rolling friction or resistance friction is a force of resistance of a body as it rolls on a surface. In an embodiment of a secondary thruster 220 with ball bearings 2272, the rolling friction results from the ball bearings 2272 rolling over the contact plate 2275. By using the rolling friction of ball bearings 2272 over the contact plate 2275, wear on a hull, another module, and contact plate 2275 may be reduced. As such, the longevity of the components are increased.

The fixed pitch propeller 2228 rotates to propel vehicle 100 to move forward. Changing the direction of rotation for propeller 2228 will propel vehicle 100 backward. A Hall Effect sensor located just below internal diametrically magnetized neodymium magnet 2202, measures the strength of the magnetic fields created by magnets 2202, 2214. The measurements detected by the Hall Effect sensor are indicative of the proximity, position, and/or speed of the magnets and are especially useful for indicating propeller RPM. This data is communicated via data busses 106 and 107 the command system of the vehicle 100 to control operation of propulsion module 2199.

External retention collar 2230 helps to constrain motion of propeller assembly 2210 to the rotational direction and to minimize vibration and out of plane motions. Retention collar 2230 attaches to propulsion module 2199 by propeller caps 2260 and fasteners 2235. When vehicle 100 is in use, external retention collar 2230 makes vehicle 100 more resilient to impact, reducing the chances for propeller 2228 or propeller assembly 2210 to be dislodged.

As discussed in connection with FIG. 12, the overall complexity and part count for propulsion assembly 2210 can be reduced by eliminating nut 2229 and drive shaft 2220. Propeller housing 2225 and mechanical coupler 2218 can be fabricated as a single piece. In this configuration, when magnets 2214 rotate, the entire combined assembly rotates, thereby turning propeller 2228.

One advantage of the propulsion module for certain embodiments of the present disclosure is that when the propeller is fouled and cannot rotate, the propeller need not be severed from the vehicle or lost. If propeller 2228 stops rotating, drive magnet 2202 simply continues to rotate. The driven magnet, 2214 will "cog" or "slip" as it tries to maintain the N/S alignment, but this motion will not impose harmful torques on propeller assembly 2210, motor 2208, or the remainder of vehicle 100. Retainer pins 2235 will keep propeller assembly 2210 from detaching from the vehicle 100. Once the debris or object clears the propeller and it is no longer fouled, propeller assembly 2210 and propulsion module 2199 return to normal operation. The mission can be completed without the need to retrieve a stranded vehicle and replace the propeller. This advantage may also apply to moveable configurable elements such as moveable control surfaces that can also become fouled or impeded through their range of motion.

Figure 14A:
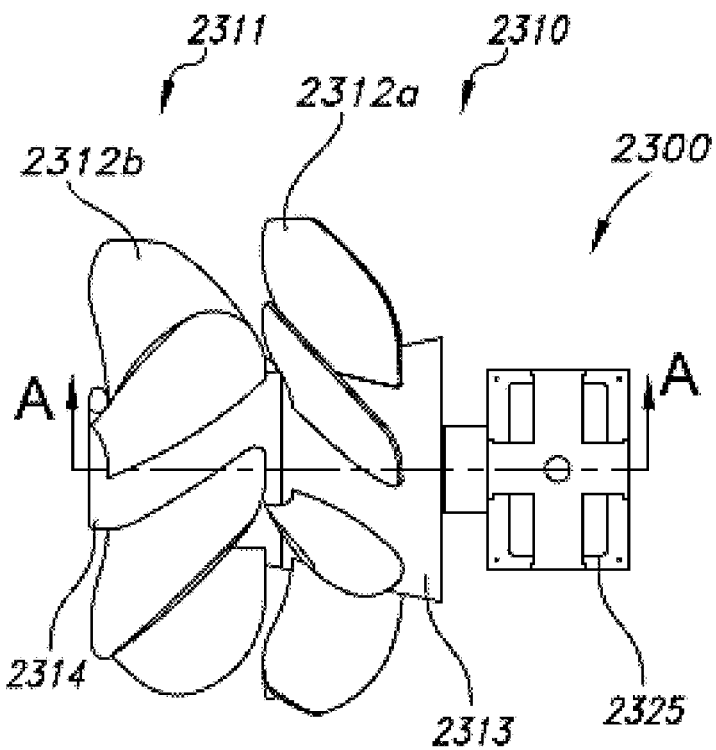
FIGS. 14A and 14B are illustrations of a counter rotating propeller assembly, in accordance with certain embodiments of the present disclosure.
Figure 14B:
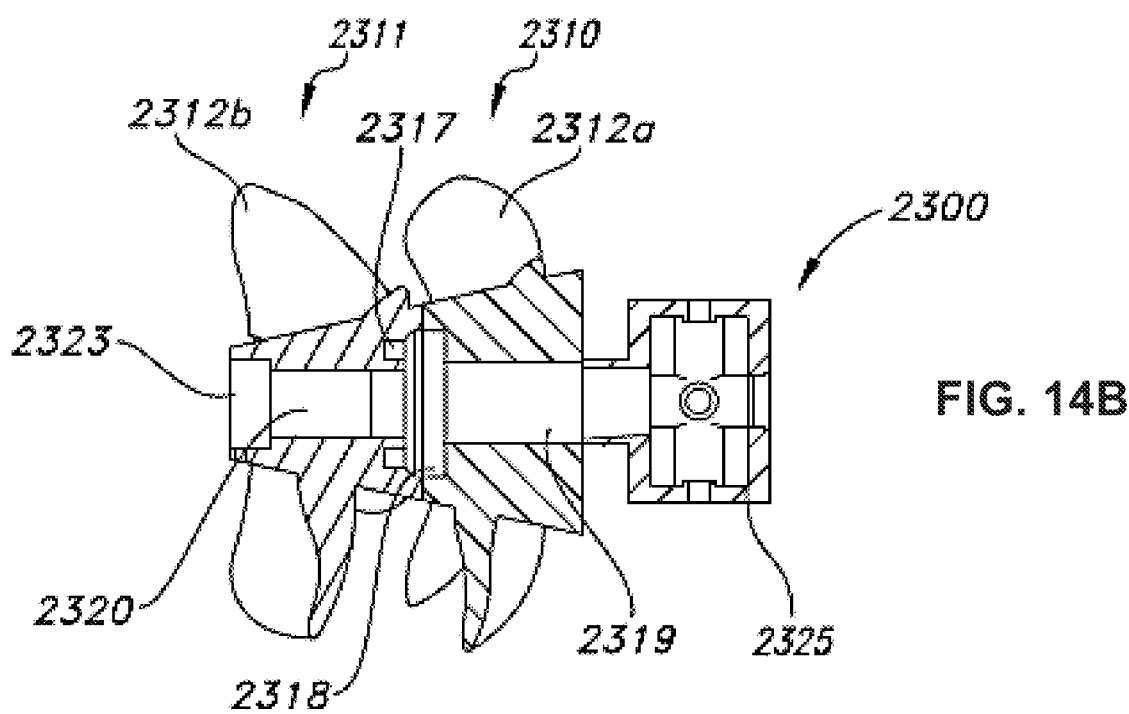

FIGS. 14A-B show an alternative embodiment of a propeller assembly 2300 having counter rotating propellers 2310, 2311. Propellers 2310, 2311 may include a plurality of individual blades 2312a and 2312b secured to a housing. Blades 2312a and 2312b may be orientated at substantially opposite pitches. As draw in FIG. 14A, the blades 2312 of propeller 2310 secure to housing 2313 and the blades of propeller 2311 secure to housing 2314. Housing 2313 is coupled to housing 2314 by bolts 2317 and a plate 2318. Housings 2313, 2314 as well as blades 2312 may be made using additive manufacturing techniques such as 3D printing.

As seen in the cross section of FIG. 14B, propeller assembly 2300 also includes a larger diameter inboard drive shaft 2319 and a smaller diameter shaft 2320. A nut 2323 at the end of drive shaft 2320 secures and retains housings 2313, 2314. Smaller diameter shaft 2320 extends to fit inside larger diameter shaft 2319 and both shafts 2319, 2320 couple to a bevel gear box 2325. Gear box 2325 contains the gearing mechanisms that drive shafts 2319, 2320 as is known to those of skill in the art, which in turn may be coupled to rotating magnets 2214 that turn the gears in gear box 2325.

The entire propeller assembly couples to the remainder of the propulsion module 2199 as shown and described previously in FIG. 13A. As the DC motor 2208 may cause magnets 2202 to rotate, magnets 2214 of propeller assembly 2300 also rotate. The rotation of magnets 2214, in turn cause the gears in gearbox 2325 to rotate shafts 2319, 2320 and spin propellers 2311, 2310.

Propellers 2311, 2310 may counter-rotate, with one propeller and propeller shaft spinning clockwise and the second spinning counterclockwise. In single propeller designs, the single propeller introduces a yawing moment, or turning tendency, for which the vehicle control systems must compensate to keep the vehicle oriented as desired. With the propeller assembly 2300 of the present disclosure, the counter rotating propellers each cancel out the yawing moment of the remaining propeller, thereby improving vehicle handling and reducing the need for additional control forces to keep the vehicle oriented.

1.4 Vehicle Scuttle Module

When vehicle 100 comprises a UUV, the vehicle operator may command scuttling of the vehicle. Scuttling the vehicle may be desirable to prevent unauthorized access to vehicle 100, to prevent vehicle 100 from being detected by an adversary, or to halt vehicle 100 operations when extreme hazards exist. Other reasons for scuttling vehicle 100 may exist.

Figure 15A:
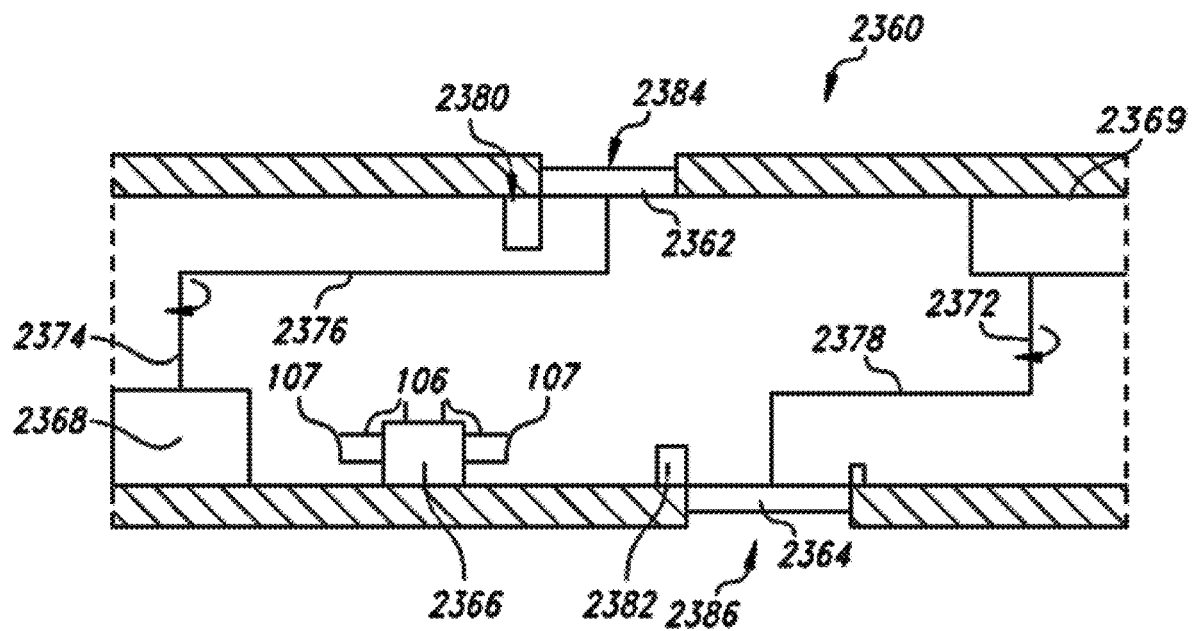
FIGS. 15A and 15B are cross-sectional views of embodiments of a scuttle module, in accordance with certain embodiments of the present disclosure.
Figure 15B:
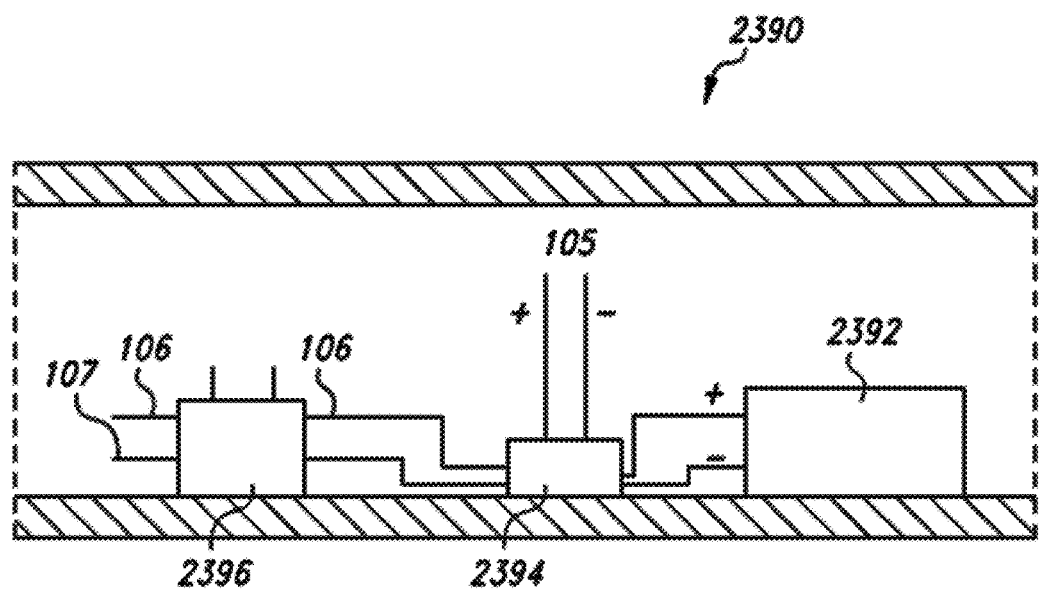

According to an embodiment of the present disclosure, vehicle 100 includes a scuttle module to autonomously scuttle the vehicle in predetermined conditions; or upon receiving an external communication to do so. FIGS. 15A-B illustrate embodiments of a scuttle module 2360, according to the present disclosure. In the embodiment of FIG. 15A, scuttle module 2360 includes a set of operable doors 2362, 2364. When closed, doors 2362, 2364 prevent water from entering module 2360. If vehicle 100 is to be scuttled, a command is sent via CAN bus 106, 107 to a module microcontroller 2366 which then commences operation of DC motors or servos 2368, 2369. Motors 2368, 2369 may cause shafts 2372, 2374 to turn and via linkages 2376, 2378, doors 2362, 2364 pivot on their respective hinges 2380, 2382 exposing openings 2384, 2386 to the sea. Optionally, doors 2362, 2364 can be constructed to slide in a track by coupling the door to a gear operated by DC motors 2368, 2369. Other linkages and mechanisms are possible.

With doors 2362, 2364 open to the sea, water floods the interior of module 2360. The interior volume of module 2360 is sized such that vehicle 100 propulsion and control systems will not be able to overcome the added weight of the water, and vehicle 100 will sink. Multiple scuttle modules 2360 can be used to configure vehicle 100 to ensure that a volume of water sufficient to scuttle the vehicle floods the modules.

In lieu of hinged doors, any modules of the vehicle 100 can also optionally include voids covered initially by water tight doors. These doors can be opened using the rotational magnet mechanisms illustrated in any of FIGS. 8-9, 10A. When commanded, the servo rotates the attached magnet, causing the magnet coupled to the watertight door to rotate and open the door. With the watertight doors of the modules commanded open, water floods the vehicle causing it to sink.

FIG. 15B illustrates yet another alternative embodiment of a scuttle module 2390. In the embodiment of FIG. 15B, module 2390 includes a small explosive charge 2392. Explosive charge 2392 is coupled to a detonator 2394 according to principles known in the art. If vehicle 100 is to be scuttled, a command is sent via CAN bus 106, 107 to trigger the detonator. For additional safety, the command may be routed through a local processor 2396 included with module 2390 that performs a series of check sums, key exchange, or other secure validation of the command or command sequence. If the command sequence is valid, processor 2396 forwards the detonation command to detonator 2394. The resulting detonation of explosive charge 2390 is sized large enough to break apart vehicle 100 and send her to the bottom. According to some embodiments of the present disclosure, module 2390 also includes electrical fault isolation systems to prevent errant currents or short circuits from triggering detonator 2394.

Constructing a scuttle module according to the embodiment of FIG. 15B, requires operators receive specialized training in the safe handling, use, and storage of module 2390. Painting or coloring module 2390 hazard orange and labeling the module with appropriate safety placards is also recommended. These actions provide a visual clue to the operator that module 2390 requires special handling and care when being attached to vehicle 100 during vehicle 100 use.

2.0 Vehicle Systems

Vehicle 100 includes both a physical systems and a logical systems architecture. Vehicle 100 physical architecture includes hardware such as computing architecture, power systems, power distribution buses, internal storage and memory, device controllers, sensors, and data buses. Vehicle 100 logical systems include command and control logic and stability and control logic.

2.1 Hardware Systems Architecture

Figure 16:
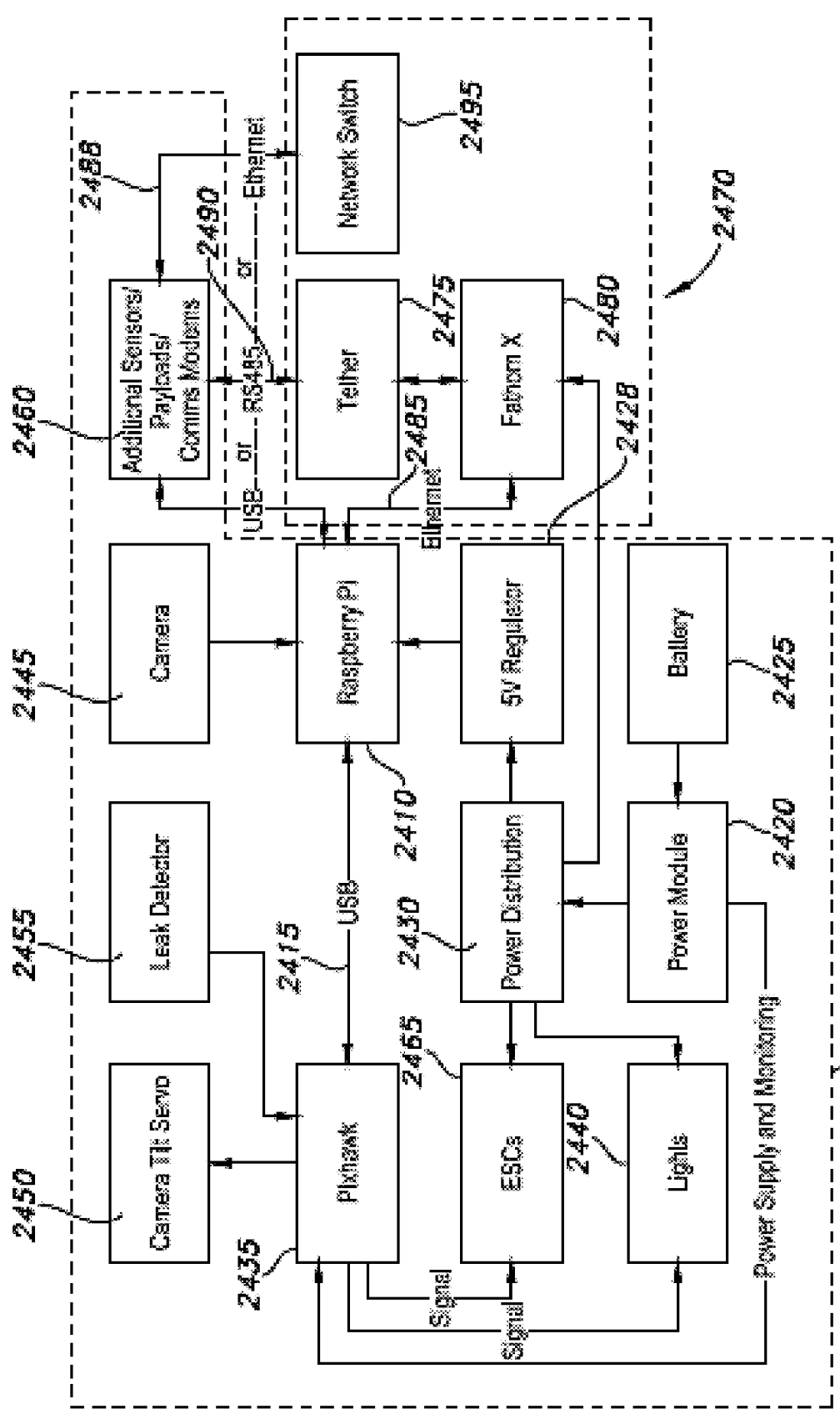
FIG. 16 is a systems block diagram of a configurable autonomous vehicle, in accordance with certain embodiments of the present disclosure.

FIG. 16 contains a hardware systems diagram of vehicle 100. In the diagram of FIG. 16, a set of onboard hardware components 2400 include several hardware subsystems. According to an embodiment of the present disclosure, a central computer 2410 interfaces with the remaining vehicle subsystems and reads and writes commands and data to other vehicle 100 components via a USB or CAN Bus 2415. In an embodiment of the present disclosure, a computer 2410 may comprise a commercially available Raspberry Pi computer mother board that is well known in the art. In an embodiment of the present disclosure, vehicle 100 may include a discrete command module that includes the computer 2410 which may comprise a computer motherboard 2410 and associated memory and electronics.

Motherboard 2410 is powered by a power module 2420 for a vehicle 100. The power module 2420 may be physically collocated with motherboard 2410 or comprise a separate configurable power supply module with different types or quantities of power. In an embodiment of the present disclosure, power module 2420 includes a battery 2425 as a power supply. In the hardware systems diagram of FIG. 16, power module 2420 supplies 5V DC to motherboard 2410 via a power conditioning device, regulator 2428. A power distribution system, or switches, 2430 route power to other vehicle 100 components needing electrical power. As described above, power is distributed throughout vehicle 100 via power bus 105.

Power and data signals may be shared with peripherals using a standard interface and interface definition that are well known in the art such as, for example, drone hardware interface and interface standards 2435. Peripherals can include lights 2440 that may be used as a means of communication or as a source of illumination for a camera 2445. The position of camera 2445 can be fixed or can be controlled by a camera tilt servo 2450. When vehicle 100 comprises a UUV or other watercraft, peripherals may additionally include one or more leak detectors 2455. Leak detectors 2455 may be distributed throughout vehicle 100 to detect the ingress of water into individual modules that may cause vehicle 100 to sink or capsize. Additional sensors or payloads 2460 as previously described may also be included within the hardware systems of vehicle 100. An electronic systems controller(s) 2465 interfaces with power distribution system 2430 to control peripherals according to instructions received from computer 2410.

Onboard vehicle systems 2400 may interface with shore-side controller hardware 2470. According to an embodiment of the present disclosure, controller hardware 2470 comprises an electronic tether 2475 coupled to a Fathom X endpoint 2480. Tether 2475 and Fathom X device 2480, couple to vehicle 100 via an Ethernet link 2485 allowing the vehicle operator to configure vehicle 100 systems via motherboard 2410. Tether 2475 can optionally also couple to other vehicle sensors 2460 via an Ethernet link 2488 or another communications bus such as, for example, an RS 485 bus 2490. A network switch 2495 controls connections to any given peripheral or to a specific communications bus by shore-side controller hardware 2470.

2.2 Software and Logic Systems Architecture

Figure 17:
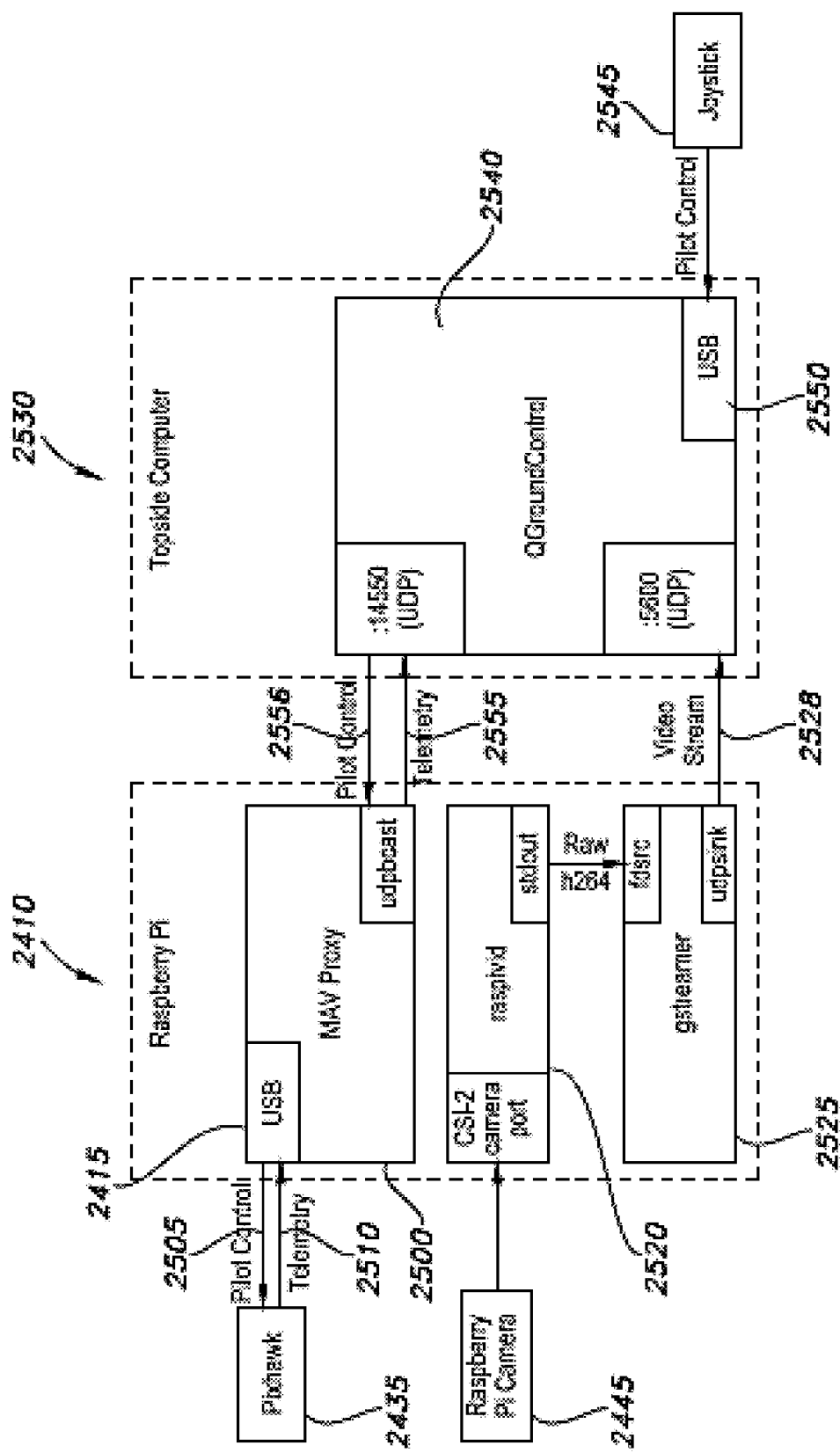
FIG. 17 is a block diagram of a vehicle software architecture, in accordance with certain embodiments of the present disclosure.

FIG. 17 contains a block diagram of a vehicle 100 software system according to an embodiment of the present disclosure. In the systems architecture of FIG. 17, the Raspberry Pi computer 2410 includes a variety of firmware or software logic for controlling and operating vehicle 100. A first logical component 2500, which may comprise MAVProxy software produced by ArduPilot.org, may read and write data and instructions via a USB or other electronic data port/modem 2415. Optionally, mathematical computing software may include command and control logic that may also be included to form logic component 2500 and to configure vehicle 100, once such tools are completely developed. The instructions for controlling and operating vehicle 100 may include command and control logic instructions 2505 exchanged according to the Pixhawk interface 2435. Logic 2500 also receives data and telemetry 2510 received from peripherals or attached devices via interface 2435 and USB port 2415. As discussed in greater detail below, logic module 2500 may also include logic for navigating and positioning vehicle 100 via manipulation of propulsion module 2199 and vehicle 100 control surfaces according to navigation data and other mission parameter data and functions stored and executed by logic 2500 and onboard computer 2410.

A second vehicle logic module 2520 operates onboard cameras and optics. In an embodiment of the present disclosure, software module 2520 may comprise software which reads and writes data and instructions from a camera 2445. According to an embodiment of the present disclosure, camera 2445 may comprise a Raspberry pi camera that is well known in the art.

According to an embodiment of the present disclosure, visual data captured by camera 2445 is written to software module 2520 and raw image data then transmitted (or rewritten) by software module 2520 to a streaming software logic function 2525. Streaming function 2525 can then upload or stream data 2528 off of vehicle 100 to shore-side computers 2530 or other data and telemetry receiving devices.

As will be readily apparent to those of ordinary skill in the art, the vehicle software architecture 2410 of FIG. 17 may be implemented in software, firmware, or ASIC devices and is not limited to the specific software shown in FIG. 17. The logic functions may also be apportioned across various software routines or firmware and need not be strictly segregated into the software modules as drawn.

According to an embodiment of the present disclosure, vehicle 100 interfaces with a shore-side computer 2530 via a controller 2470 as shown in FIG. 16. In an embodiment, the topside computer 2530 may include vehicle configuration and control software that are well known in the art. The software may be customized to perform predetermined methods. Software 2540 may optionally interface with a joystick 2545 which may serve as a means for operator control of a tethered vehicle 100 when not operating autonomously; or as means for inputting data to software 2540. Joystick 2545 provides data to software 2540 via a USB port 2550 or other electronic port known to those of skill in the art.

Command and configuration data and information exchanges 2555, 2556 received from vehicle 100, may be communicated to/from topside computer 2530 via a USB or Ethernet link with Raspberry Pi computer 2410 via software module 2500 and software module 2540. As noted in connection with the description of the vehicle 100 logic architecture, topside logic 2530 may be implemented using other software, firmware or ASIC modules as is known in the state of the art and is not limited to the specific software configuration shown in FIG. 17.

Topside software and computer 2530 may be used by operators of vehicle 100 to configure systems of a vehicle 100, load mission parameters and instructions, and to validate the operational status of systems of a vehicle 100 and its modules, sensors, payloads and other elements and components. FIG. 18 shows an example of a vehicle user interface 2600. In the example user interface of FIG. 18, a left side menu 2610 allows the user to select various top level systems for further parameter definition and configuration. As illustrated in FIG. 18, a summary page is selected and area 2620 of the user interface summarizes the current operational status and configuration of various onboard systems including: navigation sensor packages 2625, power systems 2630, safety systems 2635, frame parameters 2640, lights 2645, and camera systems 2650. In an embodiment of the present disclosure, user interface 2600 comprises software or firmware that are well known in the art.

Other user interface systems may be used with certain embodiments of the present disclosure, which may not be limited to the specific software or user interface shown. In addition, as described previously, vehicle 100 may be configured for a variety of missions and uses, and may include a variety of different types of sensors, telemetry, power, safety, and other onboard systems. The option to configure and set parameters for such additional systems may also be available to the vehicle operator via user interface 2600 as desired.

2.3 Vehicle Stability and Control

In traditional vehicles of fixed design and configuration, the vehicle mass and control configurations are established in advance and are known. Thus, when operating traditional vehicles in an autonomous mode, the moments of inertia of the vehicle and its stability control coefficients: information needed to control and manoeuvre the vehicle remains a known set of constants. In contrast, adding and removing modules, and adding and removing various propulsion systems, and external modular elements to vehicle 100 alters the center of mass, center of buoyancy and the stability and control parameters of vehicle 100 each time a new vehicle 100 is configured.

2.3.1 Dynamically Determined Stability and Control Logic

According to an embodiment of the present disclosure, vehicle 100 includes onboard logic or programming that receives configuration data from each module and component which makes up vehicle 100. Such configuration data may include the individual dimensions and mass properties of each attached module or component, as well as its stability and control parameters, and/or its performance parameters and operational limits, payloads, design limits, or other information.

Data about the module or element may be collected by the operator topside, for example by reading from a label or inscription on the element or module, at the time of vehicle configuration. This information can then be entered and loaded into vehicle computer 2410 via topside computer 2530. Vehicle computer 2410 can them compute the stability and control coefficients and control laws for vehicle 100. Optionally, each individual module may have its information stored in a memory and a processor located aboard each module. According to an embodiment of the present disclosure, modules may include a Beagle Bones microprocessor, coupled to CAN bus 106, 107 for this purpose. Individual elements may also include a small read only memory (ROM) device, also coupled to a CAN data bus that stores information about the individual element. This memory can be queried by the microprocessor aboard the attached module, or directly from the vehicle central processing system 2410.

For example, propulsion system 2199 may transmit via CAN bus 107, 106, the type of propeller attached including data such as propeller pitch and number of blades, as well as operating limits such as maximum revolutions and operating envelopes. Additionally, control surfaces and wing data may include lift and drag data, wing configuration, and stability coefficients. If such surfaces are not fixed, control surface data may include the range of motion or degrees of travel over which the surface can be positioned. Module data may include information about module capabilities; ballast and payload contents, if any; and module mass, moment of inertia, stability coefficients and dimensional properties. As will be evident to those of skill in the art, a variety of information about each configurable attachment and individual module may be transmitted via data bus 107, 106 as desired to aid in operating vehicle 100 and performing vehicle 100 missions.

According to an embodiment of the present disclosure, when a module or component is attached to vehicle 100, that module or component transmits via CAN bus 107, 106 the configuration and characteristics data stored in local memory within that module or component. Optionally, when a module or component is attached to vehicle 100, that module or component can transmit a module or component identification value via CAN bus 106, 107. Computer 2410 has stored therein a look up table, memory, logic, or other programming that associates a set of configuration and characteristics data with the component identification value received.

Even with the individual module mass properties and stability coefficients provided to computer 2410, the overall vehicle stability coefficients, mass properties and dynamics must be calculated so vehicle 100 can be controlled and operated. Various approaches may be used to dynamically determine the necessary control laws and parameters. These approaches include direct calculation using the known properties of the individual modules; or empirically determining the control law values by having the assembled vehicle 100 execute a defined series of manoeuvres prior to departing on the mission; or some combination of both. In the latter case, a set of stability and control coefficients can be calculated and then vehicle 100 could conduct a short test run to validate or refine the calculated values. Vehicle 100 also dynamically updates its control parameters as it drops ballast or consumes consumables during operation. These calculations could also be periodically verified by vehicle 100 autonomously executing a short series of manoeuvres periodically during the mission to validate and update prior stability calculations or to just empirically determine the changed control parameters.

Figure 19:
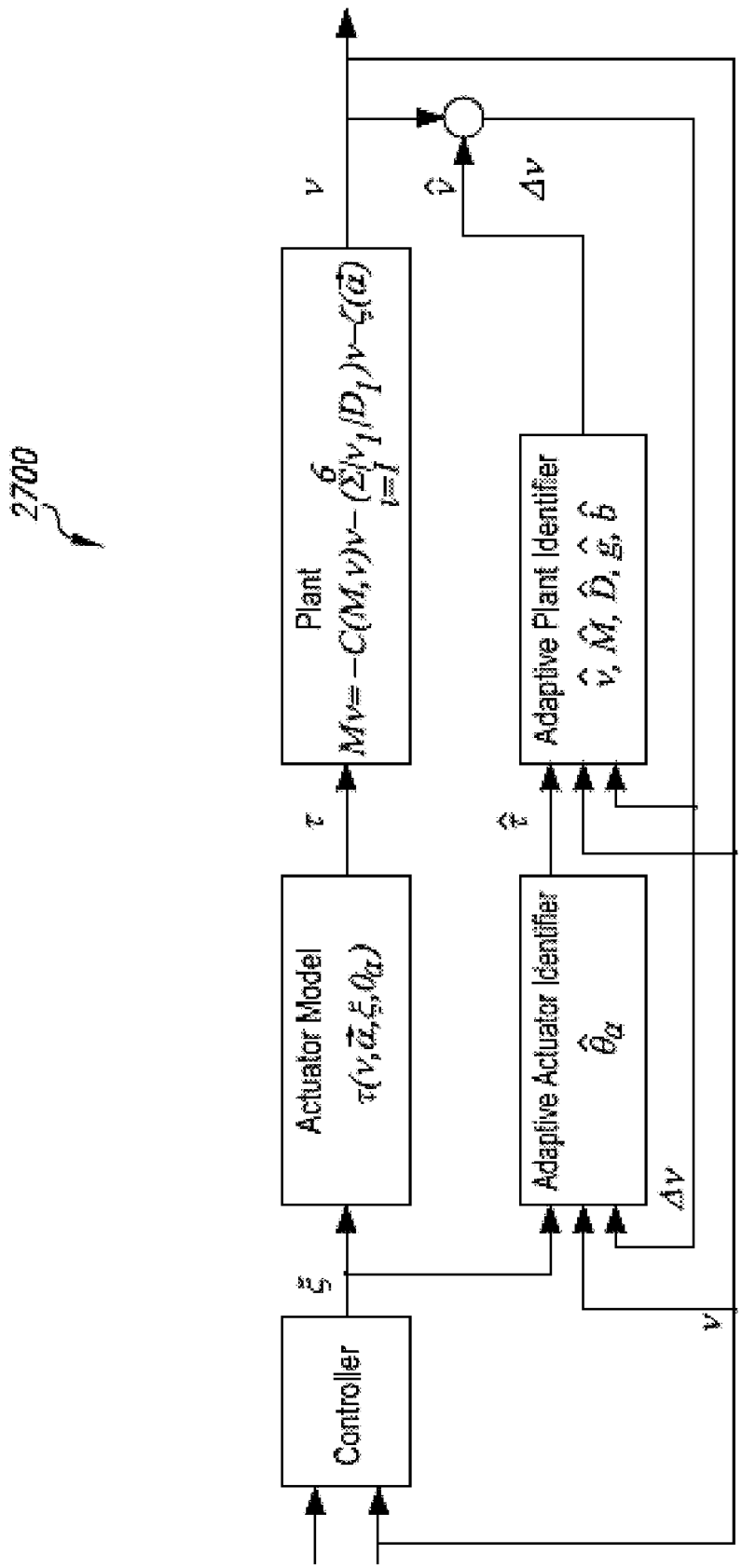
FIG. 19 is a block diagram of a fully coupled, fully activated six-degrees of freedom adaptive plant model control system, in accordance with certain embodiments of the present disclosure.

Methods for dynamically calculating vehicle 100 stability and control coefficients include: adaptive methods, least squares regression models, Kalman filter models and machine learning models. Any of the above methods can be used to dynamically calculate the vehicle 100 stability and control coefficient and control laws. Adaptive methods that are well known in the art may utilize a three-degree of freedom model, a decoupled six-degrees of freedom model and a fully coupled, fully actuated six-degrees of freedom plant model. Some embodiments of the present disclosure, as described herein, may include fully coupled, fully actuated six-degrees of freedom plant models. Additional models which may be used to dynamically calculate vehicle 100 stability and control coefficients and control laws include least squares linear regression methods. These methods may include the following models that are well known in the art: a three-degree of freedom model, a six-degrees of freedom model, and reduced parameter six-degrees of freedom model. Traditional Kalman filter approaches for dynamically determining the stability and control coefficients and control laws of vehicle 100 may also be utilized, in accordance with certain embodiments. Machine learning and neural network methods have also been developed as a method for calculating the stability and control coefficients and control laws, which are well known in the art. Each of these above methods may be used with certain embodiments of the present disclosure regardless of the type of vehicle. As is well known to those of skill in the art, the equations can be rewritten to account for the vehicle type and the nomenclature/symbology normally used in the associated field. According to an embodiment of the present disclosure, vehicle 100 control laws include adaptive plant methods model 2700 as illustrated in the block diagram of FIG. 19 and as defined below. Vehicle 100 may execute such dynamic stability and control laws to control the motions and to navigate vehicle 100 based on the following equation:

$$M\dot{v} = -C(M, v)v - \left(\sum_{i=1}^{6}|v_i|D_i\right)v - \mathcal{G}(a) + \tau(v, a, \xi, \theta_a)$$

where:
- $M\dot{v}$ represents inertial terms.
- $C(M,v)v$ represents Coriolis terms.
- $(\Sigma_{i=1}^{6}|v_i|D_i)v$ represents quadratic drag terms.
- $\mathcal{G}(a)$ represents buoyancy terms.
- $\tau(v,a,\xi,\theta_a)$ represents control forces/moments terms.
- $v \in R^6$ is the body velocity.
- $a$ is the body attitude vector.
- $M \in R^{6\times 6}$ is the positive definite symmetric mass matrix.
- $D_i \in R^{6\times 6}$, i=(1, 2, . . . 6) is the negative semidefinite drag matrix for the ith degree of freedom
- $\xi \in R^p$ are control inputs, such as fin angle and propeller speed.
- $\theta_a \in R^q$ is vector of actuator parameters to be identified. Examples of these terms include lift and drag coefficients of the control surfaces and propeller coefficients.

2.3.2 Center of Mass Redistribution Module

There may exist configurations of vehicle 100 for which the available control surfaces lack sufficient authority to reliably control the vehicle, or in which the vehicle is dynamically or statically unstable to such a degree as to make mission execution a concern. Alternatively, the initial vehicle 100 configuration may be within desired operating envelopes, but after dropping a cargo, collecting a sample, or dropping ballast, the resulting vehicle 100 properties exceed safe operating parameters. In such situations, relocating the center of mass/gravity of vehicle 100 may sufficiently alter vehicle 100 stability and control characteristics to return vehicle 100 to safe limits of operation.

Figure 20B:
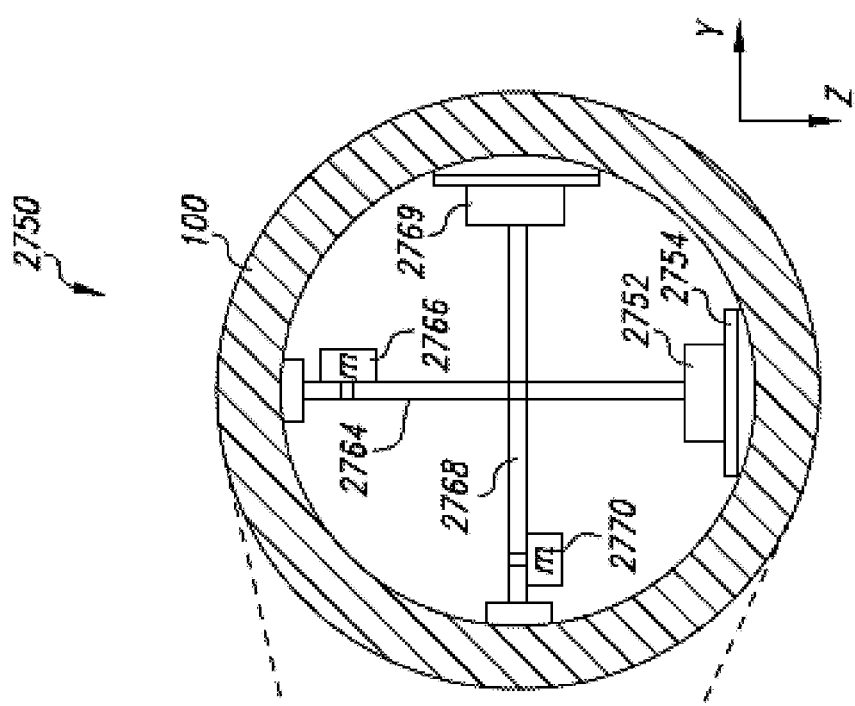
FIGS. 20A and 20B are views of a module for positioning a center of mass of a vehicle, in accordance with certain embodiments of the present disclosure.
Figure 20A:
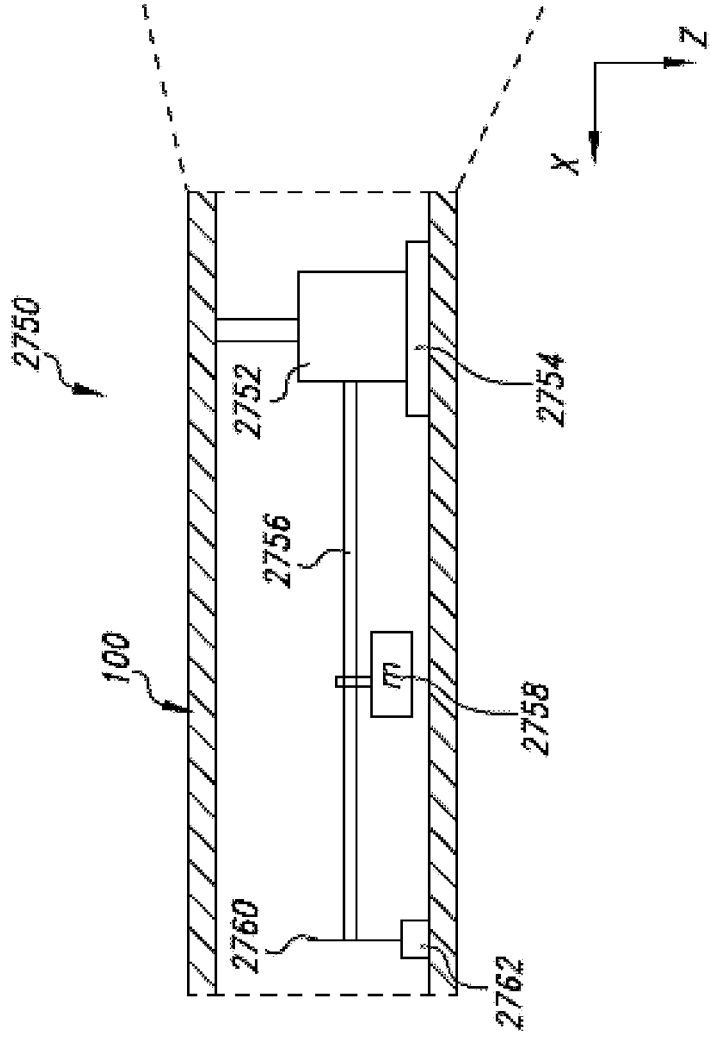

FIG. 20A is a side cross-sectional view and FIG. 20B is a second cross-sectional view of a mass redistribution and configuration module 2750, according to an embodiment of the present disclosure. As shown in FIGS. 20A-B, mass redistribution module 2750 includes mechanisms that can selectively change the location of vehicle 100 center of mass by repositioning moveable masses on each of the x, y, and z axes of the vehicle 100. In an embodiments of the present disclosure, module 2750 includes moveable masses for just a single one of the x, y, or z axes, or simply any two of the x, y, or z axes. Optionally, for greater precision, module 2750 can include multiple moveable masses of different weights on any given one or more of these axes.

As shown in FIG. 20A, a module 2750 may include a servo or DC drive motor 2752, mounted on a motor mount or isolation plate 2754. Motor 2752 drives a worm gear 2756 to which is attached a mass m, 2758. The worm gear is anchored to a termination plate 2760 secured to the module 2750 structure either directly or through an isolation plate 2762. As shown in FIG. 20A, worm gear 2756 is located parallel to or on the x axis of vehicle 100. Motor 2752 may receive commands from vehicle 100 command logic via data buses 106, 107 to turn worm gear 2756 and position or reposition mass 2758 at the desired location along the x axis. Module 2750 may optionally include a separate sensor to detect the position of mass 2758; or optionally, module 2750 may be pre-calibrated to correlate the number of revolutions of worm gear 2756 to a given location of mass 2758.

FIG. 20B shows an end view of the module 2750 of FIG. 20A. In the cross section of FIG. 20B, DC motor 2752 is coupled via additional gearing to drive a second worm gear 2764. Optionally, a second DC motor 2752 can be included to drive worm gear 2764. Motor 2752 receives commands from vehicle 100 control logic to turn worm gear 2764 and position a mass 2766 along or parallel to the z axis of the vehicle 100. The position of mass 2766 can be determined in a manner similar to that described in connection with mass 2758.

Also shown in the embodiment of FIG. 20B is a third worm gear 2768 coupled to a DC motor 2769. Motor 2769 may turn a worm gear 2768 in response to commands received from the vehicle 100 control logic. Turning worm gear 2768 positions mass 2770 along the y axis of vehicle 100. The position of mass 2770 can be determined in a manner similar to that described in connection with the movements of masses 2758, 2766.

Inclusion of module 2750 in the configuration and assembly of vehicle 100 allows the vehicle 100 center of mass/gravity to be repositioned to obtain optimum performance of vehicle 100 and to maintain vehicle 100 operating characteristics within desired operational envelopes. Any masses 2758, 2766, 2770 can be positioned or repositioned at any time during operation of vehicle 100. This capability additionally allows vehicle 100 to be "trimmed" for the particular operating conditions or manoeuvre. Trimming vehicle 100 reduces the amount of work the control surfaces must do to maintain vehicle 100 in a particular attitude or orientation. Reducing the number and magnitude of required motions of the control surfaces in turn saves vehicle power and increases vehicle endurance and range.

2.3.3 Buoyancy Control Module

Figure 21:
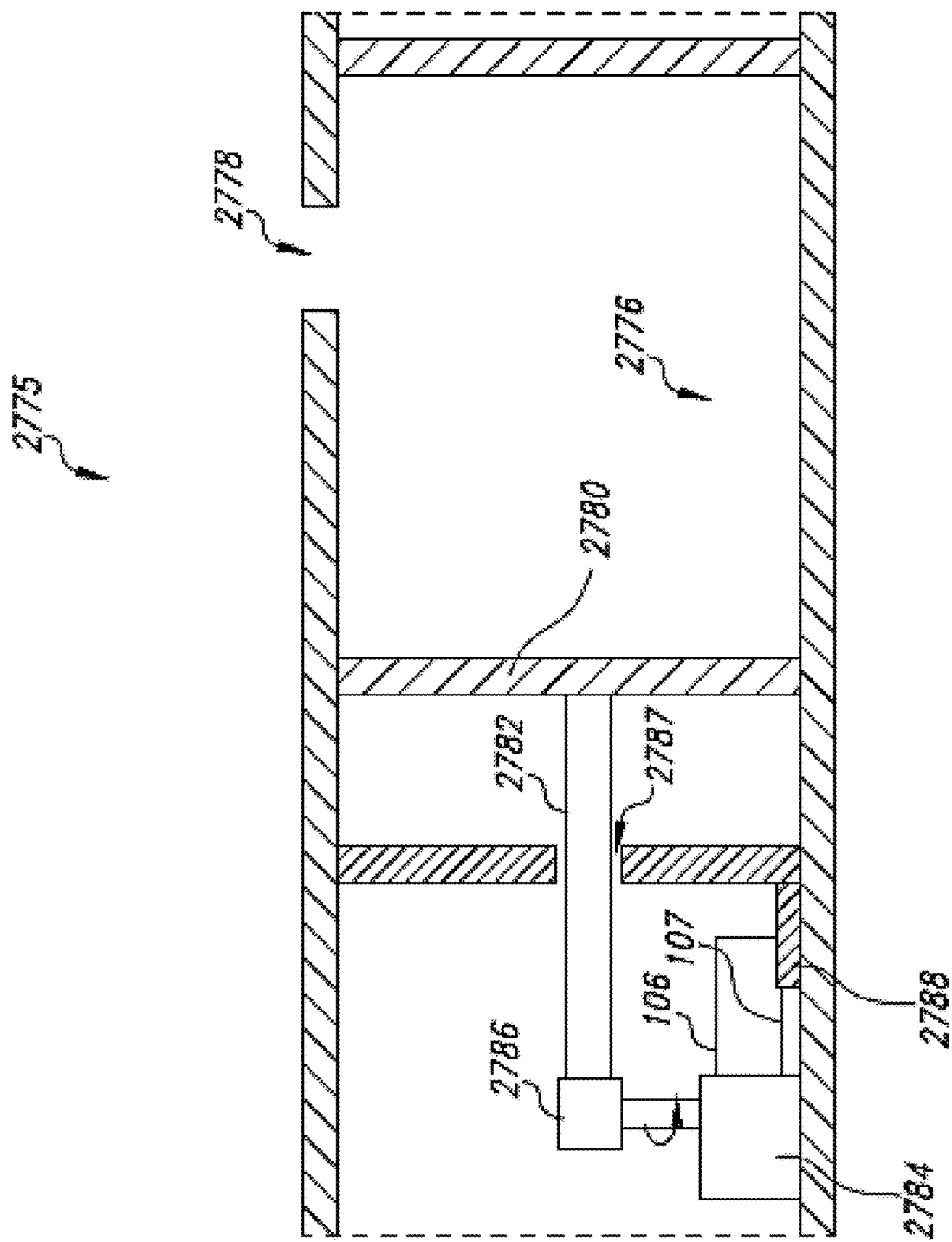
FIG. 21 is a cross-sectional view of a buoyancy module for positioning a center of buoyancy of a vehicle, in accordance with certain embodiments of the present disclosure.

Similar to the reasons for wanting to control the position of the vehicle 100 center of mass, when vehicle 100 comprises a UUV 100, a module may be provided for controlling the buoyancy of vehicle 100. FIG. 21 illustrates a cross section of a buoyancy control module 2775, according to an embodiment of the present disclosure. Buoyancy control module 2775 selectively increases and decreases the net buoyancy of the vehicle 100. Module 2775 includes one or more flood tank areas 2776 fluidly coupled to the exterior of the hull through port(s) 2778. A piston 2780 is mounted on an actuator rod 2782 and coupled to DC servo motor 2784 through a gear box 2786. Servo motor 2784 moves piston 2780 fore or aft inside flood chamber 2776 to increase or decrease flood tank 2776 volume thereby changing the amount of water/fluid inside tank 2776. As the volume of water inside tank 2776 changes, the total buoyancy and the center of buoyancy of vehicle 100 can be controlled and positioned. An air gap 2787 is provided where actuator rod 2782 enters flood chamber 2776 to allow vehicle atmosphere to enter or leave the flood chamber as piston 2780 is positioned and repositioned during use and to prevent the buildup of a vacuum. Optionally, an airbladder can be utilized for this purpose as can be appreciated by persons having ordinary skill in the art.

In operation, the vehicle computer 2410 may transmit buoyancy correction commands via CAN bus 106, 107 to module microprocessor 2788. Microprocessor 2788 processes the received commands and issues reposition commands via CAN bus 106, 107 to servo 2784 to reposition piston 2780 and alter the interior volume of flood chamber 2776. As piston 2780 moves forward, water present in chamber 2776 is pushed out of opening 2778. As piston 2780 moves back, more water enters the chamber 2776 through opening 2778 to fill the expanding volume of the chamber 2776. Repositioning piston 2780 in this manner thereby changes the vehicle buoyancy and also can be used to alter the location of the center of buoyancy. Vehicle 100 may comprise multiple modules 2775 as appropriate to the operations and mission of the vehicle 100.

2.4 Telemetry and External Communications Systems

Once vehicle 100 commences autonomous operations, vehicle 100 can communicate with operators or with other vehicles via a communications modem. Such a modem for a vehicle 100 can comprise radio communications, light communications, or acoustic communications; or combinations thereof. Each of these modes of communication and the hardware for receiving and transmitting said communications is well known to those of skill in the art. The particular choice of particular communication means is dependent in part on the intended vehicle use and operating environment.

2.4.1 Optical Communications Module

Figure 22B:
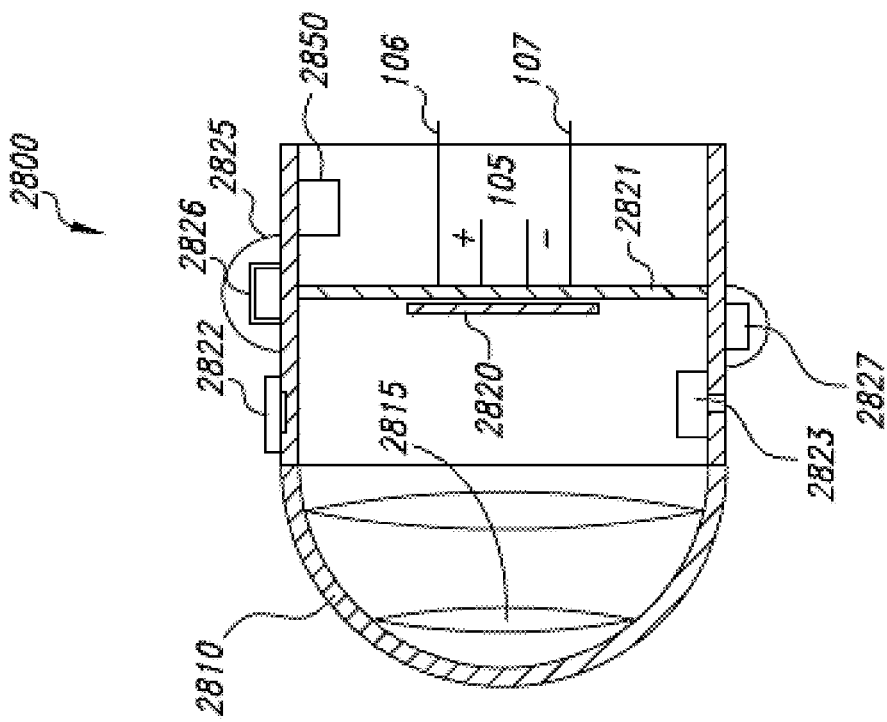
FIGS. 22A and 22B are a perspective view and a cross-sectional view respectively of a light communications module or element, in accordance with certain embodiments of the present disclosure.
Figure 22A:
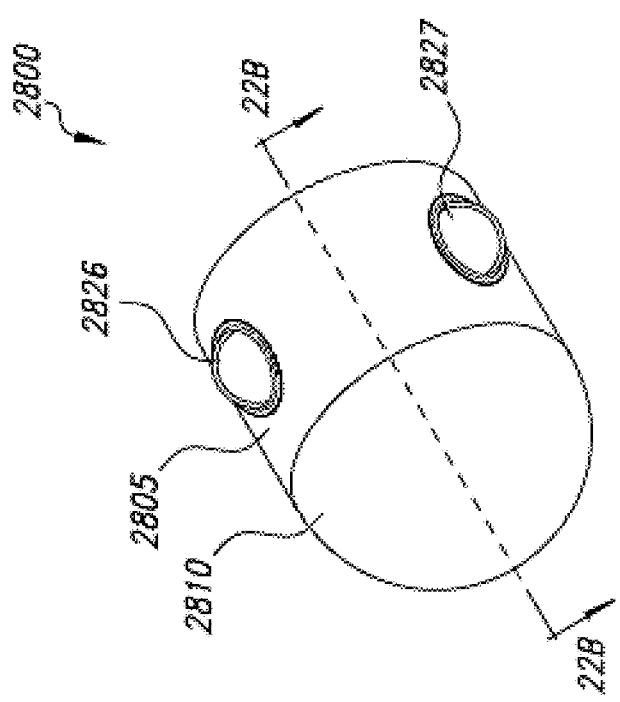

According to an embodiment of the present disclosure, vehicle 100 includes an optical communication module or element as shown in FIGS. 22A-B. FIG. 22A shows a front perspective view of optical communications element or module 2800 having a module body 2805 and a transparent front dome 2810. Although shown in a nose cone configuration in FIGS. 22A-B, optical module 2800 can be included anywhere in the vehicle 100 modular or element configuration such as, for example, as illustrated in FIG. 22A. When constructed as a module, optical communications package 2800 mates with the remainder of vehicle 100 using any of the connectors of FIG. 5A-5F. When constructed as a configurable element, optical communications package 2800 may be either moveable or fixed and mated with vehicle 100 using any of the embodiments of FIGS. 7-10D, 12.

FIG. 22B shows a cross-sectional view of the module 2800 illustrated in FIG. 22A along the 22B axis. On the interior of transparent dome 2810 one or more lenses 2815 focus light onto a position sensitive detector 2820. Transparent dome 2810 may comprise a filter material that transmits light of certain wavelengths while excluding or attenuating other wavelengths. Wavelengths of light may include ultraviolet, infrared, and visible light. When vehicle 100 comprises a UUV, green spectrum wavelengths have been shown to transmit information more robustly in an underwater environment. Lens 2815 can also be designed to or coated to attenuate certain wavelengths while permitting other wavelengths to pass through to the detector 2820.

The position sensitive detector 2820 may comprise a sensor, such as the First Sensor DL 100-7 model which is well known in the art. Detector 2820 is mounted on a printed circuit board 2821 which includes the module microprocessor. Circuit board 2821 additionally includes additional processing and circuitry for processing data received from and for issuing commands to other communications devices such as RF or acoustic modems and communications when such circuits are also included within module 2800. As drawn in FIG. 22B, optical communications module 2800 includes an RF strip antenna 2822 for RF communications; and an acoustic modem 2823 for acoustic communications. As with the optical communications, circuit board and processor 2821 routes communication to central processor 2410 for the vehicle 100 via CAN bus 106, 107.

RF strip antenna 2822 can also be used for wireless communications between modules. Such communications may be desirable, for example, when a configurable element is attached to the exterior of vehicle 100. The external configurable element, can transmit via wireless communication the operational status of the element, the configuration of the element, and the range of motion and other performance parameters of the element. Use of wireless communications avoids the need to provide a wired bus connection between the element and the adjoining module to effect communications with vehicle 100, and wherein such hard wired connections might penetrate the hull of vehicle 100. Even when vehicle 100 comprises a UUV 100, the range over which the wireless radio frequencies is so small such that attenuation should not be a concern. Optionally, rather than a single RF strip antenna 2822 located on communications module 2800, each module, or the command module could include a wireless antenna to perform this function. Data received from any attached configurable element could then be processed by the individual module microcomputer. Optionally wireless configuration data can be shared directly with vehicle computer 2410 via buses 106, 107.

When light hits the position sensitive detector 2820, detector 2820 output is processed by circuit board electronics 2821 which transmits via CAN bus 106, 107 a signal to vehicle command logic 2410. In this manner, transmitted light can be used for communications. For example, a sequence of flashing lights can be transmitted from a source external to vehicle 100 and received by module 2800 as a coded message, for decoding by vehicle 100 command logic 2410.

In an embodiment of the present disclosure, the strength or location of the centroid of the focused beam of light on detector 2820 relative to the center of the detector is measured and communicated via data buses 106, 107 to vehicle control logic 2410. This information can be used by vehicle 100 to manage vehicle track relative to an external illuminated target. If the external light is focused through lens 2815 on the center of the detector, vehicle 100 is tracking to the target. If the maximum energy of the external light is focused to be on other than the center of detector 2820, vehicle 100 is off course. Vehicle logic 2410 can use this tracking information to issue propulsion or control commands to alter course as needed to track to the external illuminated target.

According to an embodiment of the present disclosure, optical module 2800 may additionally include one or more of LEDs 2825, 2826, 2827. LEDs 2825-2827 may be located around the periphery of optical communications module 2800 or positioned such that light emitted therefrom does not interfere with light detected by detector 2820. The LEDs may each be housed and protected within its own separate transparent housing filled with engineering fluid. The engineering fluid, as described previously above, provides for thermal management and transfer of the heat generated by the LED to the exterior medium outside of the transparent housing. Each of LEDs 2825-2827 may additionally comprise an LED of a different wavelength, for example: one blue, one green, one red, and so forth. The LEDs can be flashed in a different sequence of colors to communicate messages to the operator, a remote optical receiving modem, or to other vehicles. Various methods of encoding messages using such techniques are known to those of skill in the art.

2.4.2 Vehicle Swarm Communications

Optical communications modules 2800 may be used to coordinate movements and activities among and between several vehicles. For example, the operator might designate a "lead" vehicle for other vehicles to follow. In such a mode of operation, lead vehicle 100 might emit, for example a red encoded pulsing light from LED 2825 for vehicles on the port side of lead vehicle 100 to follow and a green encoded flashing light from LED 2826 for vehicles on the starboard side to follow. In the configuration of optical module 2800 as shown, these light transmissions need only be seen by the receiving vehicle and that receiving vehicle need not be pointed directly at the light source. Detector 2820 can detect the wavelength of the received light and communicate that information back to vehicle command logic and central processing 2410. The encoded pulses can include a sequence or data string that includes, for example, one or more of: the vehicle ID, and indications of vehicle speed, course or direction changes.

Communication module 2800 may include a traditional Pixy Camera, which is well known in the art, in lieu of or in addition to a position sensitive detector 2820. The Pixy camera can detect and separate out as separate data streams, transmitted light of different wavelengths. Thus, rather than receiving and acting upon communications received from just a single vehicle at a single wavelength, the receiving vehicle 100 can have multiple simultaneous channels of visible communication, each of a different wavelength. These multiple channels can be from multiple adjacent vehicles, or from a single adjacent vehicle transmitting different types of data, each with its own channel of colored light.

Figure 23A:
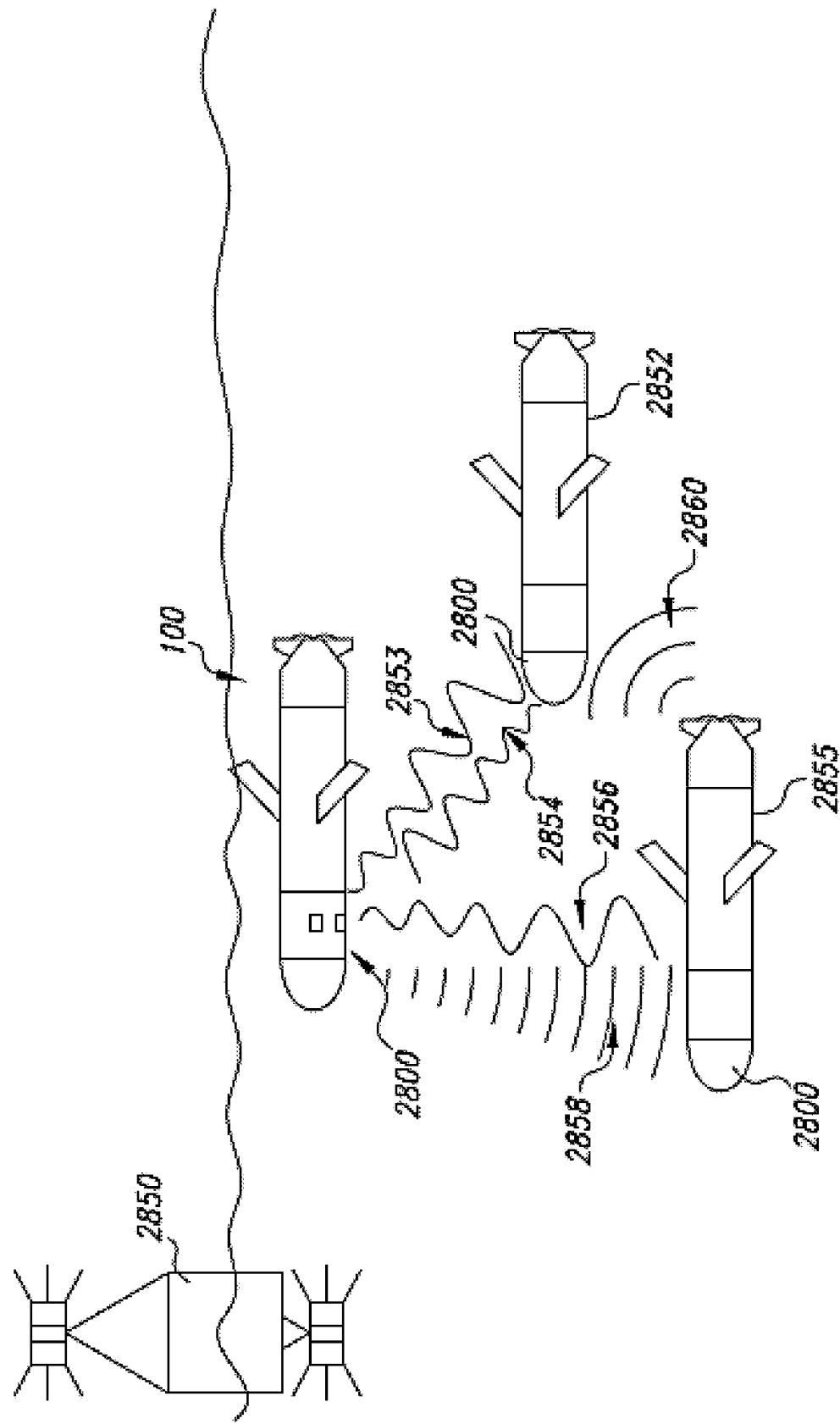
FIGS. 23A-C illustrate examples of a light communications system, in accordance with certain embodiments of the present disclosure.

FIG. 23A illustrates an example of vehicle 100 swarm communications and coordination. In FIG. 23A, a first vehicle 100 including an optical communications module 2800 tracks towards and navigates to a flashing white light buoy 2850. A second vehicle 2852 follows vehicle 100 by receiving transmitted green light pulses 2853 from vehicle 100. Vehicle 2852 also executes mission instructions, such as for example, "stop following," received on a second channel of communication in yellow colored light 2854 transmitted from vehicle 100. A third vehicle 2855 located beneath vehicle 100 also tracks and follows vehicle 100 by receiving red light pulses 2856 from vehicle 100. Vehicle 2855 can also receive instructions from lead vehicle 100 via messages transmitted from vehicle 100 via an LED emitting orange colored light; or optionally via acoustical waves 2858 via acoustic modems included within its communications module 2800. Such instructions might include for example, "stop following and begin execution of mission profile #2." Vehicle 2855, may optionally transmit via LED light signal, acoustic modem, or radio frequency, a confirmation that commands from vehicle 100 have been received. Vehicles 2852 can also relay instructions received from vehicle 100 to vehicle 2855 on a separate communications channel 2860. Vehicles 2852, 2855 can also communicate directly with each other, or with other vehicles using LEDs or other available communications channels 2860.

Underwater optical communications systems are subject to significant variations in channel characteristics, such as water turbidity and salinity. Accordingly, in certain embodiments, the disclosed systems and method may be adapted to adjust or "tune" communications parameters. For example, these parameters may include light wavelength, intensity, and modulation schemes. In some embodiments, the communications parameters may be adjusted to match the characteristics of the communications channel 2860.

In accordance with certain embodiments, a nephelometry system and/or a turbidimetry system may be utilized by the disclosed systems and method. The selection of nephelometry and turbidimetry systems may depend upon the fraction of light scattered. The beam of light scattered by the suspended particles present in a colloid medium may be based on the well-known Tyndall effect. Scattering will typically occur when the dimensions of suspended particles are smaller than the incident wavelength. Light scattering may depend on any of the following characteristics: particle size the suspended particles, wavelength of the beam, the distance of observation, the concentration of particles, and the molecular weight of particles. In certain nephelometric analyses, the measurement of the intensity of the scattered light may be a function of the concentration of the dispensed phase. In some turbidimetric analyses, the measurement of the intensity of transmitted light may be a function of the cone of the suspended particles.

For a determination of low-concentration suspensions in an embodiment, nephelometry may be utilized in order to measure scattered light by the suspended particles at right angles to the incident beam. For a determination of high-concentration suspensions in some embodiments, turbidimetry may be utilized in order to measure the transmitted light by the suspended particles to the incident beam. For both nephelometry and turbidimetry, systems may use spectrophotometer-type devices that may include photomultiplier tubes and calorimeters. For a nephelometer, a detector may be used as a receiver mounted on a turntable and may be positioned at any desired angles from 0° to 180° relative to the exiting beam.

The modular additively manufactured nature of the disclosed vehicles provides for the integration of a nephelometer or a turbidimeter as well as transmitter and detector circuits. Underwater Optical Communications systems may provide a communication link or channel 2860 that connects two or more communicating devices, such as the disclosed vehicles 100. Such links/channels 2860 may be adapted to perform in a static environment, e.g. where the water surrounding the vehicle 100 has a low, medium or high turbidity. A modulation scheme for a communication link/channel 2860 may be selected a priori. For example, a Pulse Position modulation (PPM) or a Quadrature Amplitude Modulation (QAM) may be selected. The performance of the selected modulation scheme, subject to the static limitations of the communication channel/link 2860, may be determined using various types of optical transmitters and receivers. In certain embodiments, the environment surrounding the vehicle 100 may be non-static. In some embodiments, the water surrounding the vehicle 100 may be seawater.

A vehicle 100 may encounter optical communication channels/links 2860 having characteristics that will change as a function of time and/or location. As such, the communication channel 2860 may be periodically adjusted by adjusting the performance parameters of the communications channel/link 2860. For example, bit error rates (BER) may be increased or decreased. In some embodiments, the adjustments may be based on direct measurements determined by utilizing a nephelometry system and/or a turbidimetry system. Based on the results of the direct measurements, a modulation scheme may be selected from a predetermined list of potential modulation schemes that may be included in the control system of a vehicle 100. In certain embodiments, the selection of a modulation schemes may further include the selection of correspondence hardware to optimize the resultant data rates for a given channel characteristic.

Referring back to the embodiment shown in FIG. 22B, an optical communications module 2800 of a vehicle 100 may include LEDs 2825, 2826, 2827 positioned such that light emitted without interfering with light detected by the detector 2820 in order to coordinate movements and activities among and between several swarming vehicles 100, 2852, 2855 as further depicted in FIG. 23A. In accordance with some embodiments, the light-emitting LEDs 2825, 2826, 2827 may be located within a dome 2811 on the top-side of the vehicles 100, 2852, 2855 while the light-receiving detector 2820 may be located within a dome 2810 on the front-side of the vehicle 100, 2852, 2855. As shown in FIG. 23C, the top dome 2811 may be positioned approximately 90° in relation to the front dome 2810. The domes 2810, 2811 may be water-tight, include an IR filter, and protect the electronic components housed with the domes 2810, 2811 from debris and obstacles in the path of the vehicle 100.

Figure 23B:
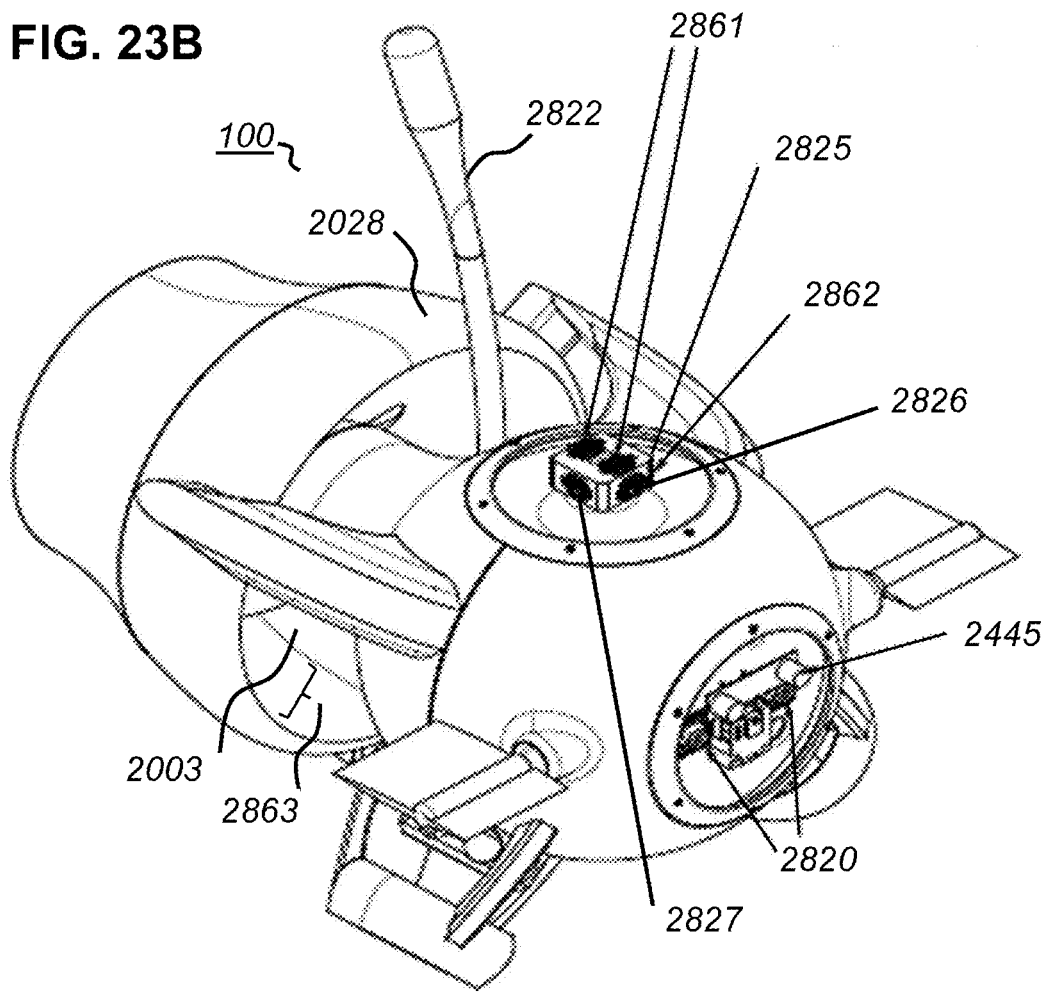
Figure 23C:
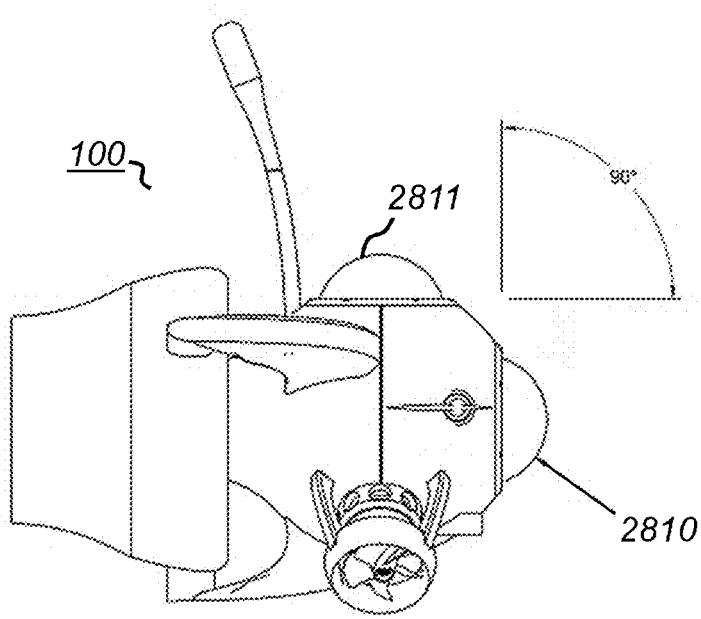

In certain embodiments, as illustrated in FIG. 23B, such vehicles 100 may include dual high-intensity $6500k$ color temp LEDs 2861 as well as a red LED 2825, a green LED 2826 and blue LED 2827 for optical communications. The LEDs 2825, 2826, 2827, 2861 may be mounted on a heat sink and tower assembly 2862. In accordance with certain embodiments, dual RGBW (Red, Green, Blue, White) color sensors/detectors 2820 and a stereo camera 2445 may be located within the transparent front dome 2810 of the optical communications module 2800. Such an optical communications module 2800 may be adapted for the autonomous operation of the vehicle 100. The vehicle 100 may include a RF strip antenna 2822 to increase the range for wireless radio frequencies in order to supplement the optical communications with radio communications.

Figure 24B:
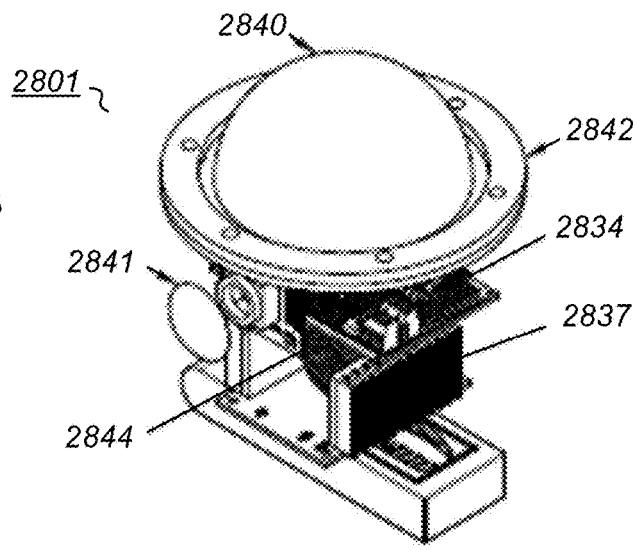
FIGS. 24A-C illustrate examples of components for an optic communications module, in accordance with certain embodiments of the present disclosure.
Figure 24A:
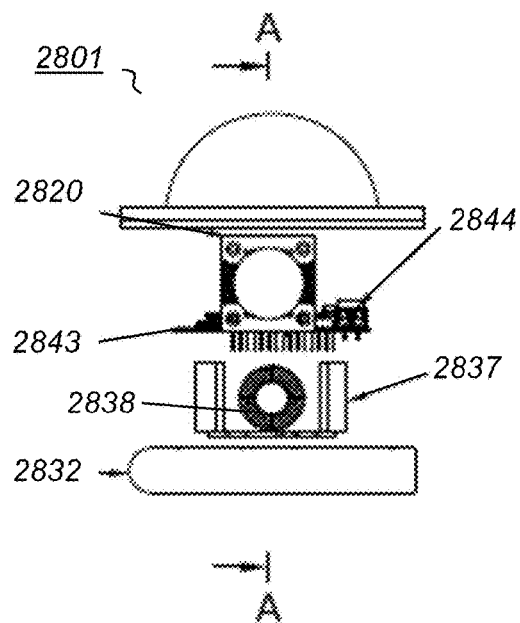
Figure 24C:
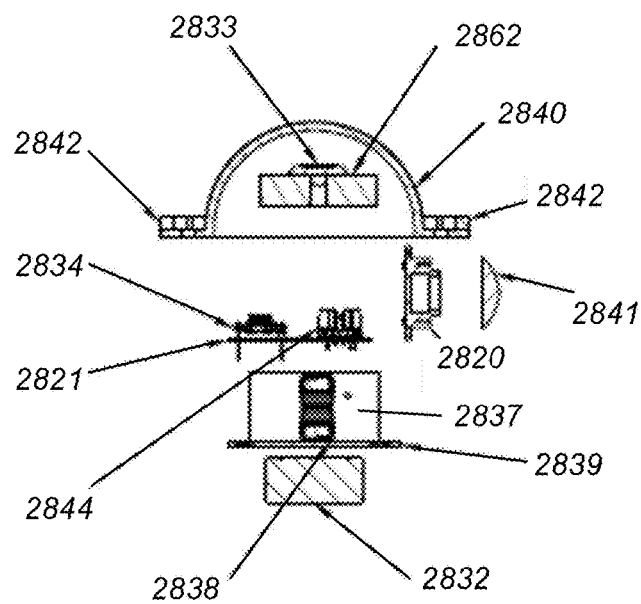

FIGS. 24A-C illustrate an example of components 2801 for an optic communications module 2800 of a vehicle 100. The components may include a RGBW color sensor/detector 2820, a battery pack 2832, a bright white LED 2833, a nano board 2834, a printed circuit board (PCB) 2821, a LED heat sink 2862, a step-up DC-DC converter 2837, a step-up coil 2838, a step-up heat sink 2839, a LED outer dome 2840, detector optics 2841, a dome sealing ring 2842, a step-down DC-DC converter 2843, and a MOSFET driver 2844.

In some embodiments, the battery pack 2832 may be electrically connected to a step-up DC-DC converter 2837 and a step-up heat sink 2839 in order to regulate the voltage and temperature. A step-up coil 2838 may be used to increase the electricity voltage, in accordance with certain embodiments. The voltage may be increased to enable the power supply to be adaptable with the components 2801. The step-up DC-DC converter 2837 and the step-up coil 2838 may be attached to the step-up heat sink 2839 in order to transfer or dissipate the heat generated by the electrical conversion and regulate the temperature of the optic communications module 2800. The module 2800 may further include a printed circuit board 2821 having a step-down DC-DC converter 2843 connected to a nano board 2834 and a MOSFET driver 2844. The nano board 2834 may be an Arduino nano 2834. The MOSFET driver 2844 may be a power amplifier that accepts a low-power input from a controller IC and produces a high-current drive input for the gate of a high-power transistor such as an Insulated-Gate Bipolar Transistor (IGBT). The MOSFET driver 2844 may be a switching device and a power converter that controls the voltage/current flow between the components 2801. The printed circuit board 2821 may be connected to a RGBW color sensor/detector 2820 having detector optics 2841 that detect the amount of light received. The optic communications module 2800 may include a LED outer dome 2840 having a dome sealing ring 2842 that may house a LED heat sink 2862 mounted with a bright white LED 2833. FIG. 24B shows a prospective view of an example of an optic communications module 2800. FIG. 24A is an exploded front-view of the optic communications module 2800, and FIG. 24C illustrates a cross-sectional side view of the optic communications module 2800 along the axis labeled "A" in FIG. 24B.

In accordance with the operation of certain embodiments, the light emitted from the bright white LED 2833 may be transmitted through the LED outer dome 2840 at a broad peripheral range. The range may be 60° from the vertical axis perpendicular from the surface of the bright white LED 2833. The bright white LED 2833 may comprise a high-power LED having 5000-7000 color temperature transmitter. The LED outer dome 2840 may be waterproof, and may protect one or more components 2801. In embodiment, the LED outer dome 2840 may engage a housing having attachment locations adapted for to secure rope. The housing may be waterproof. Reflected light received by the detector optics 2841 and the RGBW color sensor/detector 2820 may be proportional to the turbidity of the water surrounding the vehicle 100. In certain embodiments of an optic communications module 2800 comprising a nephelometry system, the vehicle may have multiple sets of the detector optics 2841 and the RGBW color sensor/detectors 2820 located on the front, left and right side of the vehicle 100. The detector optics/lens 2841 may include an infrared (IR) filter, or may be treated to filter IR light. The disclosed nephelometry system may measure the intensity of the scattered light in the surrounding seawater.

In certain embodiments, the optic communications modules 2800 may further comprise a turbidimetry system that measures the intensity of light transmitted through the surrounding seawater. In some embodiments, two vehicles 100 swarming within a predetermined range may coordinate the transmitting and receiving of light signals from one to another. Accordingly, one vehicle 100 may transmit a known light signal and the other vehicle 100 may measure the received signal to determine the turbidity of the water between the two vehicles 100. Similarly, the two vehicles 100 may include nephelometry systems that coordinate to measure the intensity of the scattered light in the surrounding seawater. In one embodiment of a turbidimetry system, an exterior surface 1703, 2003 of a vehicle 100 may be shaped to include a recess with one portion of the exterior surface 1703, 2003 facing another portion of the exterior surface 1703, 2003. One of the facing surfaces may include a light transmitter such as a LED 2833, while the other facing surfaces may include a light sensor/detectors 2820. The facing components 2801 may measure the turbidity of the water surrounding the vehicle 100 that is permitted to enter the recess. In an embodiment, the recess may be located between two connectors/members 2046, 2048 attached to the exterior surface 1703, 2003 of the vehicle 100, or between a control surface 230 and a connector/member 2046, 2048 of a shroud 246, 248. As shown in FIG. 23B, a recess 2863 may be located between the exterior surface 1703, 2003 of the vehicle 100 and detachable components, elements, attachments, and modules 2028 attached to the exterior surface 1703, 2003 of the vehicle 100.

3.0 Example of Use

Figure 25:
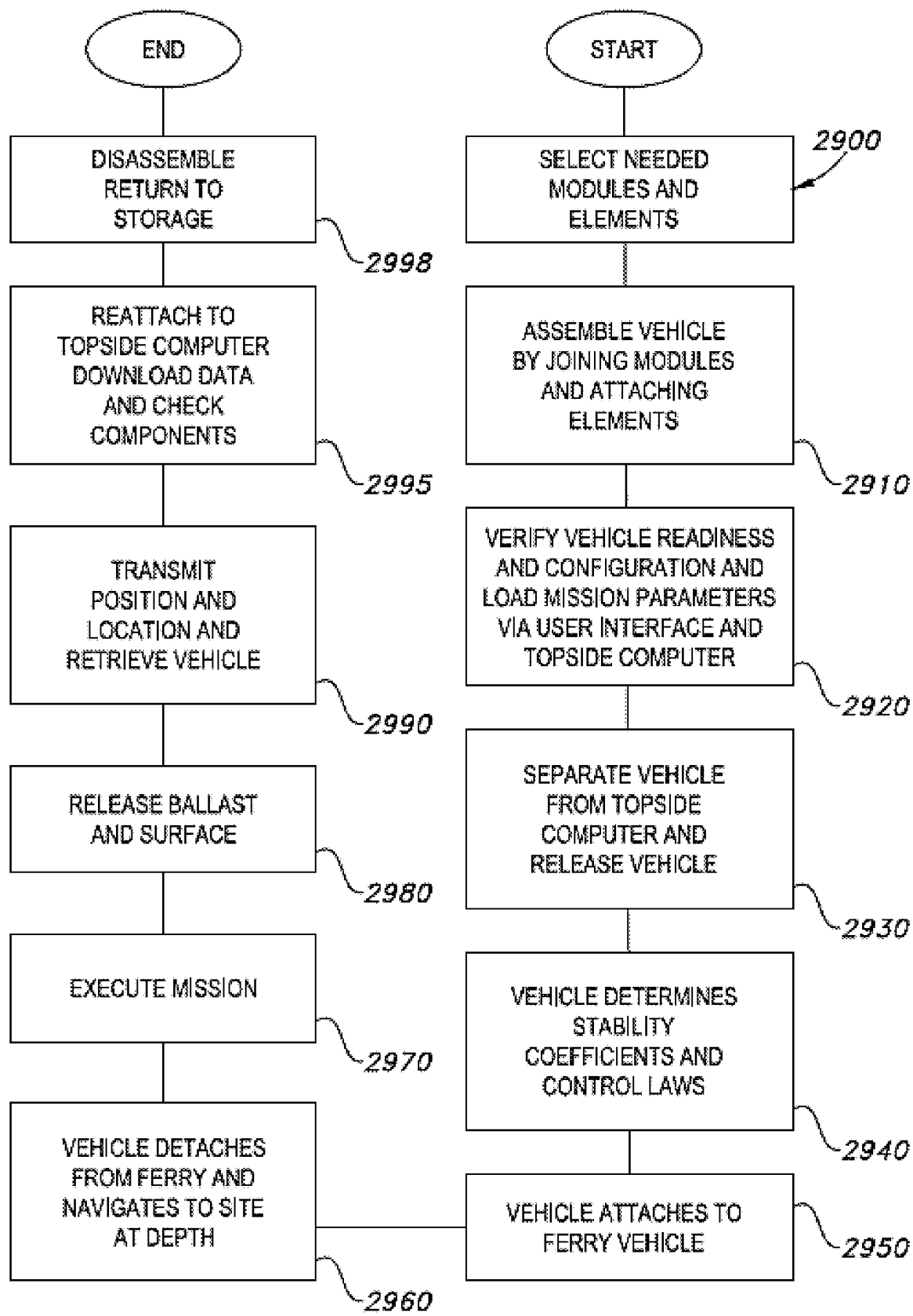
FIG. 25 is a flowchart illustrating an exemplary use of the present disclosure, in accordance with certain embodiments of the present disclosure.
Figure 26A:
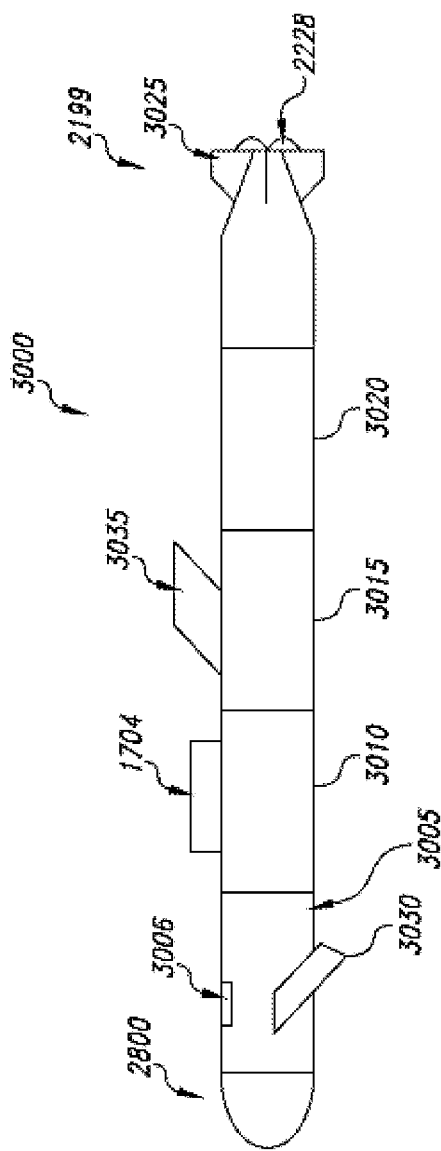
FIG. 26A is a side view of an initial assembly of an example vehicle, in accordance with certain embodiments of the present disclosure.
Figure 26B:
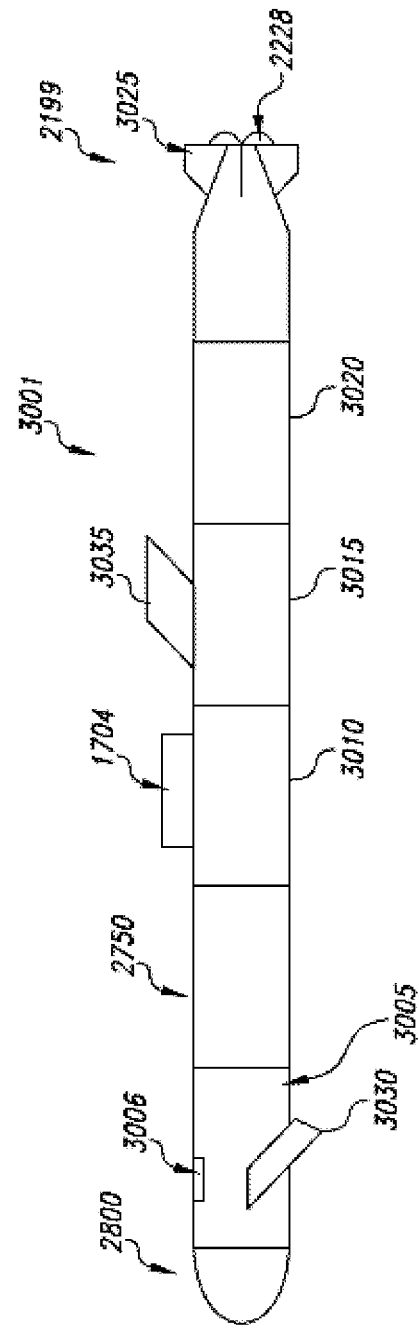
FIG. 26B is a side view of a final configuration of an example vehicle, in accordance with certain embodiments of the present disclosure.

FIG. 25 is a flow chart illustrating possible use and operation of a field configurable vehicle, according to an embodiment of the present disclosure. FIGS. 26A-B show the initial vehicle configuration 3000 and final vehicle configuration 3001 resulting from the process described below and in the flow chart of FIG. 25. In the fictitious example illustrated herein, the assembled vehicle comprises a UUV used on a scientific mission to sample gasses present in the ocean water near an off shore volcano.

In step 2900 of FIG. 25, an operator identifies the mission objective, mission profile, and mission parameters for the UUV including needed sensors or other peripheral devices, for example grappling hooks or other attachable tools, desired to complete the mission. In this example, the operator decides that a gas sampling instrument and infra-red sensor are needed to complete the test plan. The operator determines that a specialized pre-assembled module 3005 including these types of sensors exists and selects that module as one of the modules to be included in the final vehicle assembly.

The operator also identifies the distance to and method of transit to the mission station; the navigation equipment requirements of the vehicle 100: and whether the vehicle needs to maintain precise station keeping on arrival. In this example, the finally assembled vehicle will be deployed from a boat and then transit to a location near the volcano by attaching itself to the side of remote controlled undersea vehicle (ROV) using a magnetic attachment device. The vehicle operator notes that module 3005 already includes a suitable attachment mechanism 3006 constructed according to the embodiment of FIG. 8.

After hitching a ride to the vicinity of the underwater volcano, the finally assembled UUV will detach itself and navigate and transit to the test location via its own propulsion. The operator selects an appropriate propulsion module based on the time in transit and the desired speed of transit as well as what type of search pattern or station keeping the vehicle must maintain while collecting the data samples. In this example, the vehicle will transit and then execute a search grid while conducting the test. The operator thus selects a propulsion module 2199 with a fixed pitch propeller 2228 for this mission.

Once the sample collection is completed, the UUV will rise to the surface for recovery. The operator thus selects a ballast module 3010 with releasable ballast 1704 for this mission. The operator also selects a command module 3015 and a battery module 3020 having sufficient power to operate the UUV throughout the entire mission profile. The operator also selects moveable control elements such as stabilizers 3025, and bow planes 3030; as well as fixed control surfaces such as a sail plane 3035.

After selecting the needed configurable elements and the desired modules, in step 2910 of FIG. 25, the operator assembles the modules together using the joining mechanisms previously described in connection with the embodiments of FIGS. 5A-5C. The operator can begin the assembly process with any module, but in this example, the operator begins the assembly process with the battery module 3020 as the first module. In this manner, the electrical connections of any subsequently joined modules can be checked by noting if LED 511 illuminates on each module. LED 511 of any joined module can optionally also flash a code to indicate to the operator that the module has performed an internal self-check of its systems and is fully operational.

The operator next attaches command module 3015, on one end, and the propulsion module 2199 on the other end of battery module 3020. In some embodiments of the present disclosure, such as the one drawn in FIGS. 26A-B, the command module also includes all the navigation systems for the vehicle. Optionally, a separate navigation module, containing navigation systems such as, for example but not limited to: six axis inertial navigation units (INU), GPS, other navigation systems can be installed.

In the configuration of FIG. 26A, the ballast module 3010 is attached to the opposite end of command module 3015, followed by the sensor module 3005 including the gas and infra-sensors, and attaches module 3005 in series with the ballast module 3010. Sensor module 3005 additionally includes attachment device 3006: one of the mechanisms of FIGS. 8-12 useful for attaching to the ROV that will ferry the finally assembled vehicle to the point of operation.

The operator then attaches the moveable and fixed control surfaces/elements to the exterior of the assembled vehicle. In this example, the operator also choses to attach a nose cone to the front of the vehicle. In this example the nose cone includes optical communications package 2800. The initial vehicle assembly is shown in FIG. 26A.

With the initial vehicle components assembled, in step 2920, the operator then uses top side controller 2470 to couple the initially assembled vehicle 3000 to topside computer 2530 and user interface 2600. The operator uses interface 2600 to verify the operational status of the vehicle system and the component, and to load mission navigation, operating and performance parameters into the computer 2410 of the vehicle 100 located in the command module 3015 of the vehicle 100. During this topside check of vehicle mission parameters and configuration, topside computer 2530 calculates that the center of mass location may be outside of allowable parameters once the ballast module releases its ballast. Topside computer 2530 displays this information to the operator via user interface 2600. The initial configuration of vehicle 3000 is therefore not acceptable and the vehicle must be reconfigured.

The operator then choses to separate the vehicle at the initial location joining the sensor 3005 and ballast 3010 modules; and inserts a module 2750 with moveable internal weights as shown, for example, in FIG. 20. Once ballast 1704 is released from ballast module 3010, command module 3015 will execute instructions and reposition the internal weights 2758 of module 2725 to maintain the center of gravity of the finally assembled vehicle 3001 within allowable limits. The completely assembled vehicle 3001 is shown in FIG. 26B.

The operator once again checks the modules, elements, and overall configuration of vehicle 3001 and confirms that elements and modules are working, mission navigation and operational parameters are correctly loaded, and that vehicle 3001 can operate within allowable limits. Once vehicle 3001 systems have been checked and mission parameters loaded, vehicle 3001 is decoupled from topside computer 2530 in step 2930 and released into the water. Vehicle 3001 computes its initial control laws and stability coefficients from data received from the modules and attached elements, or as entered by the operator. Once in the water, in step 2940, vehicle 3001 then executes a series of maneouvres and collects data that measures changes in position, pitch, yaw and roll based on control surface movements and compares that empirical data to the computed and predicted result. Vehicle 3001 can then use filtering or averaging to further refine the calculated and empirically determined stability and control coefficients.

Once systems checks and control parameters are complete, vehicle 3001 embarks on its mission. In step 2950, vehicle 3001 tracks towards a flashing light emitted by the remotely piloted vehicle that will ferry vehicle 3001 to the test site local. Once proximate the ROV, vehicle 3001 magnetically attaches itself to the ROV, and the ROV with vehicle 3001 attached, transits to the test area. When the vehicle navigation system detects that vehicle 3001 has reached the release point, computer 2410 sends a signal to the magnetic attachment mechanism which releases vehicle 3001 from the ROV shuttle vehicle. Vehicle 3001 then achieves neutral buoyancy according to the amount of ballast loaded and the surrounding water density; and in step 2960 the vehicle command module 3015 navigates vehicle 3001 to the precise test station and executes the test collection mission in step 2970. Vehicle 3001 can optionally transmit telemetry via an acoustic modem or other communications means included within the communications packages of nose cone 2800 throughout the mission.

After completing the mission, vehicle 3001 navigates to its mission defined pick up location using GPS or internal navigation, or other included navigation capabilities; and commands the release of ballast 1704 and rises to the surface, in step 2980, according to its preprogrammed mission profile. Once on the surface, vehicle 3001 transmits a series of colored light pulses indicating operational status information, such as for example: that it has completed its mission, and/or that the vehicle is in good condition. Vehicle 3001 also transmits via RF data indicating that it can be retrieved, and its location as determined by vehicle 3001 onboard navigation. The vehicle operator can transmit a reply from the research ship acknowledging the message and can optically, acoustically, or via RF communications transmit to vehicle 3001 other commands. Such commands might include instructions for vehicle 3001 to continue outputting a single flashing white light so that it can be visually located, but to cease other transmissions. The research vessel proceeds to the location and retrieves vehicle 3001.

In step 2995, vehicle 3001 is reconnected to topside computer 2530 and user interface 2600. Prior to execution of step 2995, the operator can also check any optional vehicle anti-tamper devices or security systems to ensure that no unauthorized access to vehicle 3001 has occurred; and that could also damage or inject malicious code into topside computer 2530. Once coupled to topside computer 2530, the operator downloads the collected data if not previously transmitted from vehicle 3001; and verifies vehicle 3001 component health and operational status. In step 2998, the operator can disassemble vehicle 3001 and store its configurable elements and component modules for later use to configure a new vehicle at a later time.

In accordance with certain embodiments disclosed above, additively manufactured modular connections for additively manufactured underwater vehicles may be configured or altered without departing from the scope and spirit of the present disclosure. Underwater vehicles have historically been made purpose-built, such that vehicles were designed and developed with a specific mission in mind. By altering this paradigm and utilizing capabilities associated with additive manufacturing (AM), the ability to develop modular underwater unmanned vehicles (UUVs) becomes far more practical. Through the use of the various connection concepts presently disclosed, an UUV can be tailored in situ to meet ad-hoc mission requirements. For example, a vehicle with propulsion systems may include motors and servos that may be changed and/or easily replaced, in accordance with certain embodiments disclosed above. Entire major assemblies associated with the hull of a vehicle can be changed or easily replace if damaged. Entire modular payload and sensor packages can be changed, such as optical communications packages, sensor packages as well as payloads. With suitably designed components, replacement parts can also be printed in-situ. Such benefits can be further appreciated via operations, in the field, where replacements parts are not readily available.

As detailed above, several key areas relating to AM modular UUVs have been identified for modular functionality. These include: 1) magnetically coupled propeller and actuator interfaces, including motors and servos; 2) internal motor and servo installation mechanisms, such as motor collars and servo clips; 3) external hull mounting concepts that may include shroud arms, a main shroud and thruster shrouds; and, 4) payload and mission sensor/communications packages, such as top and front domes. Such AM modular components enable flexible vehicle configuration as well as freedom for the end user of the disclosed systems to easily modify and repair modular vehicles and their components in the field.

A detailed description of many of the modular configuration functionalities of the present disclosure was provided above. The benefits of the AM approach to the manufacture of UUVs include the ability to include functionalities and necessary mechanisms directly into the vehicles and their associated mating parts that are adapted to attach without tools. This eliminates the need to install or carry various parts such as screws, brackets, special tools and other related fasteners to attach modules to a vehicle. The shape of the hull, and the location of the access ports where modules and domes may be attached, may be specifically designed to allow for ease of access. A vehicle may be shaped to sit horizontally and/or vertically without special jigs or tooling fixtures. Accordingly, modules may be attached and detached with ease while the vehicle remains stationary. The benefits of such ease of maintainability, repair and reconfiguration in an operating environment may be appreciated in certain embodiments.

As discussed above, goals based on mission profiles and hull forms provide specific examples for the applied configurations of certain UUVs that are presently disclosed. In some embodiments, the port and starboard planes, thruster propellers and the main aft propeller may be magnetically coupled so that such components may be removed, repaired and replaced as needed due to damage, wear and tear, and obsolescence. Cameras located under the front dome, and signaling devices under the top dome, may represent modular payload and sensor packages that may be readily reconfigured or changed depending on mission requirements.

Modular components of the vehicle hull assembly, as well as their connection points protruding from the hull, may be predetermined and designed prior to their additive manufacturing. For example, the interior of a hull may be adapted to receive a socket for a starboard thrust motor collar or adapter. Additionally, removable and reconfigurable components of the aft fairing, the aft fairing support arms, and the vehicle may be predetermined and generated in real time to address mission requirements. Another example is the ability to print the aft shroud arms separately. In the case of vehicles with the thruster shrouds, aft shroud arms may be attached along with the aft shroud directly to the vehicle in order to facilitate performance modifications and repair. An attachment mechanism may utilize a clip concept, allowing for tool-free installation and removal. The shroud connection may be a "push on" clip mechanism that may be printed directly into the shroud in order to facilitate modification.

Referring back to FIGS. 1A-D, a vehicle 100 may have various control surfaces or elements 120, 122 such as a sail planes, stabilizers, dorsal fins, flippers, rudders, elevators and canards. Such control surfaces/elements 120, 122 may be moveable in order to orient or steer the vehicle 100 in pitch, roll and yaw, and may also be attached or detached to reconfigure the vehicle 100 as desired. Due to the ability to alter the design and physical characteristics of the presently disclosed systems and components that are additively manufactured in a predetermined manner prior to their on-demand fabrication, any number or different types of control surfaces/elements 120, 122 may be detachably mounted directly to the exterior surface 2003 of an additively manufactured vehicle 100 or to other additively manufactured detachable components, elements, attachments, and modules 246, 248 of the vehicle 100.

Figure 27A:
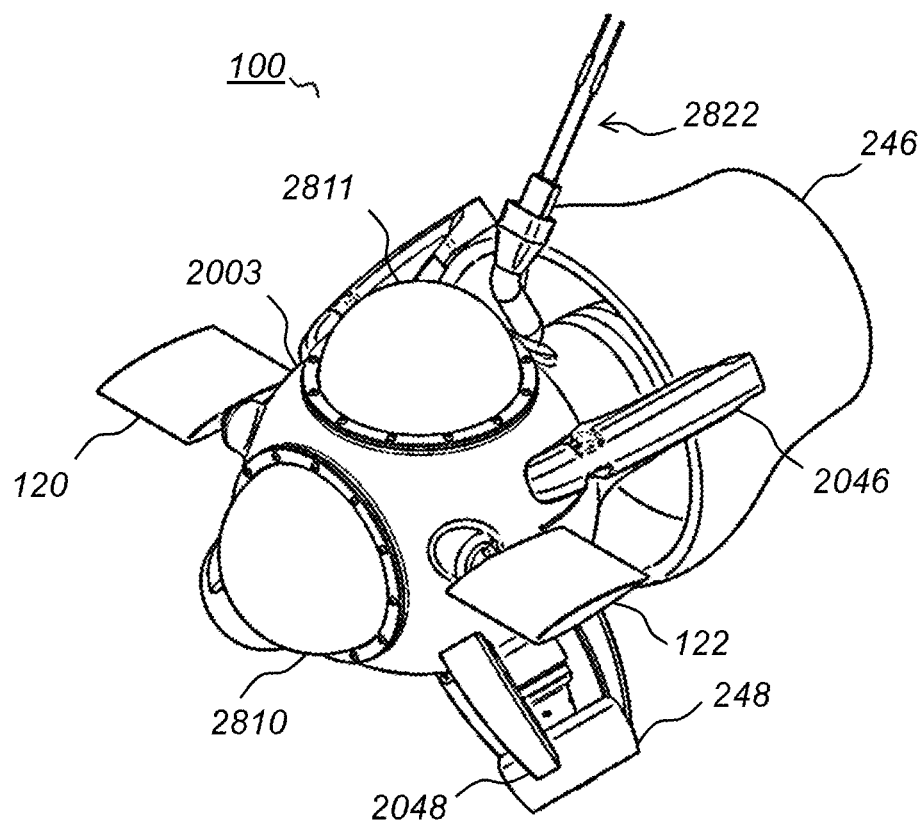
FIGS. 27A-B illustrate examples of additively manufactured attachments and components for a modular connection with an exemplary vehicle, in accordance with certain embodiments of the present disclosure.
Figure 27B:
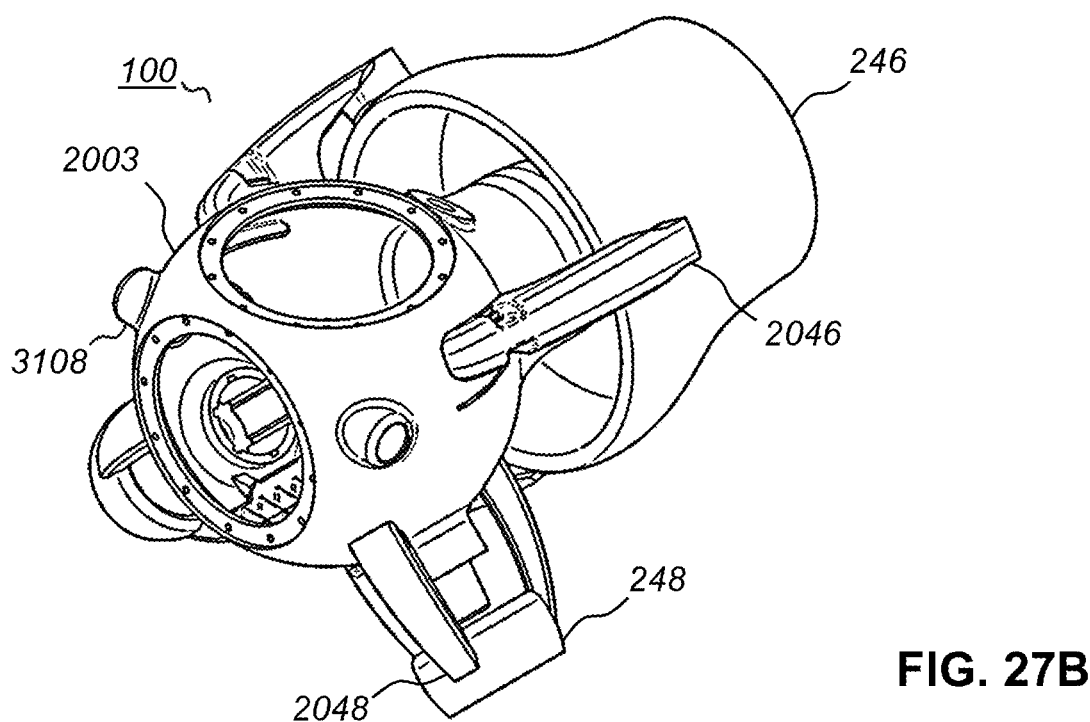
Figure 28A:
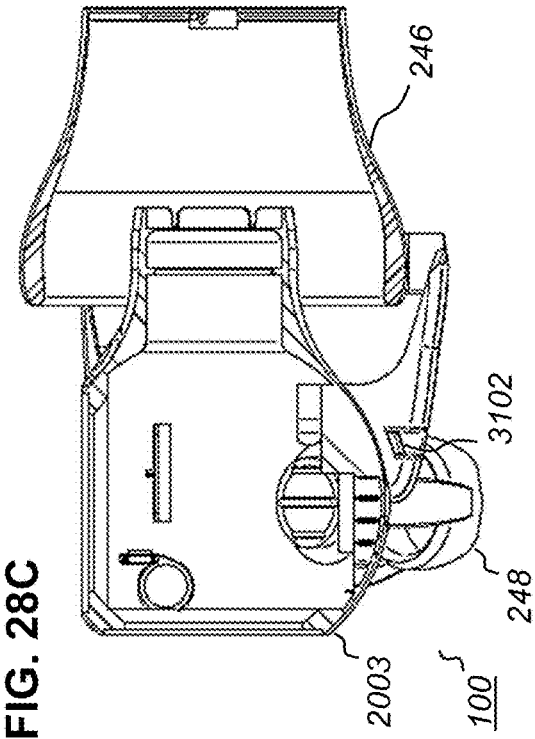
FIGS. 28A-D illustrate examples of attachment mechanisms that include alignment teeth 3101 and clips 3102 for a modular connection of an additively manufactured attachments/components with an additively manufactured vehicle, in accordance with certain embodiments of the present disclosure.
Figure 28B:
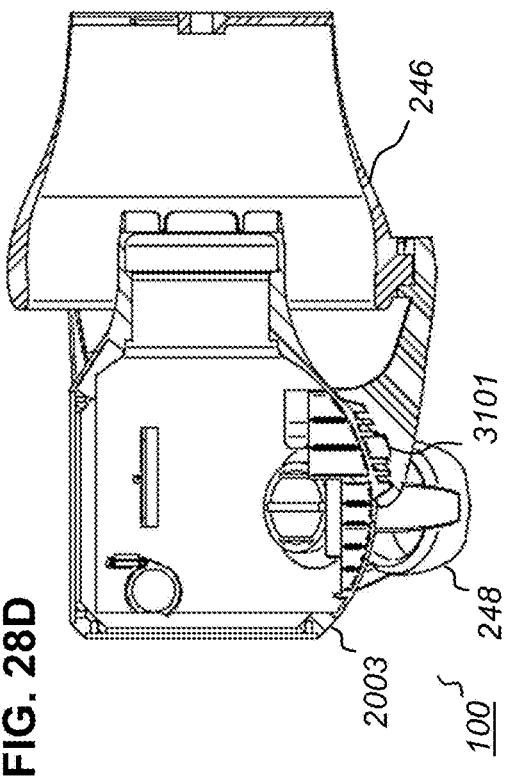
Figure 28C:
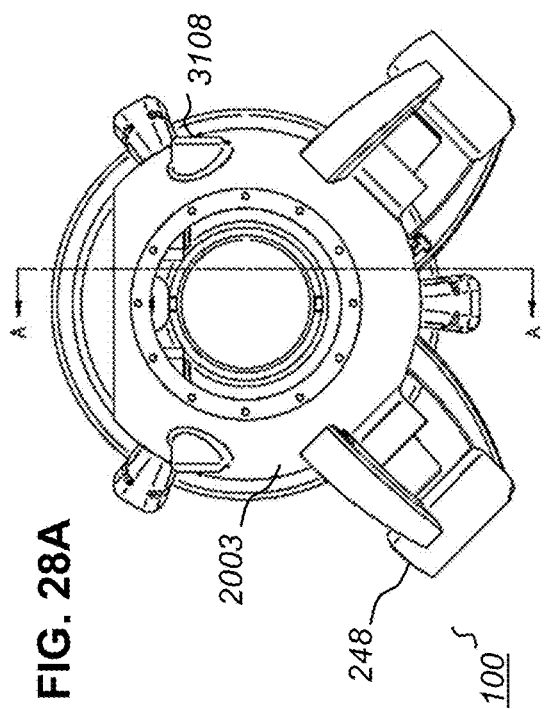
Figure 28D:
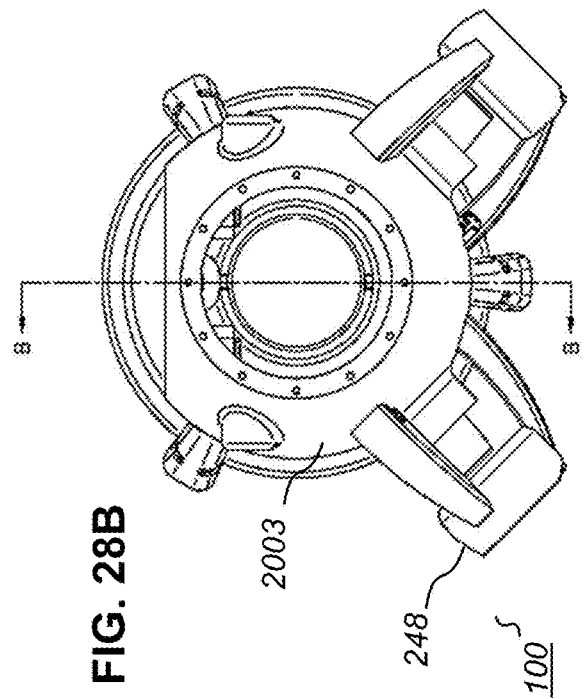

As shown in FIGS. 27A-B, control surfaces/elements 120, 122 and shrouds 246, 248 may be detachably mounted to the exterior surface 2003 of a vehicle 100. As discussed above and shown in FIGS. 10A-K, a vehicle 100 may include various attachment mechanisms for detachably securing connectors/members 2046, 2048 of the shrouds 246, 248 to the exterior surface 2003 of the vehicle 100. Waterproof domes 2810, 2011 for protecting components 2801 of an optic communications module 2800, as well as an antenna 2822 for RF communications, may also be attached to the vehicle 100. FIG. 27B shows the vehicle 100 illustrated in FIG. 27A without the antenna 2822, control surfaces/elements 120, 122 and domes 2810, 2011 attached within apertures that may be located within bulges or protrusions 3108 on the exterior surface 2003 of the vehicle 100. FIGS. 28A-B illustrate front views of the vehicle 100, and FIGS. 28C-D show cross-sectional views along the "A" and "B" axes shown in FIGS. 24A and 24B respectively. As illustrated in FIGS. 28C-D, the additively manufactured exterior surface 2003 of a vehicle 100 may include attachment mechanisms adapted to engage detachable components, elements, attachments, and modules 246, 248. These attachment mechanisms may include alignment teeth 3101 and clips 3102 that may be additively manufactured on the exterior surface 2003 of the vehicle 100.

Figure 29B:
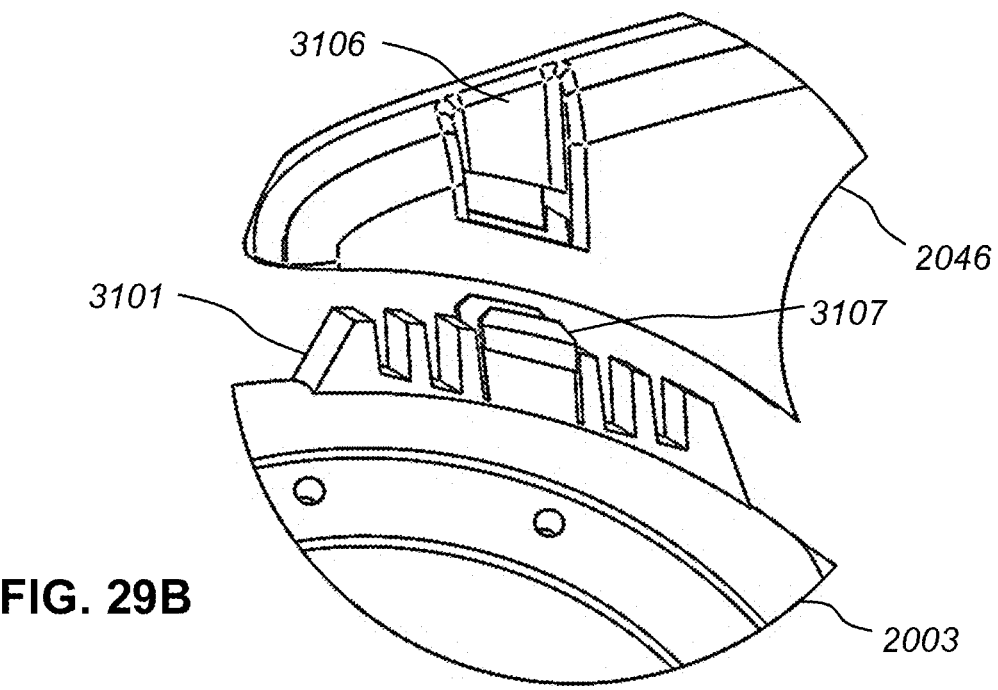
FIGS. 29A-B illustrate examples of additively manufactured connectors adapted to receive alignment teeth 3101 with clips 3102 for connecting a shroud to a vehicle, in accordance with certain embodiments of the present disclosure.
Figure 29A:
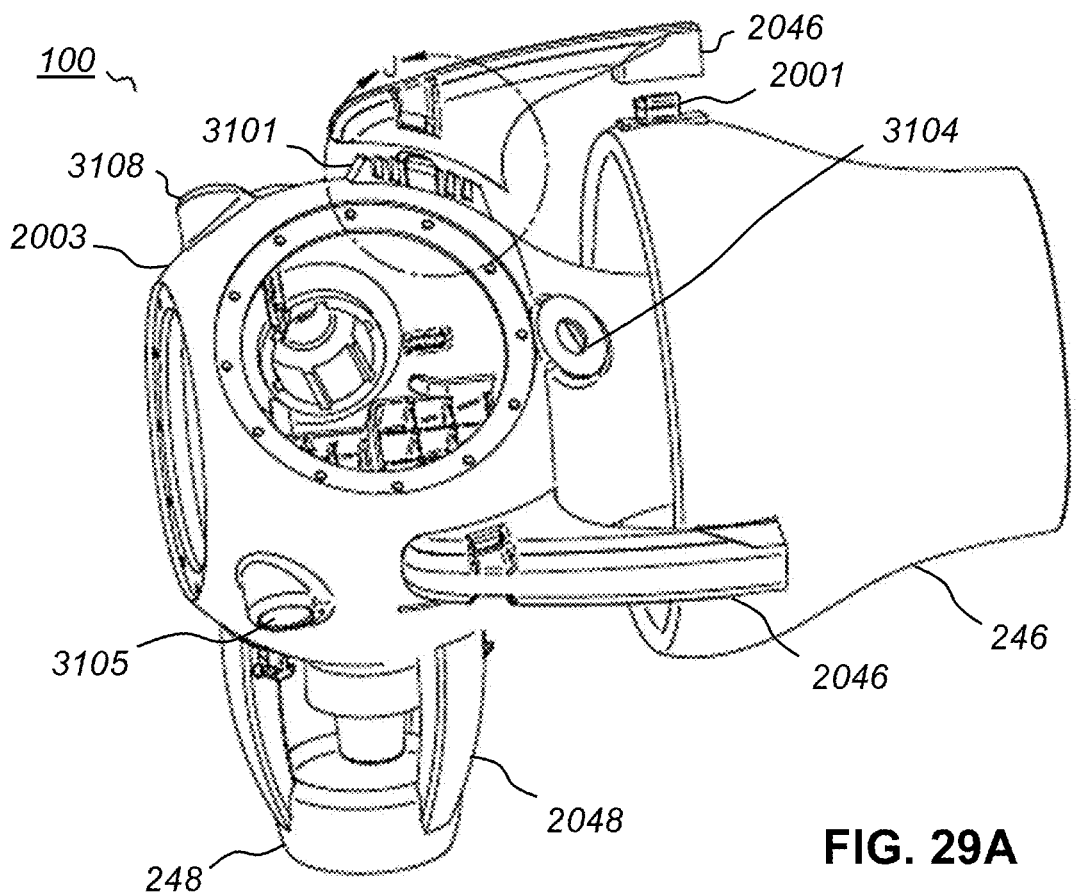

As shown in FIG. 29A, the alignment teeth 3101 may be adapted to detachably engage connectors/members 2046, 2048 of the shrouds 246, 248. The exterior surface 2003 of a vehicle 100 may include male-type connectors 2001 adapted to be inserted within the female-type connector 2002 of the connectors/members 2046, 2048 of the shrouds 246, 248 in accordance with certain embodiments as shown in FIGS. 10B-H. The male-type connectors 2001 may comprise the alignment teeth 3101 shown in FIG. 29A. The shrouds 246, 248 may also include male-type connectors 2001 adapted to be inserted within a female-type connector 2002 for the connectors/members 2046, 2048 located at or near the end opposite from the end of the connectors/members 2046, 2048 that detachably connects to the exterior surface 2003 of a vehicle 100. In certain embodiments, the exterior surface 2003 of a vehicle 100 may also include apertures 3104, 3105 adapted to receive the antenna 2822 and control surfaces/elements 120, 122. As may be appreciated from the contours of the exterior surface 2003 that are raised and bulged around the apertures 3104, 3105 in the embodiments shown in FIGS. 27-30, the vehicle 100 may be shaped with such bulges 3108 to enable the vehicle 100 to sit horizontally and/or vertically without special jigs or tooling fixtures to ease the attachment and detachment of components, elements, attachments, and modules 246, 248 while the vehicle 100 is reconfigured.

FIG. 29B illustrates a detailed view of the circular section referenced as "J" in FIG. 29A, including the alignment teeth 3101. In some embodiments, the alignment teeth 3101 may include one or more teeth having the same or varying shapes and sizes, which may be adopted to mate with the an opening 2047 within the female-type connector 2002 for the connectors/members 2046. These interlocking features provide stability when the connectors/members 2046 are attached to the exterior surface 2003 of a vehicle 100. The connectors/members 2046 may have an aperture 3106 adopted to provide access to one or more of the plurality of alignment teeth 3101 that are inserted within the female-type connector 2002. The alignment teeth 3101 may one or more teeth that include a flexible clip 3107 adapted to secure the connectors/members 2046 to the exterior surface 2003 of a vehicle 100. In certain embodiments, the flexible clip 3107 may be bent inward while the clip 3107 is being inserted into a female-type connector 2002 until is snaps back into its stationary position when fully inserted within a cavity of the female-type connector 2002. The female-type connector 2002 of the connectors/members 2046 may be adapted to slide over the male-type connectors 2001 in a straight, linear manner. The clip 3107 may be accessed via the aperture 3106, and pushed to unlock the clip 3107 from its stationary locked position in order to permit the connectors/members 2046 to be detached from the exterior surface 2003 of a vehicle 100. In accordance with certain embodiments, the connectors/members 2046 may be attached to the exterior surface 2003 of a vehicle 100 without the use of magnets.

Figure 30A:
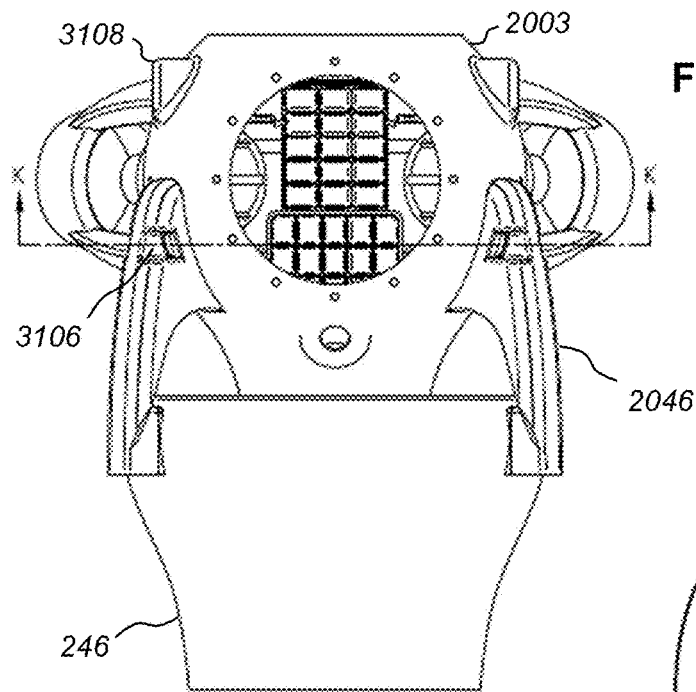
FIGS. 30A-C illustrate examples of a flexible clip accessibly positioned within an aperture in an additively manufactured connector adapted for detaching a shroud from a vehicle, in accordance with certain embodiments of the present disclosure.
Figure 30C:
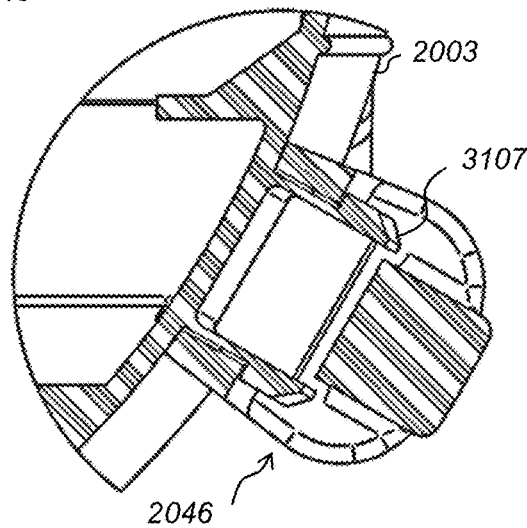
Figure 30B:
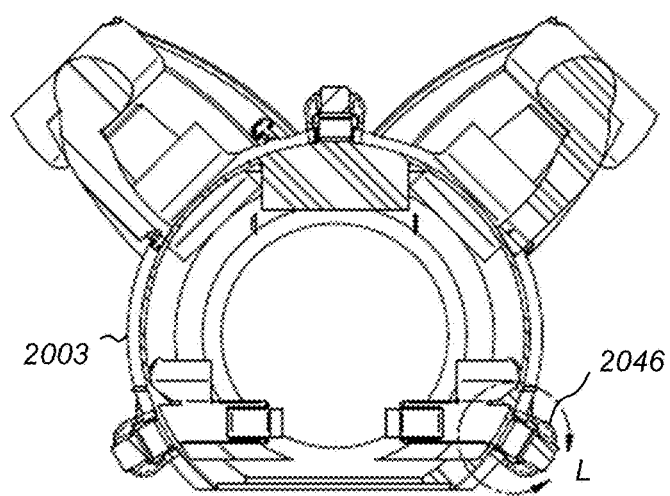
Figure 32A:
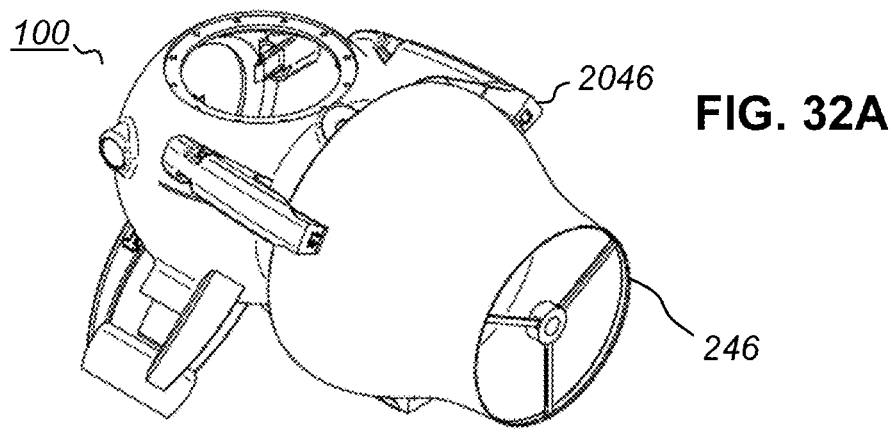
FIGS. 32A-C illustrate examples for the detachment of an additively manufactured connector from a shroud and a vehicle, in accordance with certain embodiments of the present disclosure.
Figure 32B:
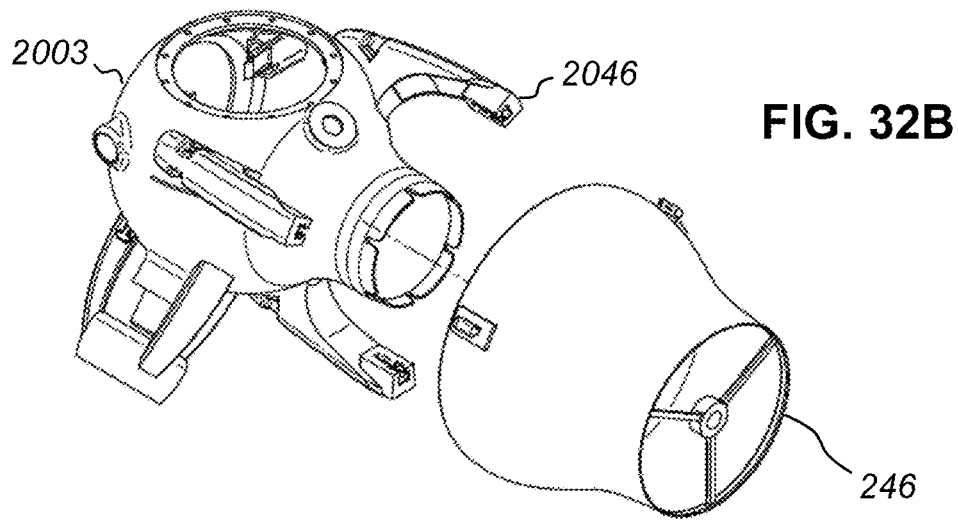
Figure 32C:
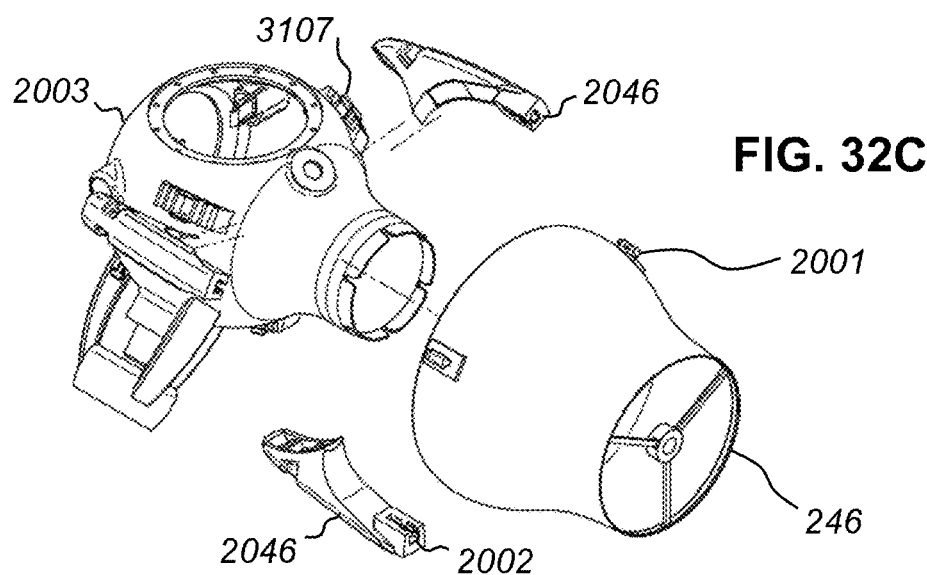

As shown from the top-view of the vehicle 100 in FIG. 30A, the flexible clip 3107 positioned within the aperture 3106 of the connectors/members 2046 may be accessed in order to detach shrouds 246 from the vehicle 100. FIG. 30B represents the cross-sectional view along the axis labeled by the K-K line shown in FIG. 30A, and FIG. 30C is a detailed view of the circular section referenced as "L" in FIG. 30B that shows the clip 3107 inserted within the connectors/members 2046. FIGS. 31A and 31B illustrate a port or side view and an aft or rear-side view of the vehicle 100 attached to a shroud 246 via connectors/members 2046, respectively. FIG. 31C illustrates a detailed view of the circular section referenced as "C" in FIG. 31B. In some embodiments, the male-type connectors 2001 of the shroud 246 may be adapted to be inserted within the corresponding female-type connectors 2002 of the connectors/members 2046. The male-type connectors 2002 may be t-block shaped in order to slide within the track-shaped female-type connectors 2001 in a straight, linear manner for attachment and detachment purposes. The complimentary shapes of the mated connectors 2001, 2002 may be adapted to securely mount the connectors/members 2046 to the shroud 246. FIG. 31D represents the cross-sectional view along the axis labeled by the D-D line shown in FIG. 31B from a prospective perpendicular to the rear-view of FIG. 31B. Accordingly, FIG. 31D illustrates one of the connectors/members 2046 along its longitudinal axis including one end that connects to the shroud 246 and the opposite end that connects to the exterior surface 2003 of the vehicle 100. While the latter end may have the apertures 3106 described above, the former end may include locking tabs 3109 that securely lock the male-type connectors 2001 of the shroud 246 within the female-type connectors 2002 of the connectors/members 2046 as shown in FIG. 31E which illustrates a detailed view of the circular section referenced as "I" in FIG. 31D. FIGS. 32A-C show that the shroud 246 may be detached from the exterior surface 2003 the connectors/members 2046 by sliding the shroud 246 away from the vehicle 100 once the locking tabs 3109 within the female-type connectors 2002 have been pushed into unlock positions. The connectors/members 2046 may be detached from the exterior surface 2003 of the vehicle 100 by sliding the connectors/members 2046 away from the vehicle 100 once the flexible clip 3107 of the alignment teeth 3101 on the exterior surface 2003 of the vehicle 100 have been pushed into unlock positions. A benefit of the disclosed connection assembly may include the installation/removal and repair of shrouds 246 without tools in the field.

Figures 33A, 33B, 33C:
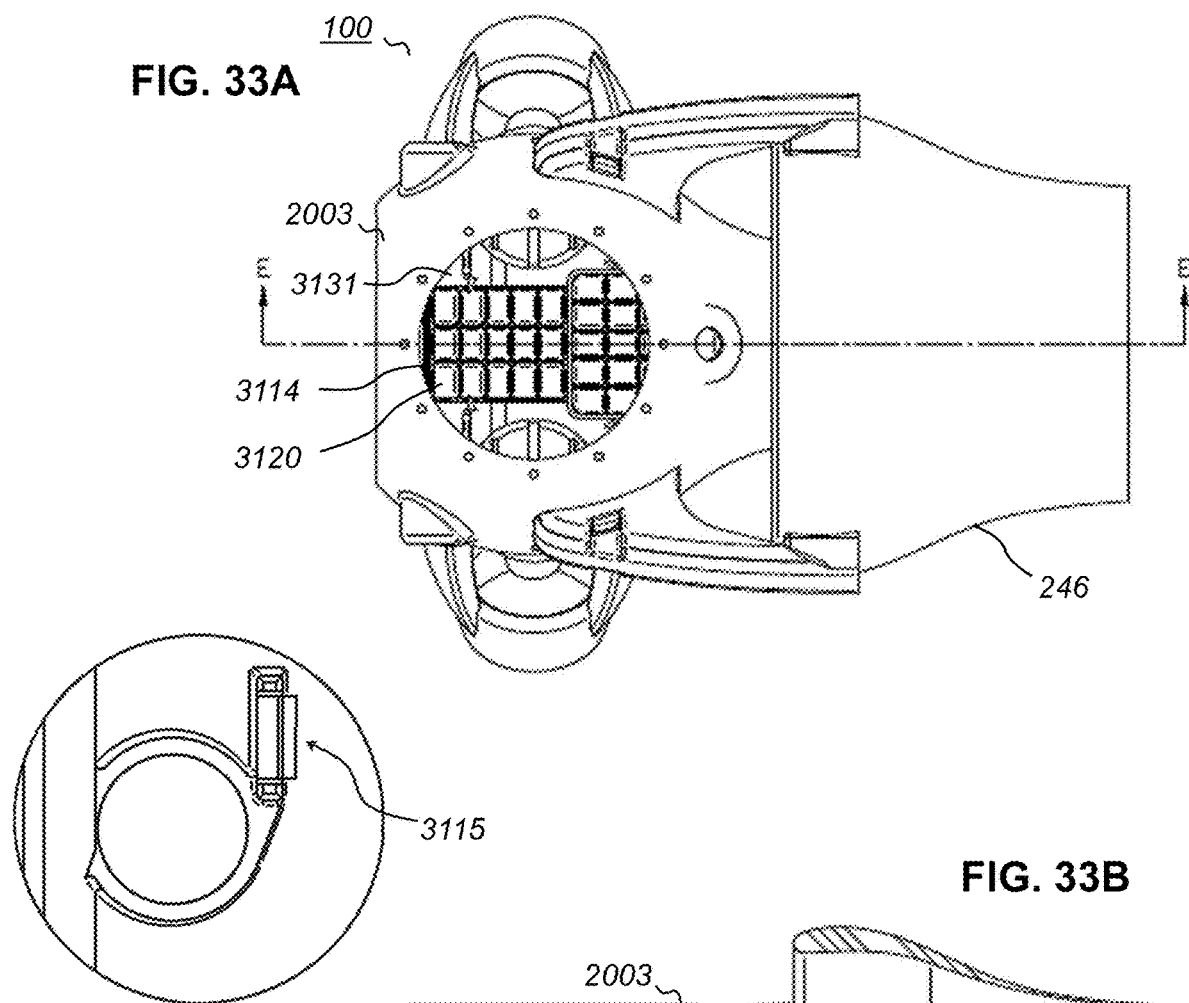
FIGS. 33A-C, 34A-C, and 35A-D illustrate examples of an additively manufactured servo locking clip adapted for attaching to a servo/actuator to a vehicle, in accordance with certain embodiments of the present disclosure.

In certain embodiments, the exterior surface 2003 of a vehicle 100 may also include an aperture 3114 adapted to receive the top dome 2811 on the top-side of the vehicle 100 as shown in FIG. 33A. Though the aperture 3114, components 3120 within the interior 3131 of the vehicle 100 may be accessed. Such components 3120 may include electronic and mechanical components that control the navigation of the vehicle 100 such as the motor 3119, the logic component/module 2500, the local processor 2396, the module microprocessor 2788, and the computer 2410 that are described above for executing instructions to propel, navigate and position the vehicle 100.

Figures 34A, 34C:
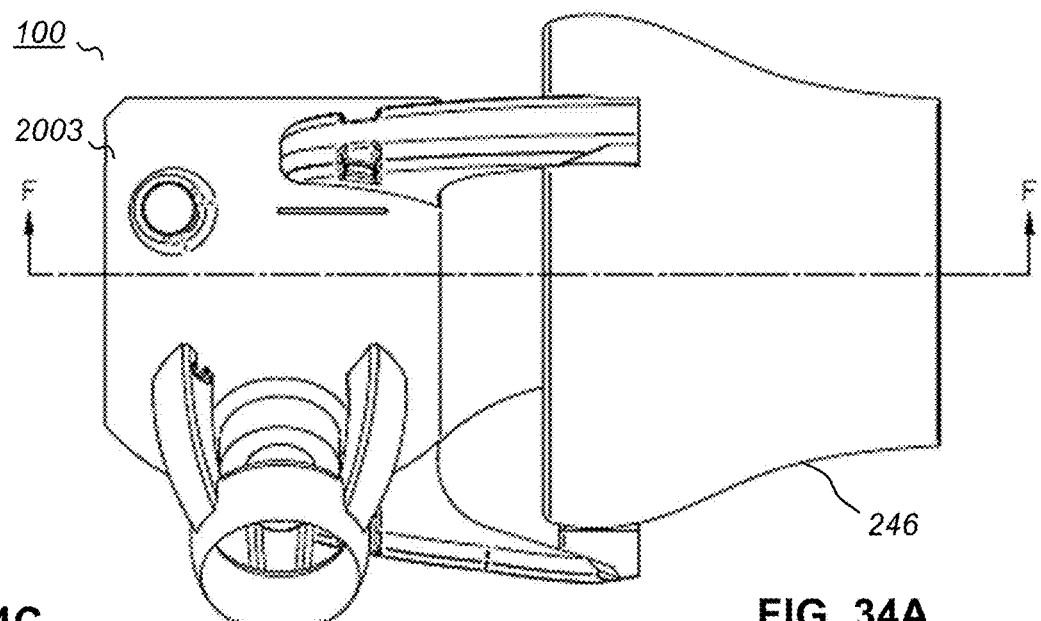
Figure 34B:
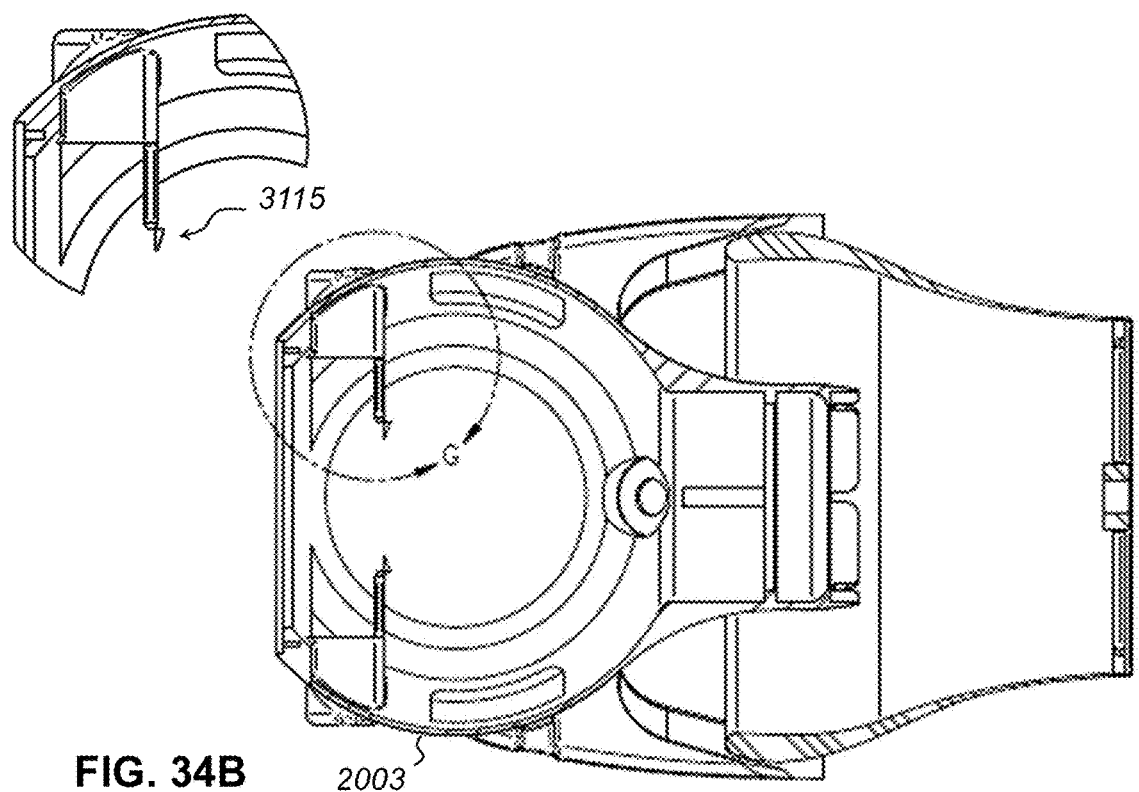
Figure 35B:
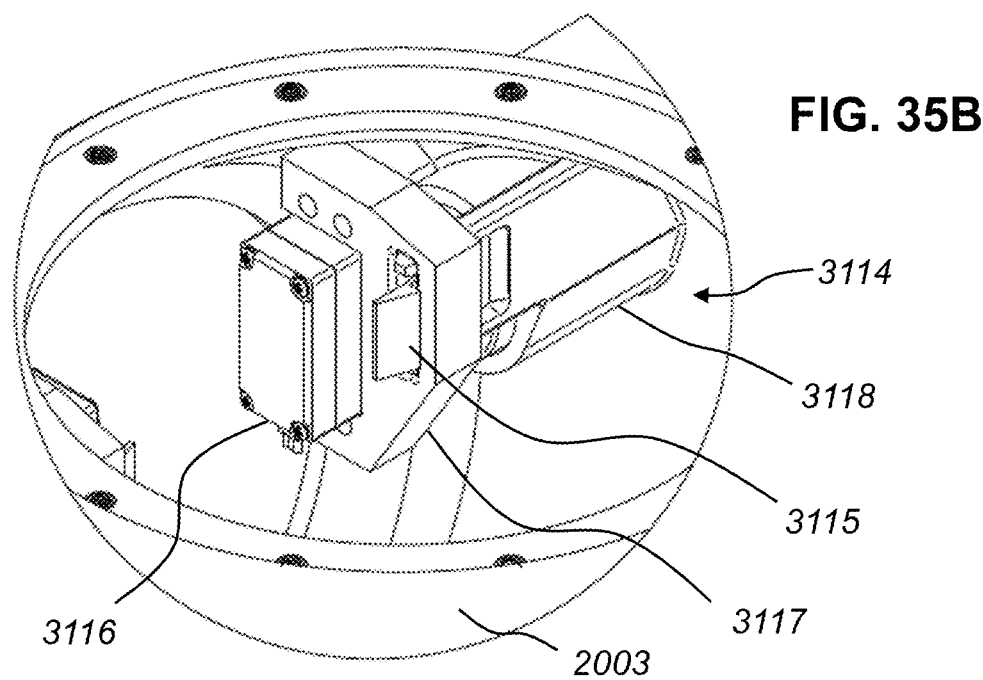
Figure 35A:
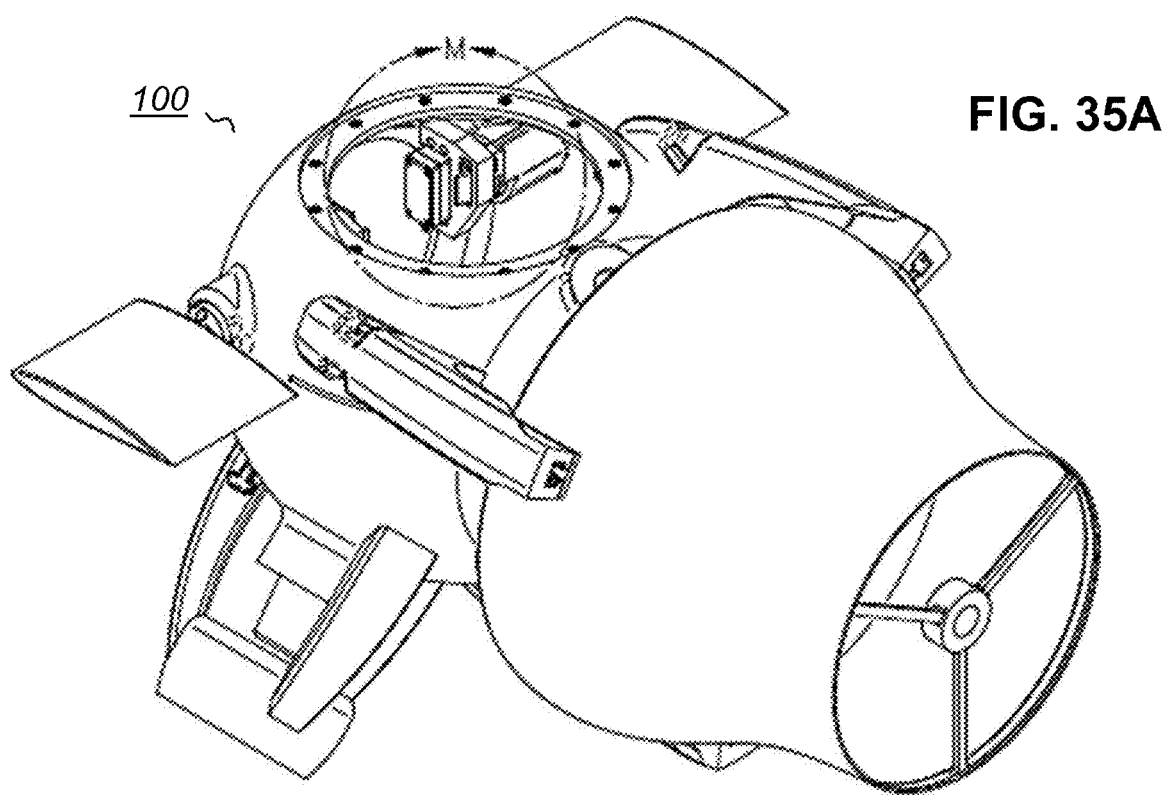
Figure 35D:
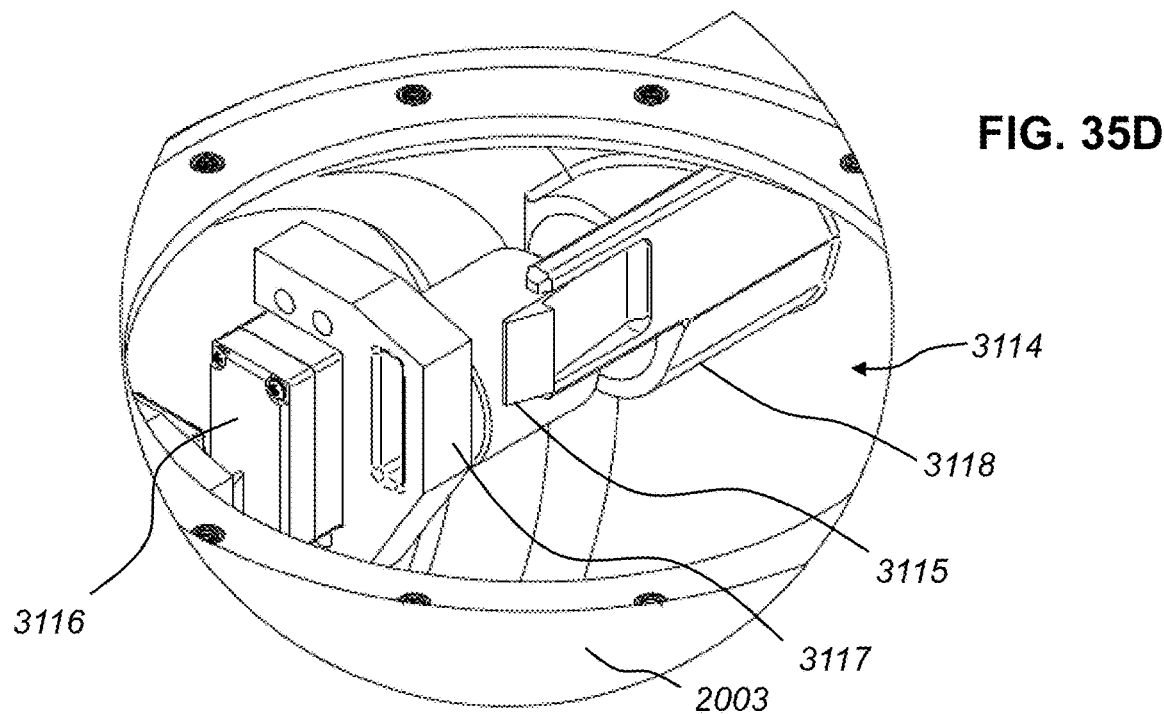
Figure 35C:
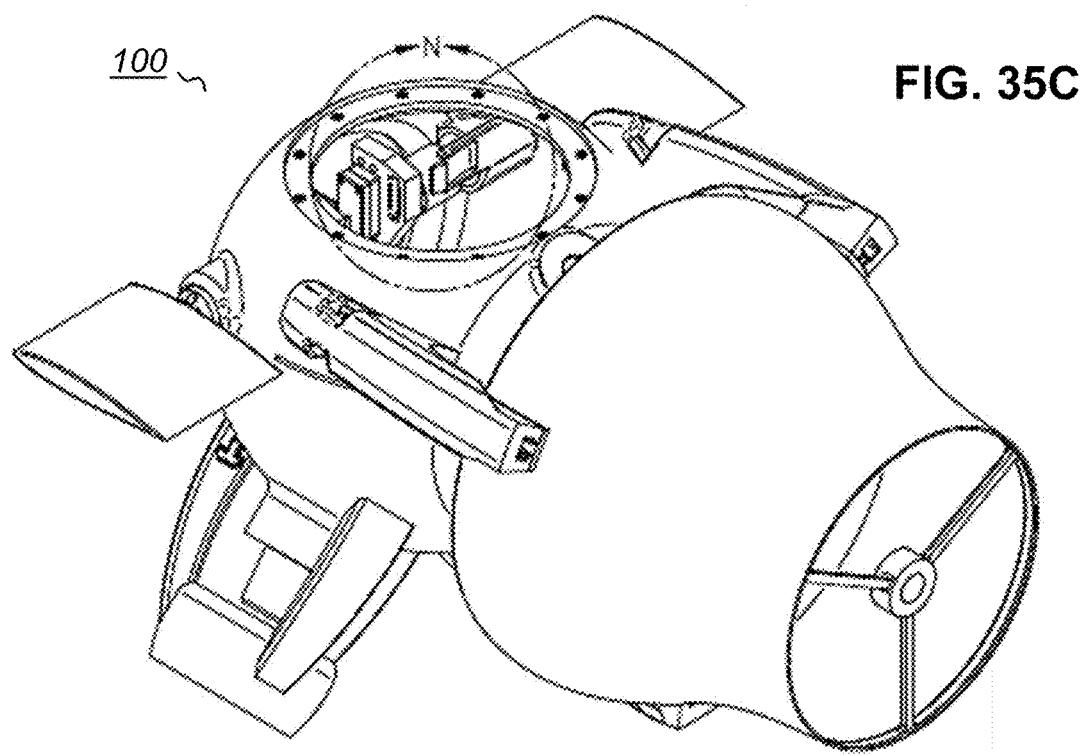

FIG. 33B represents the cross-sectional view along the axis labeled by the E-E line shown in FIG. 33A, and FIG. 33C illustrates a detailed view of the circular section referenced as "H" in FIG. 33B include a servo locking clip 3115. FIG. 34C illustrates the servo locking clip 3115 from a side-view prospective, showing a detailed view of the circular section referenced as "G" in FIG. 34B which represents the cross-sectional view of the vehicle 100 along the axis labeled by the F-F line shown in FIG. 34A. In an embodiment, the servo locking clip 3115 may be additively manufactured as a component of the vehicle 100. As shown in FIGS. 35A-D, the servo locking clip 3115 may engage and secure a servo/actuator 3116 that may actuate the module control surfaces 230 and magnets in accordance with certain embodiments described above. FIGS. 35A and 35C illustrate a servo locking clip 3115 within the interior of the vehicle 100 in a locked position and an unlocked position, respectively. The servo 3116 may be detachably secured to the vehicle 100 via a servo bracket 3117 that is attached to the servo 3116, as shown in FIGS. 35B and 35D which are detailed views of the circular sections referenced as "M" and "N" in FIGS. 35A and 35C, respectively. The servo locking clip 3115 may engage and disengage the servo bracket 3117. As shown, the servo 3116 may also be attached to a servo magnet adapter 3118. A benefit of the disclosed servo assembly may include the installation/removal and repair of servos 3116 without tools in the field.

Figure 36B:
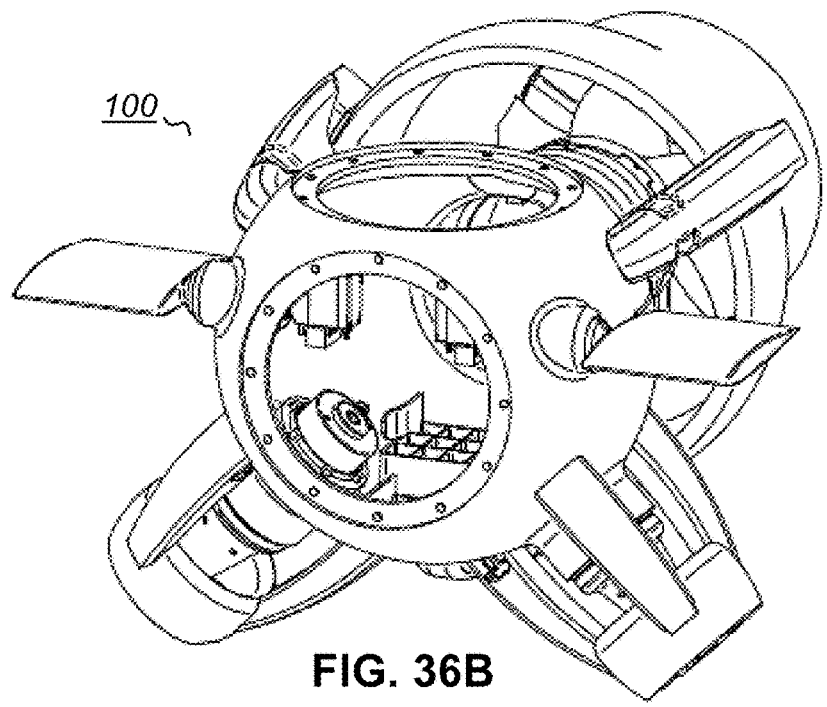
FIGS. 36A-C illustrate examples of an additively manufactured motor collar/adapter adapted for attaching to a motor to a vehicle, in accordance with certain embodiments of the present disclosure.
Figure 36A:
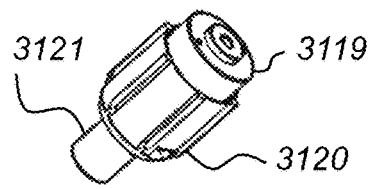
Figure 36C:
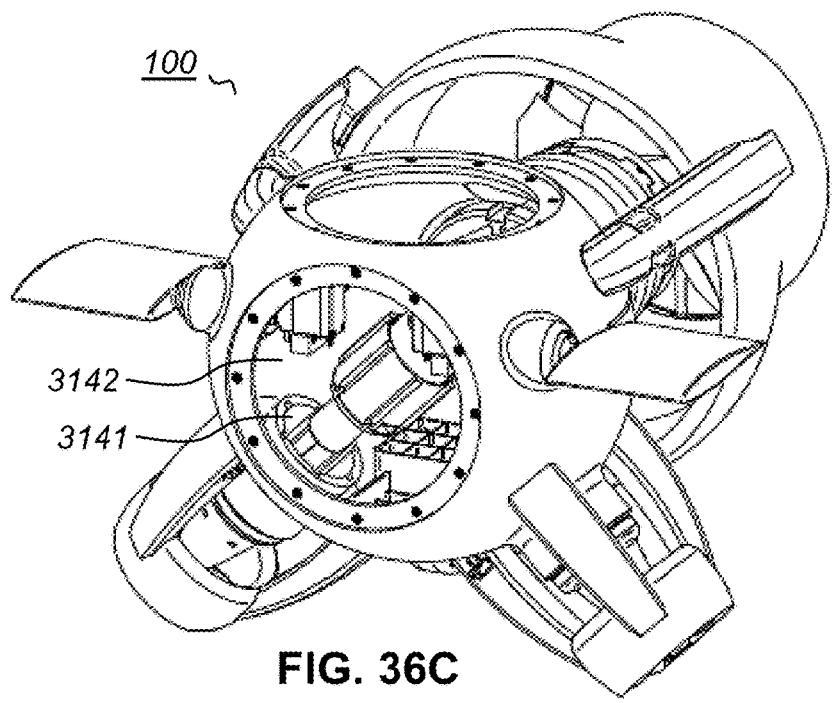

FIGS. 36A-C illustrate a motor 3119, motor collar/adapter 3120 and magnet adapter 3121 for a propulsion module 2199. FIGS. 36B-C show that the motor 3119 may be mounted within the interior of a vehicle 100 for the operation of a secondary thruster 220, and that the motor 3119 may be detached by sliding the motor 3119 from the thruster 220 towards the center of the vehicle 100. The motor adapter 3120 enables the installation of motors 3119 of varying motor sizes within an aperture 3141 within an interior surface 3142 of the vehicle 100, and may be additively manufactured in order to be adapted to fit motors 3119 of varying sizes and dimensions. Accordingly, in some embodiments, a new hull does not necessarily need to be additively manufactured to accommodate a replacement motor 3119 having a different size than that of an original motor 3119. The collar/adapter 3120 may be designed to match receiving sockets, and may be fabricated for the rapid evaluation of different motor types and sizes. A benefit of the disclosed motor assembly may include the installation/removal and repair of motors 3119 without tools in the field. In an embodiment, the motor 3119 may be rigidly affixed to the collar/adapter 3120. In some embodiments, the motor adapter 3120 may having protruding ridges. Alternatively, the surface of the motor adapter 3120 may having recesses of various shapes or designs.

In certain embodiments, a method for using an additively manufactured underwater vehicle 100 may include the step of providing an additively manufactured underwater vehicle 100 with an additively manufactured vehicle module. In some embodiments, the method may include the step of providing an additively manufactured first vehicle module for the underwater vehicle 100, the first vehicle module including an additively manufactured first connector. The method may further include the step of providing an additively manufactured second vehicle module for the underwater vehicle 100, the second vehicle module including an additively manufactured second connector. In addition, the method may include: attaching the first vehicle module to the underwater vehicle 100 by connecting the first connector to the vehicle 100 by hand, without the use of tools; and, operating the underwater vehicle 100 with the first vehicle module. The method may include: detaching the first vehicle module from the underwater vehicle 100 by disconnecting the first connector from the vehicle 100 by hand, without the use of tools; attaching the second vehicle module to the underwater vehicle 100 by connecting the second connector to the vehicle 100 by hand, without the use of tools; and, operating the underwater vehicle 100 with the second vehicle module.

Certain embodiments of the present disclosure, which are disclosed herein, may not to be limited by the embodiments described or illustrated herein, which are given by way of example and not of limitation. Other embodiments of the present disclosure will be apparent to those skilled in the art from a consideration of the instant disclosure, or from practice of the present disclosure. Various omissions, modifications, and changes to the principles disclosed herein may be made by one skilled in the art without departing from the true scope and spirit of the present disclosure, which is indicated by the following claims.

What is claimed is:

1. A device, comprising:
    an additively manufactured housing having an exterior surface, the housing having an interior;
    a plurality of additively manufactured connectors each having a first end, the first end of at least one of the additively manufactured connectors adapted to attach to the exterior surface of the device, the first end of the at least one additively manufactured connector further adapted to detach from the exterior surface of the device;
    a plurality of additively manufactured members, at least one of the additively manufactured members adapted to attach to a second end of the at least one of the additively manufactured connector, the at least one additively manufactured member further adapted to detach from the second end of the at least one additively manufactured connector, wherein the at least one additively manufactured member comprises a shroud, and wherein the at least one additively manufactured connector comprises a shroud connector adapted to mount the shroud onto the exterior surface of the device, wherein the first end of the shroud connector comprises at least one female-type connector, the at least one female-type connector adapted to engage a corresponding male-type connector, the corresponding male-type connector located on the exterior surface of the device, wherein the at least one female-type connector comprises a track guide having an opening adapted to receive the corresponding male-type connector, wherein the corresponding male-type connector comprises locking pins additively manufactured on the exterior surface of the device, the locking pins adapted to be inserted within the opening of the track guide of the at least one female-type connector; and,
    electronic components that control the device, wherein the device comprises a vehicle, the electronic components located within the interior of the device, the electronic components comprising a processor for executing instructions to operate the device.

2. The device of claim 1, wherein the opening of the at least one female-type connector having a clip adapted to be pushed into a slot within the opening, wherein the corresponding male-type connector comprises a nubbin adapted to push the clip within the opening of the at least one female-type connector, the clip adapted to lock the nubbin when the nubbin traverses into the opening passed the clip, whereby the at least one female-type connector and the corresponding male-type connector are in a locked position and the shroud connector is mounted onto the exterior surface of the device.

3. The device of claim 2, wherein the at least one female-type connector receives the corresponding male-type connector when the shroud is rotated in a first direction along an axis perpendicular to a plane of the exterior surface of the vehicle, the shroud attached to the second end of the shroud connector, wherein the shroud connector is parallel to a longitudinal axis of the shroud.

4. The device of claim 3, wherein the at least one female-type connector and the corresponding male-type connector are adapted to detach from each other by pushing the clips and sliding the corresponding male-type connector out of the opening of the at least one female-type connector, wherein the corresponding male-type connector slides out the opening when the shroud is rotated in a second direction along the axis perpendicular to the plane of the exterior surface of the vehicle, the second direction being opposite from the first direction, whereby the shroud connector is removed from the exterior surface of the device.

5. A device, comprising:
    an additively manufactured housing having an exterior surface, the housing having an interior;
    a plurality of additively manufactured connectors each having a first end, the first end of at least one of the additively manufactured connectors adapted to attach to the exterior surface of the device, the first end of the at least one additively manufactured connector further adapted to detach from the exterior surface of the device;
    a plurality of additively manufactured members, at least one of the additively manufactured members adapted to attach to a second end of the at least one of the additively manufactured connector, the at least one additively manufactured member further adapted to detach from the second end of the at least one additively manufactured connector, wherein the at least one additively manufactured member comprises a shroud, and wherein the at least one additively manufactured connector comprises a shroud connector adapted to mount the shroud onto the exterior surface of the device, wherein the first end of the shroud connector comprises at least one female-type connector, the at least one female-type connector adapted to engage a corresponding male-type connector, the corresponding male-type connector located on the exterior surface of the device, wherein the corresponding male-type connector located on the exterior surface of the device comprises alignment teeth additively manufactured on the exterior surface of the device, the alignment teeth adapted to be received by the at least one female-type connector located at the first end of the shroud connector, wherein the at least one female-type connector is adapted to slide over the alignment teeth in a first linear direction parallel to a longitudinal axis of the alignment teeth; and,
    electronic components that control the device, wherein the device comprises a vehicle, the electronic components located within the interior of the device, the electronic components comprising a processor for executing instructions to operate the device.

6. The device of claim 5, wherein the alignment teeth comprise a flexible clip adapted to bend when the flexible clip is inserted into a cavity of the at least one female-type connector, the flexible clip adapted to lock within the cavity, whereby the at least one female-type connector and the corresponding male-type connector are in a locked position and the shroud connector is mounted onto the exterior surface of the device.

7. The device of claim 6, wherein the at least one female-type connector comprises at least one aperture at the first end of the shroud connector, the flexible clip inserted within the cavity of the at least one female-type connector being accessible via the at least one aperture, the flexible clip detaching from the at least one female-type connector when the flexible clip is pushed out of the cavity in a second linear direction parallel to the longitudinal axis of the alignment teeth, the second linear direction being opposite from the first linear direction, whereby the shroud connector is removed from the exterior surface of the device.

8. A device, comprising:
an additively manufactured housing having an exterior surface, the housing having an interior;
a plurality of additively manufactured connectors each having a first end, the first end of at least one of the additively manufactured connectors adapted to attach to the exterior surface of the device, the first end of the at least one additively manufactured connector further adapted to detach from the exterior surface of the device;
a plurality of additively manufactured members, at least one of the additively manufactured members adapted to attach to a second end of the at least one of the additively manufactured connector, the at least one additively manufactured member further adapted to detach from the second end of the at least one additively manufactured connector, wherein the at least one additively manufactured member comprises a shroud, and wherein the at least one additively manufactured connector comprises a shroud connector adapted to mount the shroud onto the exterior surface of the device, wherein the second end of the shroud connector comprises a male-type connector, the male-type connector adapted to engage a corresponding female-type connector located on the shroud, wherein the male-type connector is t-block shaped and the corresponding female-type connector is track-shaped, the t-block shaped male-type connector adapted to slide within the track-shaped female-type connector in a linear manner parallel to a longitudinal axis of the shroud; and,
electronic components that control the device, wherein the device comprises a vehicle, the electronic components located within the interior of the device, the electronic components comprising a processor for executing instructions to operate the device.

9. The device of claim 8, wherein the track-shaped female-type connector comprises locking tabs that lock the t-block shaped male-type connector within the track-shaped female-type connector.

10. The device of claim 9, wherein the track-shaped female-type connector and the t-block shaped male-type connector are adapted to detach from each other by pushing the locking tabs into an unlock position and sliding the shroud away from the shroud connector, whereby the shroud connector is removed from the shroud connector.

11. A device, comprising:
an additively manufactured housing having an exterior surface, the housing having an interior;
a plurality of additively manufactured connectors each having a first end, the first end of at least one of the additively manufactured connectors adapted to attach to the exterior surface of the device, the first end of the at least one additively manufactured connector further adapted to detach from the exterior surface of the device;
a plurality of additively manufactured members, at least one of the additively manufactured members adapted to attach to a second end of the at least one of the additively manufactured connector, the at least one additively manufactured member further adapted to detach from the second end of the at least one additively manufactured connector, wherein the at least one additively manufactured member comprises a propeller assembly, and wherein the at least one additively manufactured connector comprises a ball bearing assembly adapted to mount the propeller assembly onto the exterior surface of the device; and,
electronic components that control the device, wherein the device comprises a vehicle, the electronic components located within the interior of the device, the electronic components comprising a processor for executing instructions to operate the device.

12. The device of claim 11, wherein the propeller assembly comprises a primary propeller assembly having a longitudinal axis that is parallel to a longitudinal axis of the device.

13. The device of claim 11, wherein the propeller assembly comprises a secondary propeller assembly, the secondary propeller assembly comprising a thruster, the thruster having a longitudinal axis that is not parallel to a longitudinal axis of the device.

14. The device of claim 11, wherein the propeller assembly comprises:
at least one propeller, wherein the processor executes propulsion instructions to propel, navigate and position the device by controlling a speed of rotation of the at least one propeller; and,
a neodymium magnet attached to the at least one propeller.

15. The device of claim 14, wherein the at least one propeller is additively manufactured.

16. The device of claim 11, wherein the ball bearing assembly comprises:
a ball bearing track adapted to receive ball bearings; and,
a contact plate covering the ball bearings within the ball bearing track, the contact plate having contact-plate clips adapted to engage the ball bearing track and retain the ball bearings within the ball bearing track.

17. The device of claim 16, wherein the ball bearings are additively manufactured.

18. A device, comprising:
an additively manufactured housing having an exterior surface, the housing having an interior;
a plurality of additively manufactured connectors each having a first end, the first end of at least one of the additively manufactured connectors adapted to attach to the exterior surface of the device, the first end of the at least one additively manufactured connector further adapted to detach from the exterior surface of the device;
a plurality of additively manufactured members, at least one of the additively manufactured members adapted to attach to a second end of the at least one of the additively manufactured connector, the at least one additively manufactured member further adapted to detach from the second end of the at least one additively manufactured connector, wherein the at least one additively manufactured member comprises an optical communications assembly, wherein the optical communications comprises a nephelometer; and, electronic components that control the device, wherein the device comprises a vehicle, the electronic components located within the interior of the device, the electronic components comprising a processor for executing instructions to operate the device.

19. A device, comprising:

an additively manufactured housing having an exterior surface, the housing having an interior;

a plurality of additively manufactured connectors each having a first end, the first end of at least one of the additively manufactured connectors adapted to attach to the exterior surface of the device, the first end of the at least one additively manufactured connector further adapted to detach from the exterior surface of the device;

a plurality of additively manufactured members, at least one of the additively manufactured members adapted to attach to a second end of the at least one of the additively manufactured connector, the at least one additively manufactured member further adapted to detach from the second end of the at least one additively manufactured connector, wherein the at least one additively manufactured member comprises an optical communications assembly, wherein the optical communications comprises a turbidimeter; and, electronic components that control the device, wherein the device comprises a vehicle, the electronic components located within the interior of the device, the electronic components comprising a processor for executing instructions to operate the device.

20. A device, comprising:

an additively manufactured housing having an exterior surface, the housing having an interior;

a plurality of additively manufactured connectors each having a first end, the first end of at least one of the additively manufactured connectors adapted to attach to the exterior surface of the device, the first end of the at least one additively manufactured connector further adapted to detach from the exterior surface of the device;

a plurality of additively manufactured members, at least one of the additively manufactured members adapted to attach to a second end of the at least one of the additively manufactured connector, the at least one additively manufactured member further adapted to detach from the second end of the at least one additively manufactured connector, wherein the at least one additively manufactured member is selected from a group consisting of a propeller assembly and an optical communications assembly that comprises a nephelometer or a turbidimeter, wherein the at least one additively manufactured connector comprises a ball bearing assembly adapted to mount the propeller assembly onto the exterior surface; and, electronic components that control the device, wherein the device comprises a vehicle, the electronic components located within the interior of the device, the electronic components comprising a processor for executing instructions to operate the device, wherein the vehicle is selected from a group of vehicles consisting of: an underwater vehicle, an aircraft, a drone, a boat, a ship, and a truck.

21. The device of claim 20, wherein the vehicle is autonomous, wherein the processor executes predetermined instructions to propel, navigate and position the autonomous vehicle.

22. A method for operating the device of claim 20, comprising the steps of:

attaching the first end of the at least one of the additively manufactured connector to the exterior surface of the device;

attaching the second end of the at least one of the additively manufactured connector to the at least one of the additively manufactured member; and, operating the device, wherein the device moves in response to the instructions.

23. The method of claim 22, comprising the steps of:

detaching the second end of the at least one of the additively manufactured connector from the at least one of the additively manufactured member;

attaching the second end of the at least one of the additively manufactured connector to a second additively manufactured member; and, operating the device, wherein the device moves in response to the instructions.

24. A device, comprising:

an additively manufactured housing having an exterior surface, the housing having an interior;

an additively manufactured connector adapted to attach to an interior surface of the device, wherein the exterior surface is attached to a first end of a second additively manufactured connector, the first end of the second additively manufactured connector adapted to detach from the exterior surface;

an additively manufactured member, the additively manufactured member adapted to attach to the additively manufactured connector, the additively manufactured member further adapted to detach from the additively manufactured connector;

a second additively manufactured member comprising a propeller assembly, the propeller assembly adapted to attach and detach to a second end of the second additively manufactured connector, wherein the second additively manufactured connector comprises a ball bearing assembly adapted to attach the propeller assembly onto the exterior surface; and, electronic components that control the device, wherein the device comprises a vehicle, the electronic components located within the interior of the device, the electronic components comprising a processor for executing instructions to move the device.

25. The device of claim 24, wherein the additively manufactured member comprises a servo bracket, the servo bracket attached to a servo, and wherein the additively manufactured connector comprises a servo locking clip adapted to lock the servo bracket to the interior surface of the device, the servo adapted to actuate a module control surface.

26. The device of claim 24, wherein the additively manufactured member comprises a motor adapter, the motor adapter attached to a motor, and wherein the additively manufactured connector comprises an aperture in the interior surface of the device adapted to retain the motor adapter within the interior surface of the device, the motor adapted to operate a thruster, the propeller assembly comprising the thruster, the motor attached to a magnet adapter inserted into the aperture.

* * * * *